(12) United States Patent
Song et al.

(10) Patent No.: US 8,565,130 B2
(45) Date of Patent: Oct. 22, 2013

(54) TRANSMITTING SYSTEM AND METHOD OF PROCESSING DIGITAL BROADCAST SIGNAL IN TRANSMITTING SYSTEM, RECEIVING SYSTEM AND METHOD OF RECEIVING DIGITAL BROADCAST SIGNAL IN RECEIVING SYSTEM

(75) Inventors: Won Gyu Song, Gyeonggi-do (KR); Byoung Gill Kim, Seoul (KR); Jin Woo Kim, Seoul (KR); Hyoung Gon Lee, Gyeonggi-do (KR); Jae Hyung Song, Seoul (KR); In Hwan Choi, Gyeonggi-do (KR); Chul Kyu Mun, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 12/970,823

(22) Filed: Dec. 16, 2010

(65) Prior Publication Data

US 2011/0141956 A1    Jun. 16, 2011

Related U.S. Application Data

(60) Provisional application No. 61/286,803, filed on Dec. 16, 2009.

(51) Int. Cl.
*H04B 7/00* (2006.01)

(52) U.S. Cl.
USPC ........................................ 370/310

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/395.53, 412–421, 431–457, 458–463, 370/464–497, 498–522, 523–520, 521–529
See application file for complete search history.

(56) References Cited

U.S. PATENT DOCUMENTS

| | | | |
|---|---|---|---|
| 2008/0002765 A1* | 1/2008 | Song et al. | 375/240.01 |
| 2008/0059866 A1* | 3/2008 | Song et al. | 714/776 |
| 2009/0222486 A1* | 9/2009 | Bae et al. | 707/104.1 |
| 2010/0039569 A1* | 2/2010 | Jeong et al. | 348/726 |
| 2010/0195712 A1* | 8/2010 | Yu et al. | 375/240.01 |
| 2012/0063407 A1* | 3/2012 | Park et al. | 370/329 |

* cited by examiner

*Primary Examiner* — Jung-Jen Liu
(74) *Attorney, Agent, or Firm* — Lee, Hong, Degerman, Kang & Waimey

(57) ABSTRACT

A transmitting system and a method of transmitting digital broadcast signal are disclosed. The method of transmitting digital broadcasting signal in a transmitter includes forming a data group including mobile data, packet formatting mobile data packets including data in the data group, wherein the mobile data packets include a specific number of mobile data packets and a scalable number of mobile data packets, the scalable number being scalable up to 38, wherein the data group includes a plurality of regions and fifth region of the data group includes the scalable number of mobile data packets, by-passing data randomizing and RS encoding on data in the mobile data packets when the scalable number is 38, interleaving data in the mobile data packets and transmitting the interleaved data during a slot.

8 Claims, 52 Drawing Sheets

FIG. 8

| Group Type | | Group Division | | Group Map | | # pkt / Slot | | Description |
|---|---|---|---|---|---|---|---|---|
| | | Primary / AB | Scondary -/ CD | | | M/H | Main | |
| GT0 | | ABCD / AB | -/CD | GM0 | | 118 | 38 | Both Group Divisions:CMM(no Group Region E) |
| GT1 | GT1-0 | ABCD | E | GM1 | GM1-0 | 156 | 0 | Primary Group Division : CMM Compatible |
| | GT1-1 | | | | GM1-1 | 155 | 1 | |
| | GT1-2 | | | | GM1-2 | 154 | 2 | Secondary Group Division EMM Only |
| | GT1-4 | | | | GM1-4 | 152 | 4 | |
| | GT1-8 | | | | GM1-8 | 148 | 8 | |
| GT2 | GT2-0 | AB | CDE | GM2 | GM2-0 | 156 | 0 | Primary Group Division : CMM Compatible |
| | GT2-1 | | | | GM2-1 | 155 | 1 | |
| | GT2-2 | | | | GM2-2 | 154 | 2 | Secondary Group Division EMM Only |
| | GT2-4 | | | | GM2-4 | 152 | 4 | |
| | GT2-8 | | | | GM2-8 | 148 | 8 | |
| GT3 | GT3-0 | ABCDE | - | | GM2-0 | 156 | 0 | Primary Group Division : EMM Only |
| | GT3-1 | | | | GM2-1 | 155 | 1 | |
| | GT3-2 | | | | GM2-2 | 154 | 2 | |
| | GT3-4 | | | | GM2-4 | 152 | 4 | |
| | GT3-8 | | | | GM2-8 | 148 | 8 | |

FIG. 41

| Type Indicator (3) | Error Indicator (1) | Stuff Indicator (1) | Pointer Indicator (11) | Payload (N-2) bytes |
|---|---|---|---|---|

FIG. 42
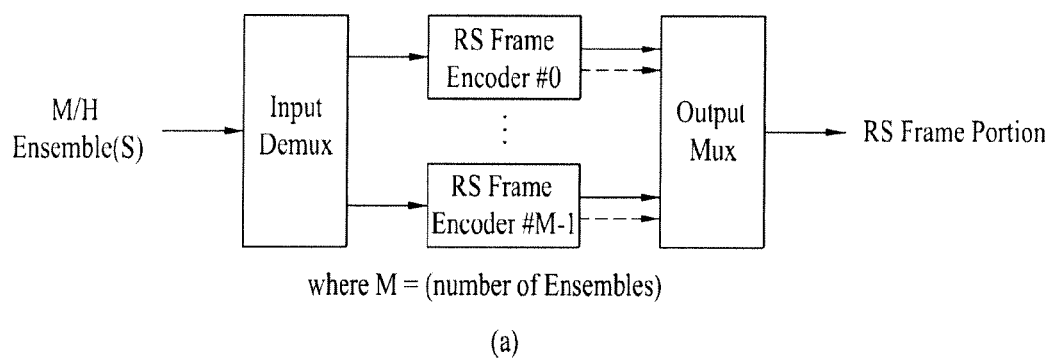
(a)
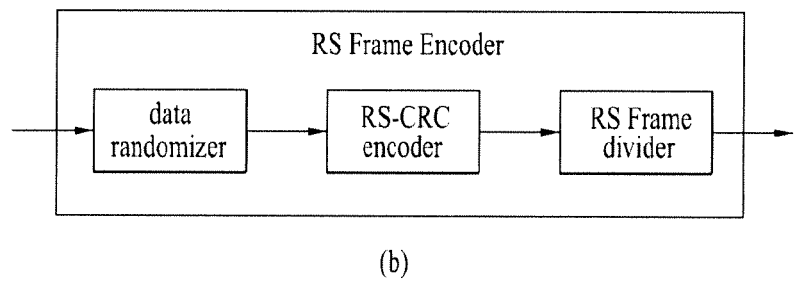
(b)

TRANSMITTING SYSTEM AND METHOD OF PROCESSING DIGITAL BROADCAST SIGNAL IN TRANSMITTING SYSTEM, RECEIVING SYSTEM AND METHOD OF RECEIVING DIGITAL BROADCAST SIGNAL IN RECEIVING SYSTEM

This application claims the benefit of U.S. Provisional Application No. 61/286,803, filed on Dec. 16, 2009, which is hereby incorporated by reference as if fully set forth herein.

BACKGROUND OF THE INVENTION

1. The Field of the Invention

The present invention relates to a digital broadcasting system for transmitting and receiving a digital broadcast signal, and more particularly, to a transmitting system for processing and transmitting the digital broadcast signal, a receiving system for receiving the digital broadcast signal, a method of processing data in the transmitting system and a method of receiving data in the receiving system.

2. Description of the Related Art

The Vestigial Sideband (VSB) transmission mode, which is adopted as the standard for digital broadcasting in North America and the Republic of Korea, is a system using a single carrier method. Therefore, the receiving performance of the digital broadcast receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a transmitting system and a method of processing a digital broadcast signal in a transmitting system, and a receiving system and a method of receiving a broadcast signal in a receiving system substantially obviate one or more problems due to limitations and disadvantages of the related art. An object of the present invention is to provide a transmission system which is able to transmit additional mobile service data while simultaneously maintaining the compatibility with a conventional system for transmitting a digital broadcast signal, and a method for processing a broadcast signal.

Another object of the present invention is to provide a transmission system which additionally inserts mobile service data and known data recognized by an agreement between a transmission system and a receiving system into a conventional mobile service data area, thereby enhancing the reception performance of the mobile service data at the reception system, and a method of processing a broadcast signal.

Another object of the present invention is to provide a transmission system which forms continuous known data sequences by interconnecting discontinuous known data belonging to each data group through a concatenated structure of adjacent data groups, thereby enhancing the reception performance of a broadcast signal at a receiving system, and a method of processing a broadcast signal.

Another object of the present invention is to provide a transmission system which generates information of additional mobile service data by extending signaling information and transmits the generated information to a reception system, such that the transmission system and the reception end can smoothly communicate with each other, and a method of processing a broadcast signal.

A further object of the present invention is to provide a transmitting system, a receiving system, and a method of processing broadcast signals that can enhance the receiving performance of the receiving system by performing carrier recovery and channel equalization using the known data.

A further object of the present invention is to provide a receiving system and a method of receiving that can detect known data sequence included a specific area of a received data group formed by transmission and demodulate mobile data in the received data group, and perform channel equalizing using the detected known data sequence.

A further object of the present invention is to provide a receiving system and a method of receiving that can decode signaling information using the detected known data sequence and determine whether or not the received data group is a SFCMM data group.

A further object of the present invention is to provide a transmission method and reception method in which short known data sequences included in a data group are used as long known data sequences when being concatenated with another group.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a digital broadcasting signal in a transmitter includes forming a data group including mobile data, known data sequence, packet formatting mobile data packets including data in the data group, wherein the mobile data packets include a specific number of mobile data packets and a scalable number of mobile data packets, wherein the scalable number is scalable up to 38, wherein the data group includes a plurality of regions, the plurality of regions including data blocks, each data block including a plurality of data segments, wherein a first and second regions include a primary ensemble of the mobile data, the known data sequences, a third, fourth and fifth regions include a secondary ensemble of the mobile data, and the fifth region includes the scalable number of mobile data packets, by-passing data randomizing and RS encoding on data in the mobile data packets when the scalable number is 38, interleaving data in the mobile data packets and transmitting the interleaved data in a transmission frame during a slot.

When the scalable number is 38, the data group has a data area for RS parities and MPEG headers, and the data area is allocated to mobile data.

The primary ensemble and second ensembles are collections of the mobile data encoded by using different FEC code rates, respectively.

Furthermore, the scalable number is a number which is one of 11, 20, 29 and 38.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 illustrates an example of each group type being segmented based upon the size of region E according to an embodiment of the present invention.

FIG. 41 is a diagram illustrating examples of fields allocated to the header region within the mobile service data packet according to the present invention.

FIGS. 42(a) to 42(b) illustrate examples of a data frame encoder according to the present invention.

DESCRIPTION OF THE PREFERRED EMBODIMENTS

Figure 1:
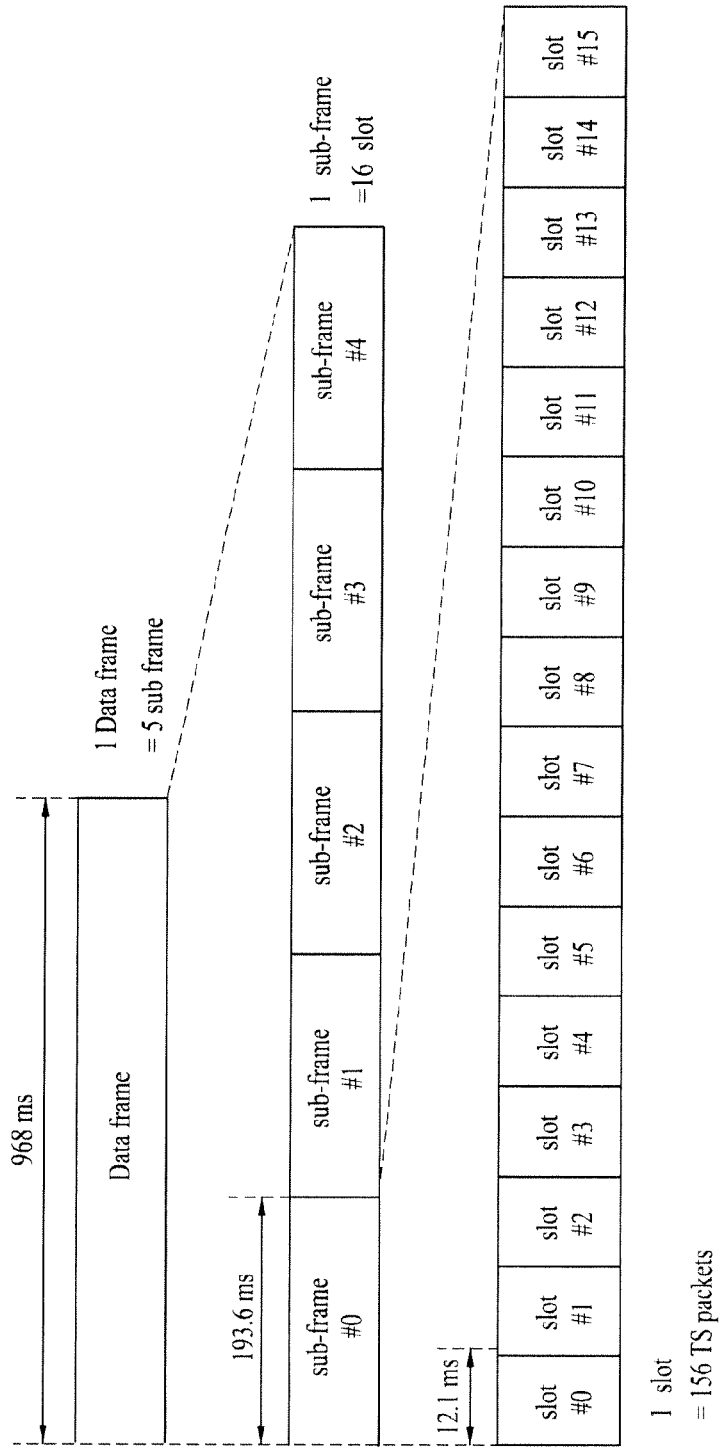
FIG. 1 illustrates a data frame (M/H frame) structure for transmitting/receiving mobile service data according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

For convenience of description and better understanding of the present invention, abbreviations and terms to be use in the present invention are defined as follows.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "M/H (or MH)" corresponds to the initials of "mobile" and "handheld" and represents the opposite concept of a fixed-type system. Furthermore, the M/H service data may include at least one of mobile service data and handheld service data, and will also be referred to as "mobile service data" for simplicity. Herein, the mobile service data not only correspond to M/H service data but may also include any type of service data with mobile or portable characteristics. Therefore, the mobile service data according to the present invention are not limited only to the M/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

In the embodiment of the present invention, data for mobile services may be transmitted by using a portion of the channel capacity that was used to transmit data for main services. Alternatively, data for mobile service may also be transmitted by using the entire channel capacity that was used to transmit data for main services. The data for mobile services correspond to data required for mobile services. Accordingly, the data for mobile services may include actual mobile service data as well as known data, signaling data, RS parity data for error-correcting mobile service data, and so on. In the description of the embodiment of the present invention, the data for mobile services will be referred to as mobile service data or mobile data for simplicity.

The mobile service data may be categorized as mobile service data of a first mobile mode or Core Mobile Mode (CMM) and mobile service data of a second mobile mode or Extended Mobile Mode (EMM) or Scalable Full Channel Mobile Mode (SFCMM). Furthermore, when the second mobile mode is used along with the first mobile mode, the above-described two modes may be collectively defined as the Scalable Full Channel Mobile Mode (SFCMM).

The first mobile mode is a mode compatible with the conventional mobile broadcast receiver and the second mobile mode is a mode incompatible with the existing mobile broadcast receiver.

Also, according to an embodiment of the present invention, a group (also referred to as an M/H group or a data group) corresponds to a collection of M/H Encapsulated (MHE) data packets confined within a slot (also referred to as an M/H slot).

A group division corresponds to a collection (or set) of group regions (also referred to as M/H group regions) within a slot. Herein, a group division is categorized into a Primary Group Division or a Secondary Group Division.

A group region corresponds to a collection (or set) of DATA blocks or extended DATA blocks.

A group type is determined by the configuration of a group division within a single group.

A parade (also referred to as an M/H parade) refers to a collection of groups that have the same FEC parameters. More specifically, a parade refers to a collection of group divisions of groups having the same group type.

A primary parade (also referred to as a primary M/H parade) corresponds to a collection of primary group divisions, and a secondary parade (also referred to as a secondary M/H parade) corresponds to a collection of secondary group divisions. Each of the secondary group divisions is carried (or transported) through the same slot with its respectively paired primary group division. The secondary parade has the same parade identifier (ID) as its respective primary parade (i.e., the secondary parade shares the same parade ID with its respective primary parade).

A CMM parade corresponds to a parade that is backward compatible with mobile service data of the first mobile mode or mobile service data of CMM.

A CMM primary parade corresponds to a collection of primary group divisions. And, at this point, each primary group division includes mobile service data backward compatible with the first mobile mode. A CMM secondary parade corresponds to a collection of secondary group divisions. And, at this point, each secondary group division includes mobile service data backward compatible with the first mobile mode.

An EMM parade corresponds to a parade that is backward compatible with mobile service data of the second mobile mode or mobile service data of EMM.

An EMM primary parade corresponds to a collection of primary group divisions. And, at this point, each primary group division includes mobile service data backward compatible with the second mobile mode. An EMM secondary parade corresponds to a collection of secondary group divisions. And, at this point, each secondary group division includes mobile service data backward compatible with the second mobile mode. The EMM secondary parade is classified as an EMM Class 1 secondary parade and an EMM Class 2 secondary parade. Herein, the EMM Class 1 secondary parade is configured of the same number of group divisions as its paired primary parade. Conversely, the EMM Class 2 secondary parade is configured of a different number of group divisions as its paired primary parade.

An RS frame corresponds to a two (2)-dimensional (2D) data frame, wherein an RS frame payload is RS-CRC encoded.

In a primary RS frame, a primary RS frame parade is RS-CRC encoded. The primary RS frame is transmitted (or carried) through a primary parade.

In a secondary RS frame, a secondary RS frame parade is RS-CRC encoded. The secondary RS frame is transmitted (or carried) through a secondary parade.

A super RS frame corresponds to an RS frame wherein a super RS frame payload is RS-CRC encoded. The super RS frame is transported (or carried) through two arbitrary parades.

An ensemble (also referred to as an M/H ensemble) refers to a collection of RS frame having the same FEC codes. Herein, each RS frame encapsulates a collection of a collection of IP streams.

A primary ensemble corresponds to a collection of consecutive primary RS frames.

A secondary ensemble corresponds to a collection of consecutive secondary RS frames.

A super ensemble (also referred to as a super M/H ensemble) corresponds to a collection of consecutive super RS frames.

M/H Frame Structure

In the embodiment of the present invention, the mobile service data are first multiplexed with main service data in data frame units and, then, modulated in a VSB mode and transmitted to the receiving system.

At this point, one data frame consists of K1 number of sub-frames, wherein one sub-frame includes K2 number of slots. Also, each slot may be configured of K3 number of data packets. In the embodiment of the present invention, K1 will be set to 5, K2 will be set to 16, and K3 will be set to 156 (i.e., K1=5, K2=16, and K3=156). The values for K1, K2, and K3 presented in this embodiment either correspond to values according to a preferred embodiment or are merely exemplary. Therefore, the above-mentioned values will not limit the scope of the present invention.

In the example shown in FIG. 1, one data frame consists of 5 sub-frames, wherein each sub-frame includes 16 slots. In this case, the data frame according to the present invention includes 5 sub-frames and 80 slots.

Also, in a packet level, one slot is configured of 156 data packets (i.e., transport stream packets), and in a symbol level, one slot is configured of 156 data segments. Herein, the size of one slot corresponds to one half (½) of a VSB field. More specifically, since one 207-byte data packet has the same amount of payload data as payload data of a segment, a data packet prior to being interleaved may also be used as a data segment.

At this time, a VSB frame includes two VSB fields.

Figure 2:
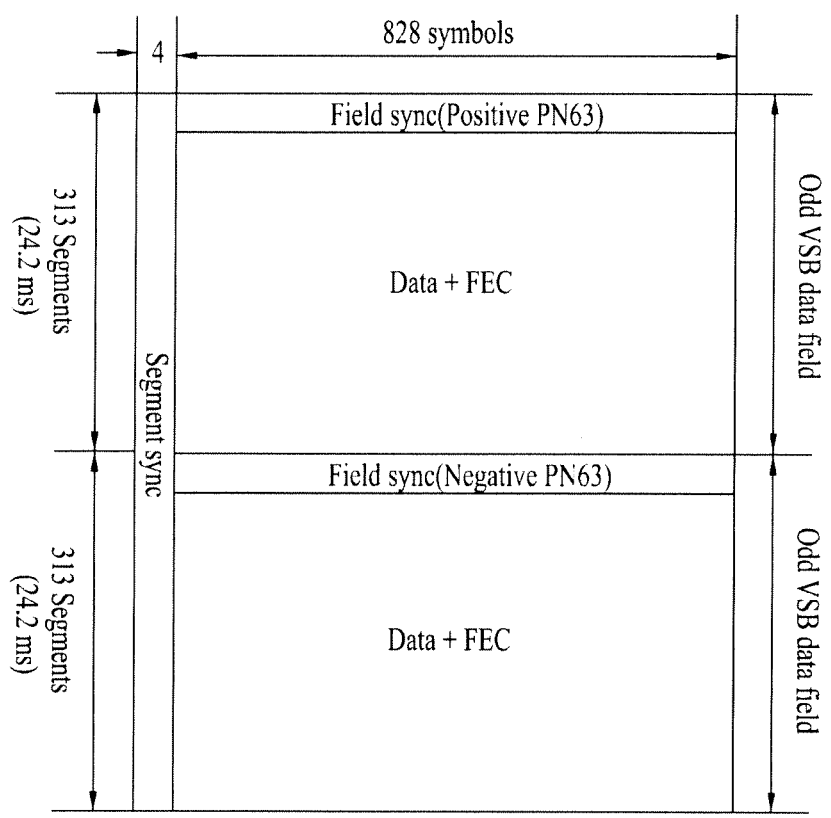
FIG. 2 illustrates an exemplary structure of a VSB frame, wherein one VSB frame consists of 2 VSB fields (i.e., an odd field and an even field). Herein, each VSB field includes a field synchronization segment and 312 data segments.

FIG. 2 illustrates an exemplary structure of a VSB frame, wherein one VSB frame consists of 2 VSB fields (i.e., an odd field and an even field). Herein, each VSB field includes a field synchronization segment and 312 data segments.

The slot corresponds to a basic time period for multiplexing the mobile service data and the main service data. Herein, one slot may either include the mobile service data or be configured only of the main service data.

Meanwhile, when the slots are assigned to a VSB frame, an offset exists for each assigned position.

Figure 3:
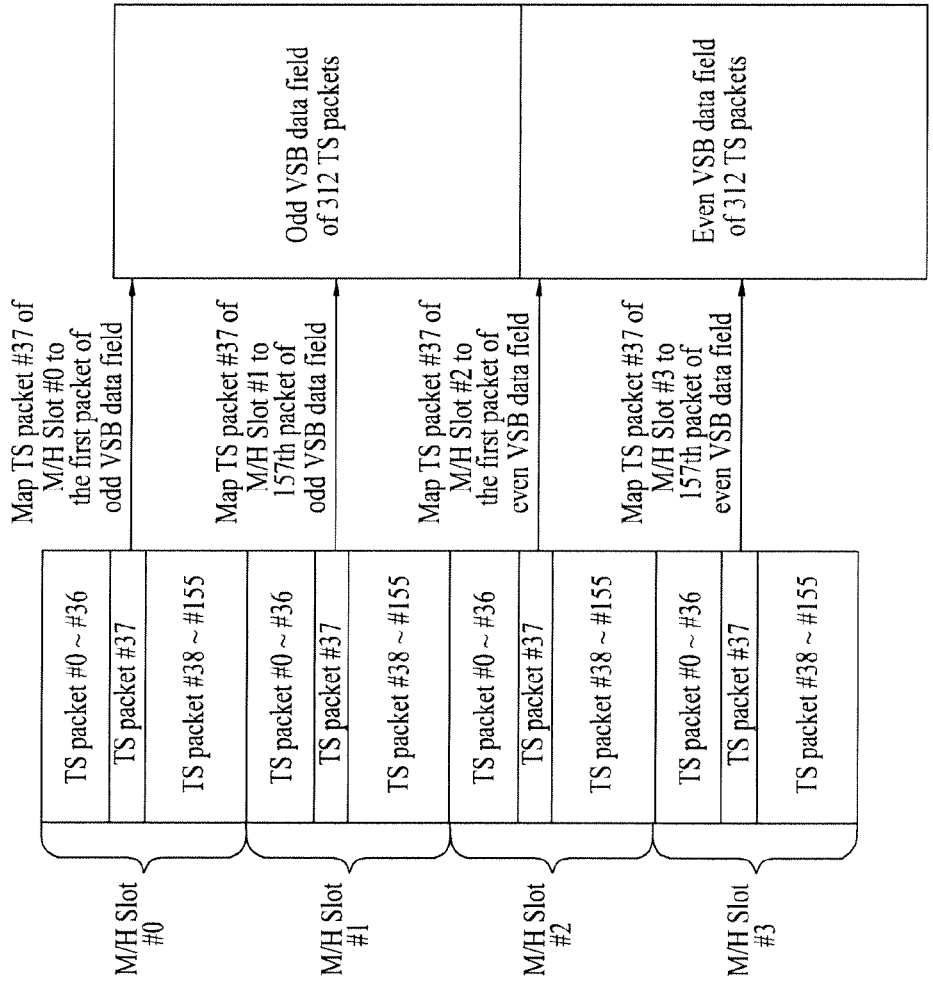
FIG. 3 illustrates a mapping example of the positions to which the first 4 slots of a sub-frame are assigned with respect to a VSB frame in a space region.

FIG. 3 illustrates a mapping example of the positions to which the first 4 slots of a sub-frame are assigned with respect to a VSB frame in a space region.

Referring to FIG. 3 a 38th data packet (TS packet #37) of a 1st slot (Slot #0) is mapped to the 1st data packet of an odd VSB field. A 38th data packet (TS packet #37) of a 2nd slot (Slot #1) is mapped to the 157th data packet of an odd VSB field. Also, a 38th data packet (TS packet #37) of a 3rd slot (Slot #2) is mapped to the 1st data packet of an even VSB field. And, a 38th data packet (TS packet #37) of a 4th slot (Slot #3) is mapped to the 157th data packet of an even VSB field. Similarly, the remaining 12 slots within the corresponding sub-frame are mapped in the subsequent VSB frames using the same method.

One group may be divided into at least one or more hierarchical (or layered) regions. And, the type of mobile service data being inserted in each region may vary depending upon the characteristics of each layered region. For example, each group within the group may be categorized based upon the receiving performance within the group.

According to an embodiment of the present invention, in data structure prior to being data-interleaved, one group is divided into regions A, B, C, and D. At this point, the group may further include region E. Herein, region E may be configured of 38 data packets, and the number of M/H data packets within region E may be equal to or less than the number of data packets (i.e., 38).

Figure 4:
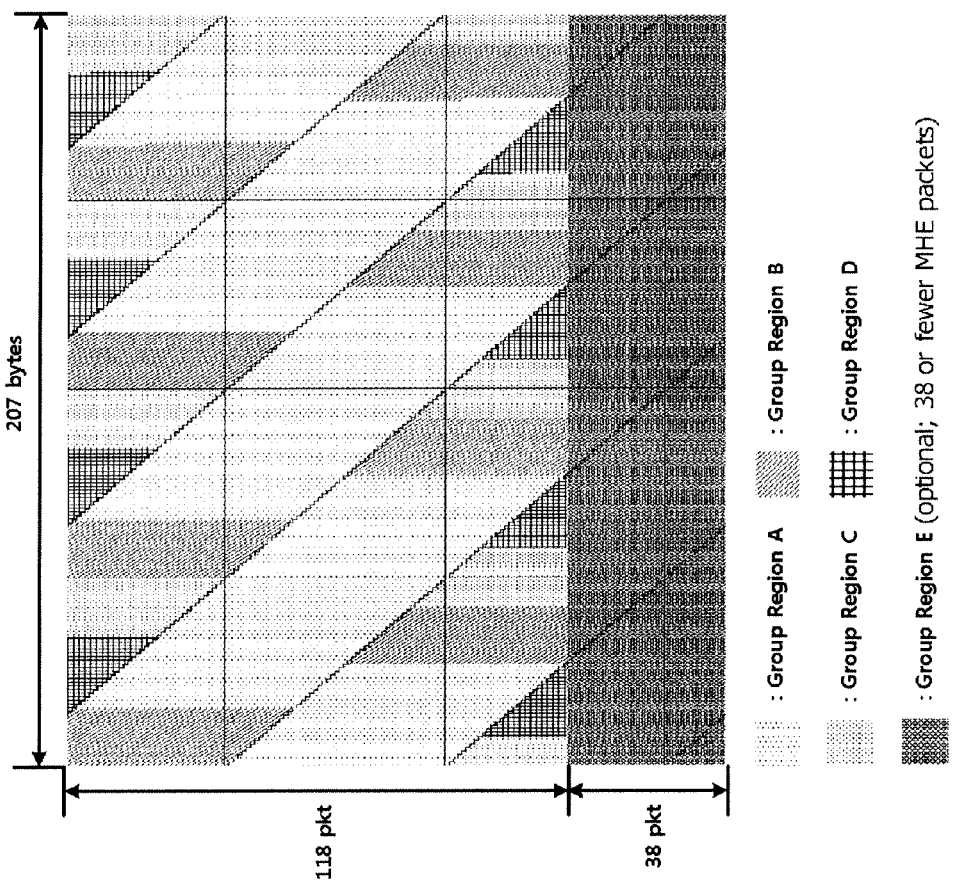
FIG. 4 illustrates a general view showing a structure of a group within a packet domain according to an embodiment of the present invention. More specifically, FIG. 4 corresponds to a group structure prior to being processed with data interleaving.

FIG. 4 illustrates a general view showing a structure of a group within a packet domain according to an embodiment of the present invention. More specifically, FIG. 6 corresponds to a group structure prior to being processed with data interleaving.

Figure 6:
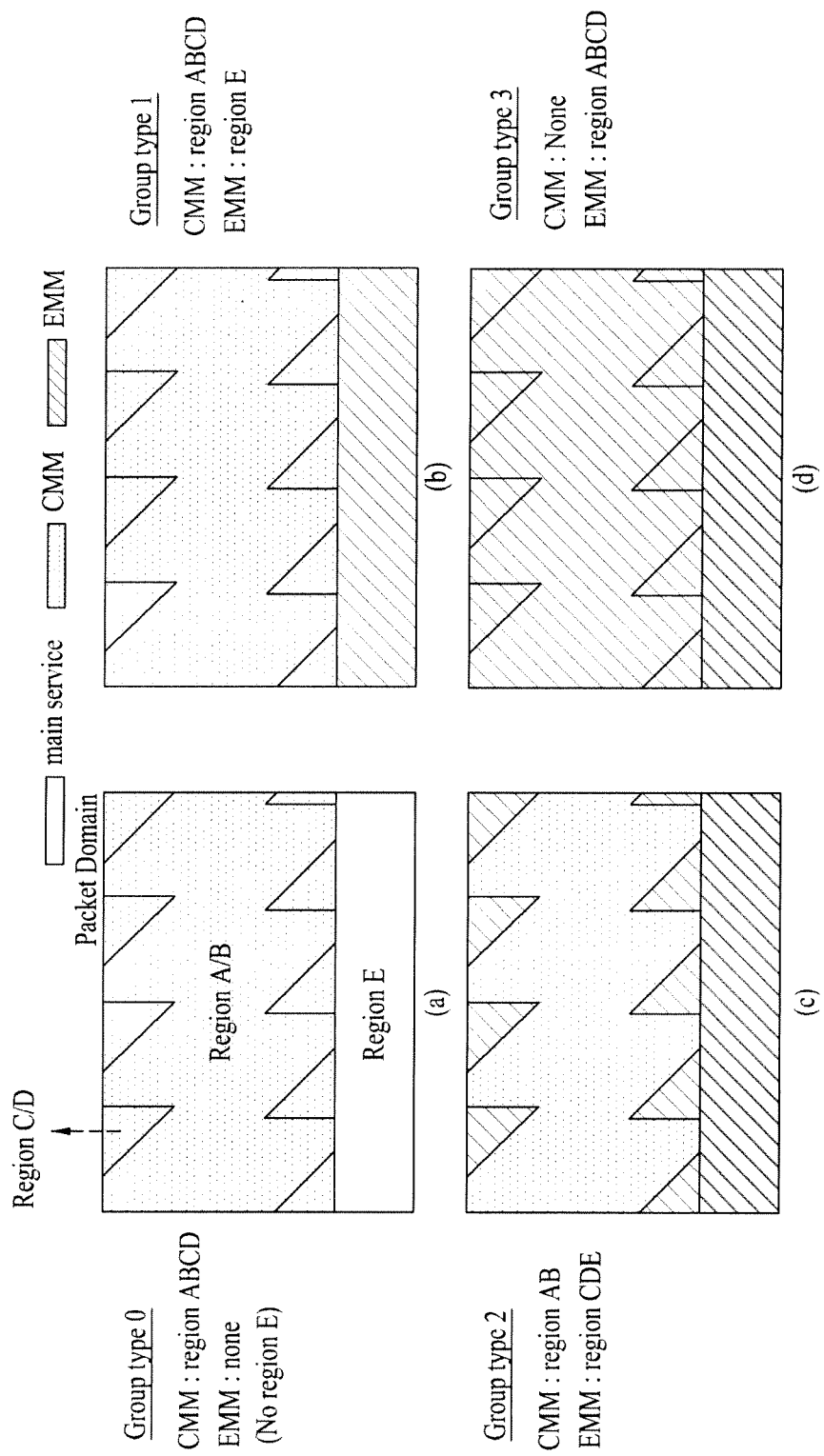
FIGS. 6(a) to (d) illustrate various examples of mobile service data of the first mobile mode and mobile service data of the second mobile mode being allocated to a group.

Referring to FIG. 6, among 156 data packets within a group, regions A, B, C, and D are assigned to 118 data packets, and a portion of the remaining 38 data packets or all of the remaining 38 data packets is assigned to region E. Alternatively, region E may not be assigned at all.

In this case, all 38 data packets are used as main service data packets.

Figure 5:
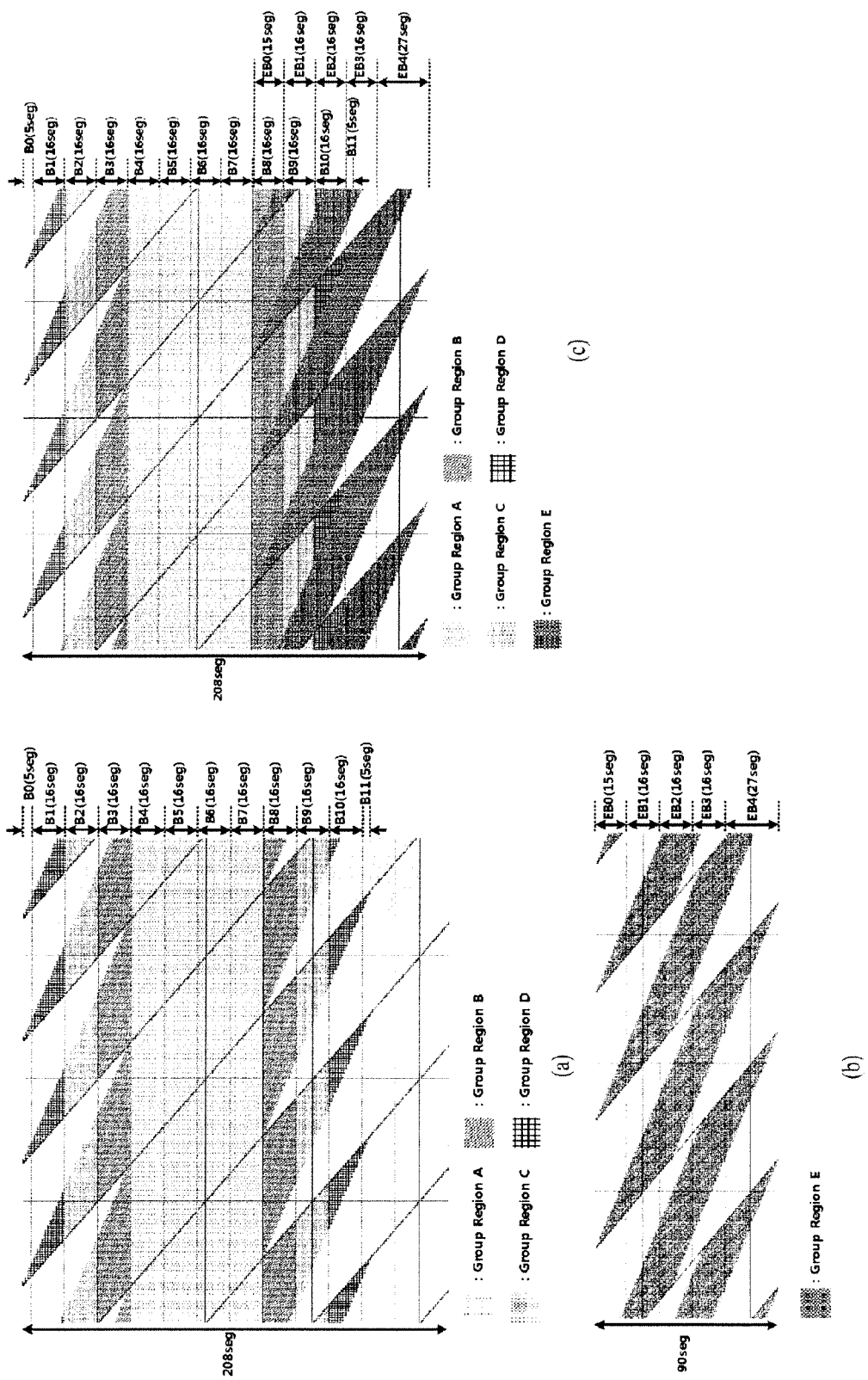
FIGS. 5(a) to (c) illustrate a general view showing a structure of a group within a segment domain according to an embodiment of the present invention.

FIGS. 5(a) to (c) illustrate a general view showing a structure of a group within a segment domain according to an embodiment of the present invention. More specifically, FIG. 5 corresponds to a group structure after being processed with data interleaving. Particularly, the data structure shown in FIG. 5 is transmitted to the receiving system. In other words, a data packet is data-interleaved and distributed (or dispersed) to a plurality of segments, thereby being transmitted to the receiving system.

FIG. 5(a) shows an example of regions A, B, C, and D being distributed to 170 data segments after being data-interleaved. FIG. 5(b) shows an example of region E being distributed to 90 data segments after being data-interleaved, when region E exists within the group. Furthermore, FIG. 5(c) shows an example of a data group configured of regions A, B, C, D, and E being distributed to 208 data segments after being interleaved. At this point, since a data packet of 207 bytes has the same data size as one data segment, the packet prior to being data-interleaved may also be used as the concept of a segment.

FIG. 5(a) illustrates an example of dividing a region corresponding to the first 118 data packets among a total of 156 data packets within a data group, which is processed with data-interleaving, into 12 M/H blocks (MH blocks B0~B11). Also, according to the embodiment of the present invention, each of the MH blocks B1~B10 has the length of 16 segments, and MH block B0 and MH block B11 each has the length of 5 segments.

Herein, when it is assumed that one group includes at least regions A, B, C, and D, depending upon the characteristics of each M/H block within the group, each M/H block may be included in any one of region A to region D. At this point, according to the embodiment of the present invention, and depending upon the level (or degree) of interference of the main service data, each M/H block is included in any one region among region A to region D.

Herein, the group is divided into multiple regions so that each region can be used for a different purpose. More specifically, this is because a region having no interference from the main service data may yield a more robust data receiving performance (or capability) that a region having interference from the main service data. Also, when a system transmitting data by inserting known data, which are pre-known in accordance with an agreement between the receiving system and the transmitting system, in a group is applied, known data having a predetermined length may be periodically inserted in a region where there is no interference from the main service data (i.e., in a region that is not mixed with the main service data). However, in a region having interference from the main service data, due to the interference of the main service data, it is difficult to periodically insert known data, and it is also difficult to insert consecutively long known data.

M/H block B4 to M/H block B7 within the group shown in FIG. 5(a) collectively correspond to a region having no interference from the main service data. According to the embodiment of the present invention, the region including M/H block B4 to M/H block B7 will be referred to as region A (=B4+B5+B6+B7).

M/H block B3 and M/H block B8 within the group shown in FIG. 5(a) collectively correspond to a region having little interference from the main service data. According to the embodiment of the present invention, the region including M/H block B3 and M/H block B8 will be referred to as region B (=B3+B8).

M/H block B2 and M/H block B9 within the group shown in FIG. 5(a) collectively correspond to a region having a level of interference from the main service data greater than that of region B. According to the embodiment of the present invention, the region including M/H block B2 and M/H block B9 will be referred to as region C (=B2+B9).

M/H block B0 to M/H block B1 and M/H block B10 to M/H block B11 within the group shown in FIG. 5(a) collectively correspond to a region having a level of interference from the main service data greater than that of region C. According to the embodiment of the present invention, the region including M/H block B0 to M/H block B1 and M/H block B10 to M/H block B11 will be referred to as region D (=B0+B1+B10+B11).

FIG. 5(b) shows an example of dividing a region, which corresponds to the last 38 data packets among the total of 156 data packets within a group of a data structure after being processed with data-interleaving, into 5 extended M/H blocks (extended MH blocks EB0~EB4). Also, according to the embodiment of the present invention, each of the extended M/H blocks EB1~EB3 has the length of 16 segments. Additionally, according to the embodiment of the present invention, the extended M/H block EB0 has the length of 15 segments, and the extended M/H block EB4 has the length of 27 segments.

Furthermore, according to the embodiment of the present invention, the region including all of the extended M/H blocks EB0 to EB4 shown in FIG. 5(b) will be referred to as region E (=EB0+EB1+EB2+EB3+EB4).

FIG. 5(c) is identical to an example of overlapping FIG. 5(a) and FIG. 5(b). Herein, the position of the first segment of the extended M/H block EB0 corresponds to the same segment as the second segment of M/H block B8. And, with the exception for the first segment of M/H block B8, all of the remaining segments respectively overlap with all of the segments of the extended M/H block EB0. Also, all segments of M/H block B9 respectively overlap with all segments of the extended M/H block EB1, and all segments of M/H block B10 respectively overlap with all segments of the extended M/H block EB2. Finally, all segments of M/H block B11 overlap with the first 5 segments of the extended M/H block EB3.

In the above case, even when the segments of the M/H blocks and the extended M/H blocks overlap with each other, all M/H blocks include only data corresponding to first 118 data packets within a group before data interleaving, and all extended M/H blocks include last 38 data packets within a group before data interleaving.

The mobile service data being assigned to one group may be broadly categorized into two different types of mobile modes.

Herein, one of the mobile modes is referred to as a first mobile mode or CMM (Core Mobile Mode), and the other mobile mode is referred to as a second mobile mode or EMM (Extended Mobile Mode). Also, the first mobile mode and the second mobile mode are collectively referred to as a Scalable Full Channel Mobile Mode (SFCMM).

The first mobile mode corresponds to a mode that is compatible with the conventional mobile broadcasting system. And, the second mobile mode may be either compatible or non-compatible with the conventional mobile service data.

However, the second mobile mode corresponds to a mode that transmits data that cannot be recognized (or acknowledged) by the conventional mobile broadcasting system.

Only mobile service data of the first mobile mode may be allocated to one group, or only mobile service data of the second mobile mode may be allocated to the one group. Alternatively, both the mobile service data of the first mobile mode and the mobile service data of the second mobile mode may both be allocated to one group.

FIGS. 6(a) to (d) illustrate various examples of mobile service data of the first mobile mode and mobile service data of the second mobile mode being allocated to a group.

(a) of FIG. 6 shows an example wherein the mobile service data of the first mobile mode are allocated to regions A, B, C, and D within the data group, and wherein the mobile service data of the second mobile mode are not allocated. In this case, region E does not exist in the group, and main service data are allocated (or assigned) to the respective region. According to the embodiment of the present invention, this exemplary case will be referred to as group type 0.

(b) of FIG. 6 shows an example wherein the mobile service data of the first mobile mode are allocated (or assigned) to regions A, B, C, and D within the data group, and wherein the mobile service data of the second mobile mode are allocated to region E. According to the embodiment of the present invention, this exemplary case will be referred to as group type 1.

(c) of FIG. 6 shows an example wherein the mobile service data of the first mobile mode are allocated (or assigned) to regions A and B, within the data group, and wherein the mobile service data of the second mobile mode are allocated to regions C, D, and E. According to the embodiment of the present invention, this exemplary case will be referred to as group type 2.

(d) of FIG. 6 shows an example wherein the mobile service data of the second mobile mode are allocated to regions A, B, C, D, and E within the data group, and wherein the mobile service data of the first mobile mode are not allocated. According to the embodiment of the present invention, this exemplary case will be referred to as group type 3.

As described above, the group type is decided depending upon how the 156 data packets being included in one data group are used. In other words, the group type is decided depending upon which one of regions A, B, C, and D will be used for the mobile service data of the second mobile mode.

Meanwhile, one data group may include a maximum of 156 data packets. Herein, among the 156 data packets, 118 data packets are assigned to regions A, B, C, and D, and a portion of the remaining 38 data packets or all of the remaining 38 data packets are assigned to region E. At this point, none of the data packets may be assigned to region E. In this case, as shown in (a) of FIG. 6, region E does not exist in the corresponding data group. In the data group that does not include a region E, mobile service data of the first mobile mode are assigned (or allocated) to the 118 data packets included in region A, B, C, and D, and main service data are assigned to the remaining 38 data packets. More specifically, in the data group that does not include region E, mobile service data of the second mobile mode are not assigned.

This indicates that only the mobile service data of the second mobile mode are assigned to region E within the data group, as shown in (b) to (d) of FIG. 6. More specifically, the mobile service data of the first mobile mode Furthermore, in a data group including region E, the mobile service data of the second mobile mode may be further assigned to at least one of regions A, B, C, and D.

If the mobile service data of the second mobile mode are assigned to all of the regions A, B, C, D, and E, as shown in (d) of FIG. 6, mobile service data of the first mobile mode cannot be assigned to the corresponding data group. With the exception for the case wherein the mobile service data of the second mobile mode are assigned to all of the regions A, B, C, D, and E, as shown in (d) of FIG. 6, the mobile service data of the first mobile mode are assigned to at least one of regions A, B, C, and D.

Also, even when region E does not exist is a specific data group, the number of data packets included in region E may vary. More specifically, region E may include a number of data packets ranging from a minimum of 0 data packet to a maximum of 38 data packets.

FIGS. 7(a) to (f) illustrate an example of a mobile service data packet being allocated to region E within the data group according to an embodiment to the present invention.

Figure 7:
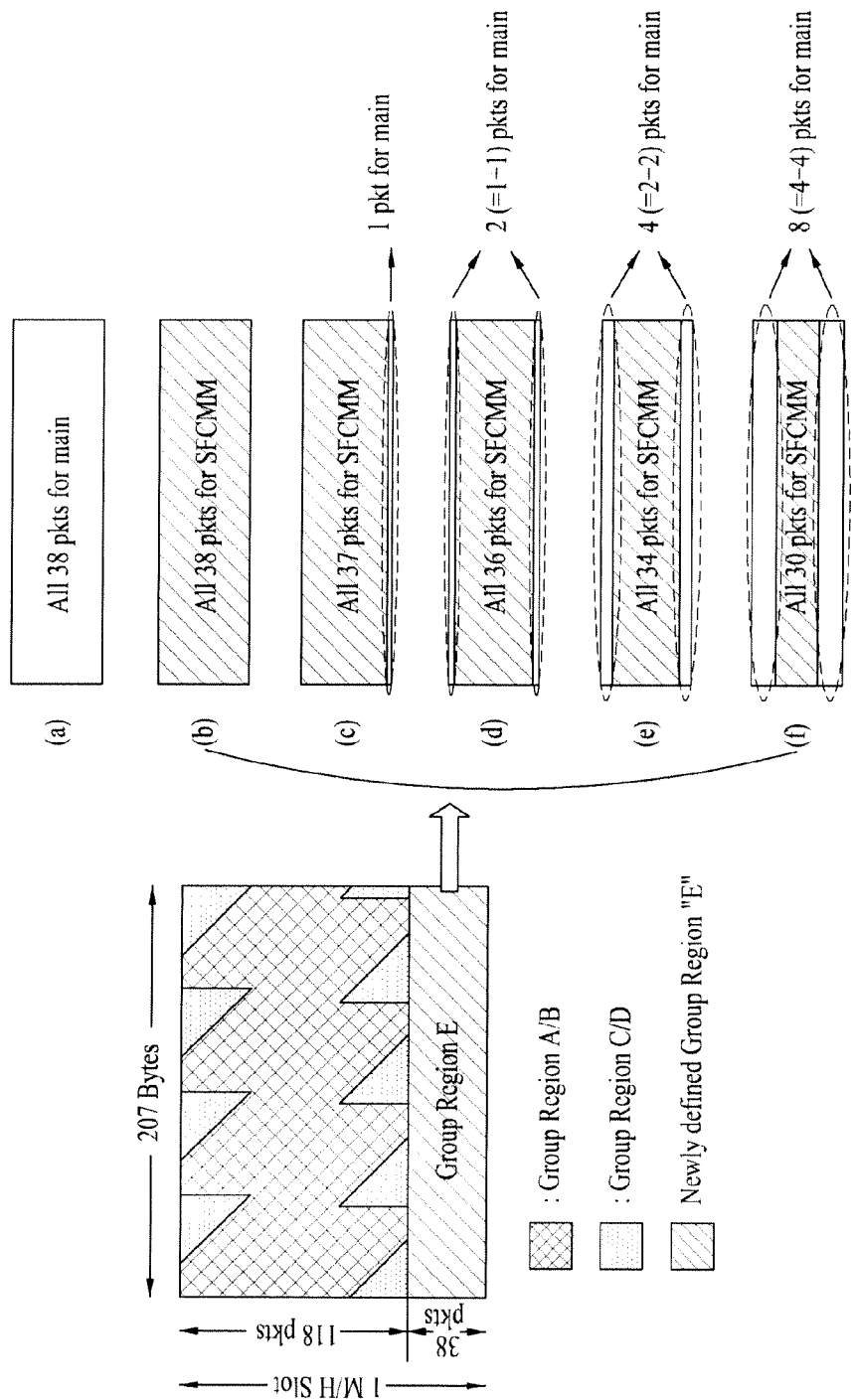
FIGS. 7(a) to (f) illustrate an example of a mobile service data packet being allocated to region E within the data group according to an embodiment to the present invention.

(a) of FIG. 7 shows an example of region E not being assigned (or allocated). Herein, main service data are assigned to the 38 data packets within the corresponding data group. More specifically, data packets that are used for mobile services of the second mobile mode do not exist. In this case, according to the embodiment of the present invention, regions, A, B, C, and D of the corresponding group are also not used for the mobile services of the second mobile mode.

(b) of FIG. 7 shows an example of 38 data packets being assigned to region E. In this case, main service data are not assigned to the corresponding group. More specifically, the 38 data packets that are included in region E may be used for mobile services of the second mobile mode.

(c) of FIG. 7 shows an example of 37 data packets being assigned to region E. In this case, main service data are assigned to one data packet within the corresponding data group. According to the embodiment of the present invention, among the 38 data packets, the slowest data packet (i.e., the data packet chronologically placed in the last position) is excluded from region E, and the one data packet that is excluded from region E is used for the main service. More specifically, the 37 data packets included in region E may be used for the mobile services of the second mobile mode.

(d) of FIG. 7 shows an example of 36 data packets being assigned to region E. In this case, main service data are assigned to two data packets within the corresponding data group. According to the embodiment of the present invention, among the 38 data packets, the fastest data packet (i.e., the data packet chronologically placed in the first position) and the slowest data packet (i.e., the data packet chronologically placed in the last position) are excluded from region E, and the two data packets that are excluded from region E are used for the main services. More specifically, the 36 data packets included in region E may be used for the mobile services of the second mobile mode.

(e) of FIG. 7 shows an example of 34 data packets being assigned to region E. In this case, main service data are assigned to four (4) data packets within the corresponding data group. According to the embodiment of the present invention, among the 38 data packets, the two fastest data packets (i.e., the two data packets chronologically placed in the first two positions) and the two slowest data packets (i.e., the two data packets chronologically placed in the last two positions) are excluded from region E, and the four data packets that are excluded from region E are used for the main services. More specifically, the 34 data packets included in region E may be used for the mobile services of the second mobile mode.

(f) of FIG. 7 shows an example of 30 data packets being assigned to region E. In this case, main service data are assigned to eight (8) data packets within the corresponding data group. According to the embodiment of the present invention, among the 38 data packets, the four fastest data packets (i.e., the four data packets chronologically placed in the first four positions) and the four slowest data packets (i.e., the four data packets chronologically placed in the last four positions) are excluded from region E, and the eight data packets that are excluded from region E are used for the main services. More specifically, the 30 data packets included in region E may be used for the mobile services of the second mobile mode.

More specifically, among the remaining 38 data packets excluding the 118 data packets within the data group, region E includes the data packets that are used for the mobile service of the second mobile mode.

According to the embodiment of the present invention, each group type is further segmented based upon the size of region E.

FIG. 8 illustrates an example of each group type being segmented based upon the size of region E according to an embodiment of the present invention.

At this point, group type 0 (GT0) corresponds to when region E does not exist, and, in this case, further segmentation is not performed. In the data group of group type 0, a primary group division includes regions A, B, C, and D or includes regions A and B. Also, either a secondary group division does not exist, or a secondary group division includes regions C and D.

Depending upon the size of region E, group type 1 (GT1) may be further segmented to 5 group types (i.e., group types 1-0, 1-1, 1-2, 1-4, and 1-8). In the data group of group type 1, a primary group division includes regions A, B, C, and D, and a secondary group division includes region E.

At this point, group type 1-0 (GT1-0) corresponds to a group type configured by combining (b) of FIG. 6 and (b) of FIG. 7. Herein, the mobile service data of the second mobile mode are assigned (or allocated) only to region E, and region E includes 38 data packets. Group type 1-1 (GT1-1) corresponds to a group type configured by combining (b) of FIG. 6 and (c) of FIG. 7. Herein, the mobile service data of the second mobile mode are assigned (or allocated) only to region E, and region E includes 37 data packets. Group type 1-2 (GT1-2) corresponds to a group type configured by combining (b) of FIG. 6 and (d) of FIG. 7. Herein, the mobile service data of the second mobile mode are assigned (or allocated) only to region E, and region E includes 36 data packets. Group type 1-4 (GT1-4) corresponds to a group type configured by combining (b) of FIG. 6 and (e) of FIG. 7. Herein, the mobile service data of the second mobile mode are assigned (or allocated) only to region E, and region E includes 34 data packets. And, group type 1-8 (GT1-8) corresponds to a group type configured by combining (b) of FIG. 6 and (f) of FIG. 7. Herein, the mobile service data of the second mobile mode are assigned (or allocated) only to region E, and region E includes 30 data packets.

Depending upon the size of region E, group type 2 (GT2) may be further segmented to 5 group types (i.e., group types 2-0, 2-1, 2-2, 2-4, and 2-8). In the data group of group type 2, a primary group division includes regions A and B, and a secondary group division includes regions C, D, and E.

At this point, group type 2-0 (GT2-0) corresponds to a group type configured by combining (c) of FIG. 6 and (b) of FIG. 7. Herein, the mobile service data of the second mobile mode are assigned (or allocated) only to regions C, D, and E. Herein, region E includes 38 data packets. Group type 2-1 (GT2-1) corresponds to a group type configured by combining (c) of FIG. 6 and (c) of FIG. 7. Herein, the mobile service data of the second mobile mode are assigned (or allocated) only to regions C, D, and E. Herein, region E includes 37 data packets. Group type 2-2 (GT2-2) corresponds to a group type configured by combining (c) of FIG. 6 and (d) of FIG. 7. Herein, the mobile service data of the second mobile mode are assigned (or allocated) only to regions C, D, and E. Herein, region E includes 36 data packets. Group type 2-4 (GT2-4) corresponds to a group type configured by combining (c) of FIG. 6 and (e) of FIG. 7. Herein, the mobile service data of the second mobile mode are assigned (or allocated) only to regions C, D, and E. Herein, region E includes 34 data packets. And, group type 2-8 (GT2-8) corresponds to a group type configured by combining (c) of FIG. 6 and (f) of FIG. 7. Herein, the mobile service data of the second mobile mode are assigned (or allocated) only to regions C, D, and E. Herein, region E includes 30 data packets.

Depending upon the size of region E, group type 3 (GT3) may be further segmented to 5 group types (i.e., group types 3-0, 3-1, 3-2, 3-4, and 3-8). In the data group of group type 3, a primary group division includes regions A, B, C, D, and E, and a secondary group division does not exist.

At this point, group type 3-0 (GT3-0) corresponds to a group type configured by combining (d) of FIG. 6 and (b) of FIG. 7. Herein, the mobile service data of the second mobile mode are assigned (or allocated) only to regions A, B, C, D, and E. Herein, region E includes 38 data packets. Group type 3-1 (GT3-1) corresponds to a group type configured by combining (d) of FIG. 6 and (c) of FIG. 7. Herein, the mobile service data of the second mobile mode are assigned (or allocated) only to regions A, B, C, D, and E. Herein, region E is configured of 37 data packets. Group type 3-2 (GT3-2) corresponds to a group type configured by combining (d) of FIG. 6 and (d) of FIG. 7. Herein, the mobile service data of the second mobile mode are assigned (or allocated) only to regions A, B, C, D, and E. Herein, region E includes 36 data packets. Group type 3-4 (GT3-4) corresponds to a group type configured by combining (d) of FIG. 6 and (e) of FIG. 7. Herein, the mobile service data of the second mobile mode are assigned (or allocated) only to regions A, B, C, D, and E. Herein, region E includes 34 data packets. And, group type 3-8 (GT3-8) corresponds to a group type configured by combining (d) of FIG. 6 and (f) of FIG. 7. Herein, the mobile service data of the second mobile mode are assigned (or allocated) only to regions A, B, C, D, and E. Herein, region E includes 30 data packets.

Herein, each group type has a respective group map.

Group type 0 has Group map 0 (GM0). In Group map 0, region E does not exist.

Group type 1 has Group map 1 (GM1). Group map 1 may be further segmented to 5 group maps (i.e., Group maps 1-0, 1-1, 1-2, 1-4, and 1-8) depending upon the number of mobile service data packets of region E. Herein, Group type 1-0 uses Group map 1-0 (GM1-0), Group type 1-1 uses Group map 1-1 (GM1-1), and Group type 1-2 uses Group map 1-2 (GM1-2). Also, Group type 1-4 uses Group map 1-4 (GM1-4), and Group type 1-8 uses Group map 1-8 (GM1-8).

Group type 2 has Group map 2 (GM2). Group map 2 may be further segmented to 5 group maps (i.e., Group maps 2-0, 2-1, 2-2, 2-4, and 2-8) depending upon the number of mobile service data packets of region E. Herein, Group type 2-0 uses Group map 2-0 (GM2-0), Group type 2-1 uses Group map 2-1 (GM2-1), and Group type 2-2 uses Group map 2-2 (GM2-2).

Also, Group type 2-4 uses Group map 2-4 (GM2-4), and Group type 2-8 uses Group map 2-8 (GM2-8).

Group type 3 also has Group map 2 (GM2) just as Group type 2. Group map 2 may be further segmented to 5 group maps (i.e., Group maps 2-0, 2-1, 2-2, 2-4, and 2-8) depending upon the number of mobile service data packets of region E. Herein, Group type 3-0 uses Group map 2-0 (GM2-0), Group type 3-1 uses Group map 2-1 (GM2-1), and Group type 3-2 uses Group map 2-2 (GM2-2). Also, Group type 3-4 uses Group map 2-4 (GM2-4), and Group type 3-8 uses Group map 2-8 (GM2-8).

FIG. 9 to FIG. 30 illustrate exemplary group maps in packet domains and segment domains for each group type according to the embodiment of the present invention.

Figure 9:
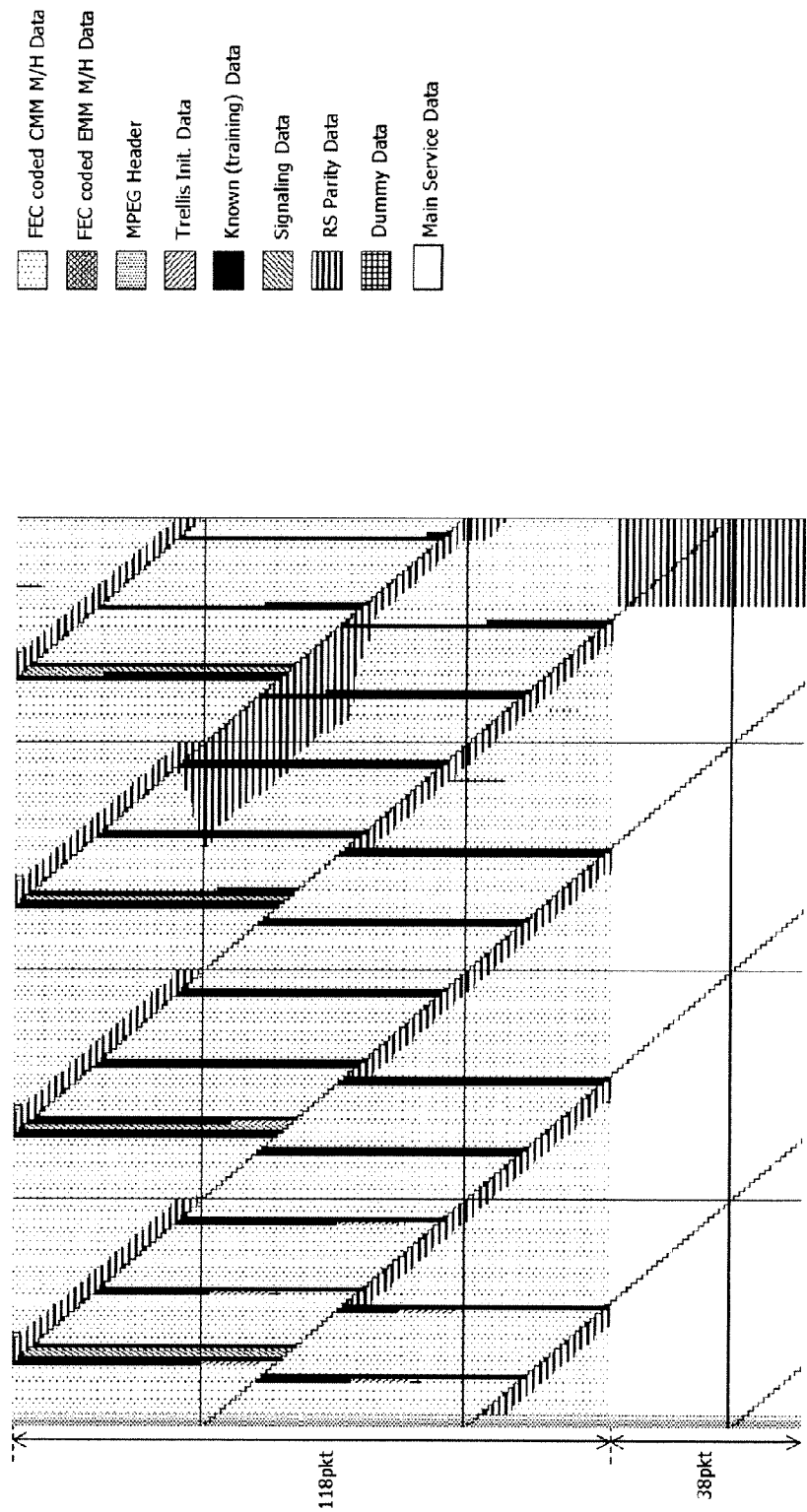
FIG. 9 illustrates a group structure of a packet domain of Group map 0 (GM0), when the group type is 0 (i.e., G0), according to an embodiment of the present invention.
Figure 10:
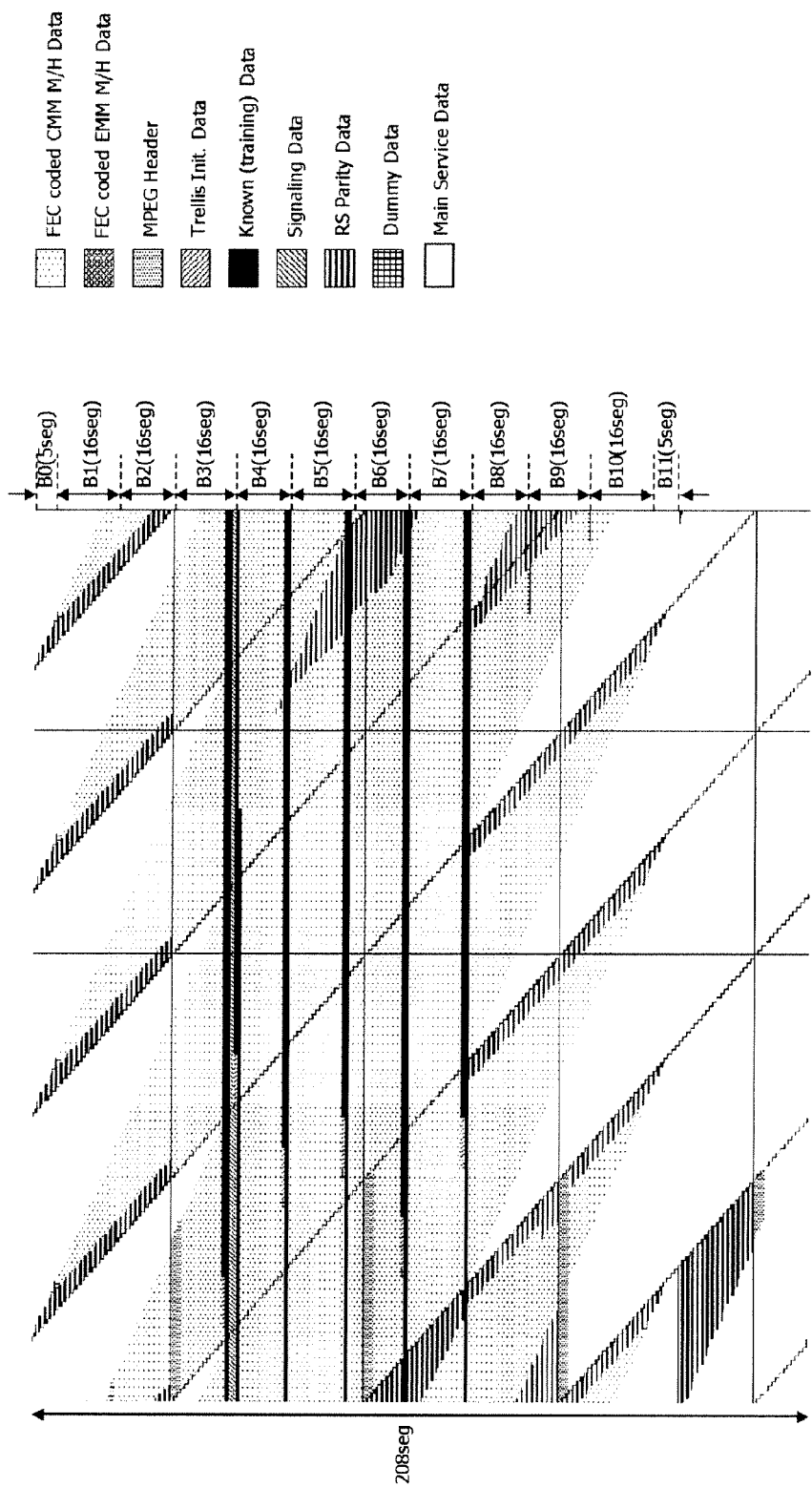
FIG. 10 illustrates a group structure of a segment domain of Group map 0 according to an embodiment of the present invention.

At this point, FIG. 9 illustrates a group structure of a packet domain of Group map 0 (GM0), when the group type is 0 (i.e., G0), according to an embodiment of the present invention. Herein, FIG. 9 corresponds to a group structure prior to being processed with data-interleaving. FIG. 10 illustrates a group structure of a segment domain of Group map 0 according to an embodiment of the present invention. Herein, FIG. 10 corresponds to a group structure after being processed with data-interleaving.

M/H block B4 to M/H block B7 within the group shown in FIG. 10 correspond to a region having no interference from the main service data. In this example, long known data sequences are inserted in the very end of each M/H block. More specifically, in case of region A having a known data sequence for each M/H block, as described above, the receiving system may use the channel information that can be acquired from the known data so as to perform equalization. Therefore, among region A to region D, region A may yield the strongest (or most outstanding) equalization performance.

M/H block B3 and M/H block B8 within the group shown in FIG. 10 correspond to a region having little interference from the main service data. In this example, a long known data sequence is inserted only in the very end of M/H block B3. More specifically, in case of region B, as described above, channel information that can be acquired by the receiving system from the known data is limited. Therefore, region B may yield an equalization performance less strong (or outstanding) than region A. Nevertheless, region B may yield an equalization performance stronger than regions C/D.

M/H block B2 and M/H block B9 within the group shown in FIG. 10 correspond to a region having more interference from the main service data as compared to region B. In this example, long known data sequences cannot be inserted in either of the very beginning or very end of both M/H blocks. M/H block B0 to M/H block B1 and M/H block B 10 to M/H block B 11 within the group shown in FIG. 10 correspond to a region having more interference from the main service data as compared to region C. Similarly, long known data sequences cannot be inserted in either of the very beginning or very end of both M/H blocks. Herein, since regions C/D are place further apart from the known data sequences, when the channel changes frequently and at a fast rate, the receiving performance can be poor.

Based upon FIG. 10, a field sync may be positioned between M/H block B2 and M/H block B3, and this may indicate that the corresponding slot has an offset of 37 data packets with respect to the corresponding VSB field.

Meanwhile, Group type 1 may be further segmented to group types (i.e., group types 1-0, 1-1, 1-2, 1-4, and 1-8). In the data group of group type 1, a primary group division is configured of regions A, B, C, and D, and a secondary group division is configured of region E. Group type 1 uses Group map 1, and Group map 1 may also be further segmented to 5 group maps (i.e., Group maps 1-0, 1-1, 1-2, 1-4, and 1-8) depending upon the number of mobile service data packets of region E.

FIG. 11 to FIG. 20 respectively illustrate examples of a group structure of Group map 1 in a packet domain and a segment domain according to the present invention.

Figure 11:
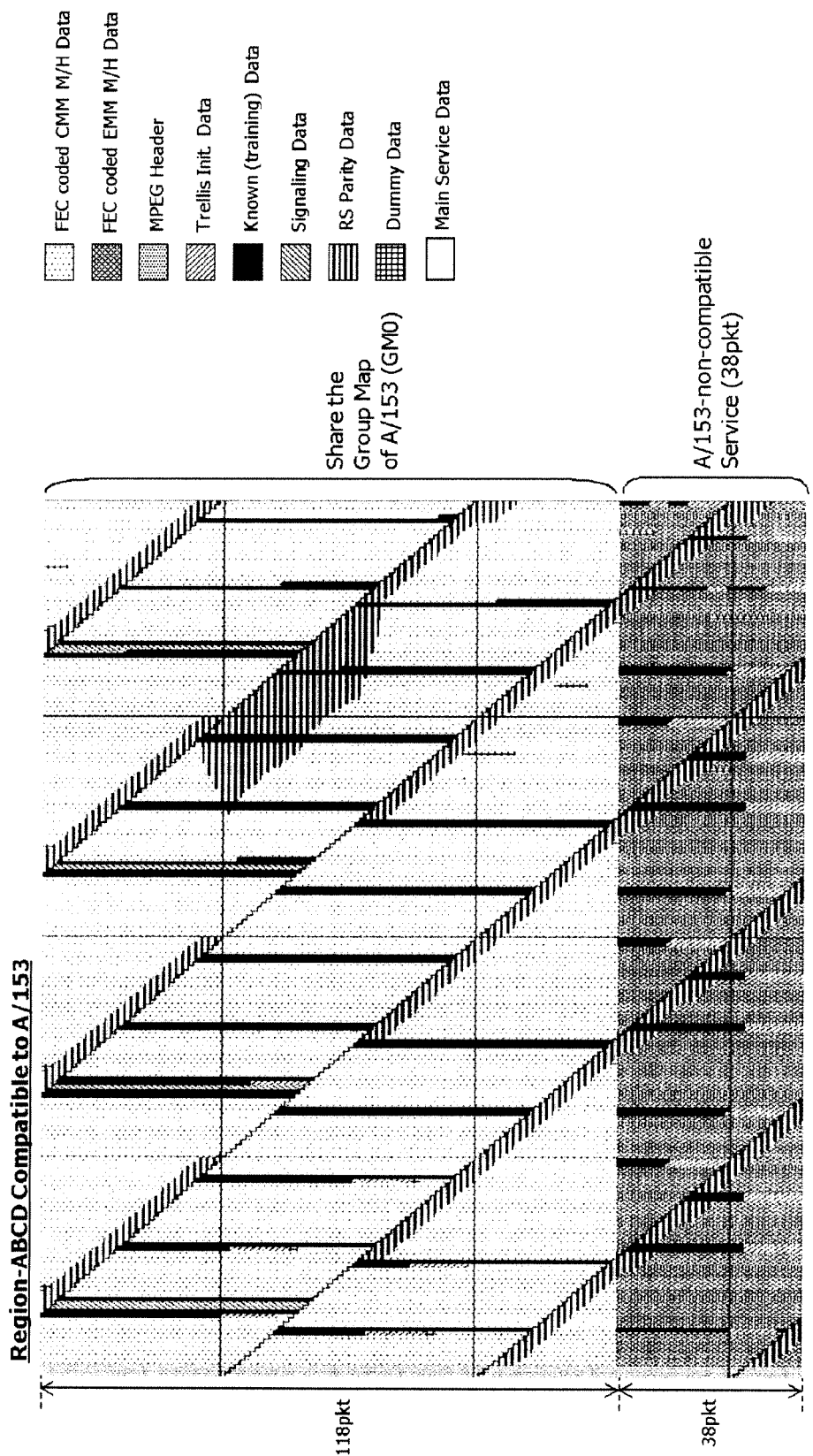
FIG. 11 illustrates a group structure of a packet domain of Group map 1-0 according to an embodiment of the present invention.
Figure 12:
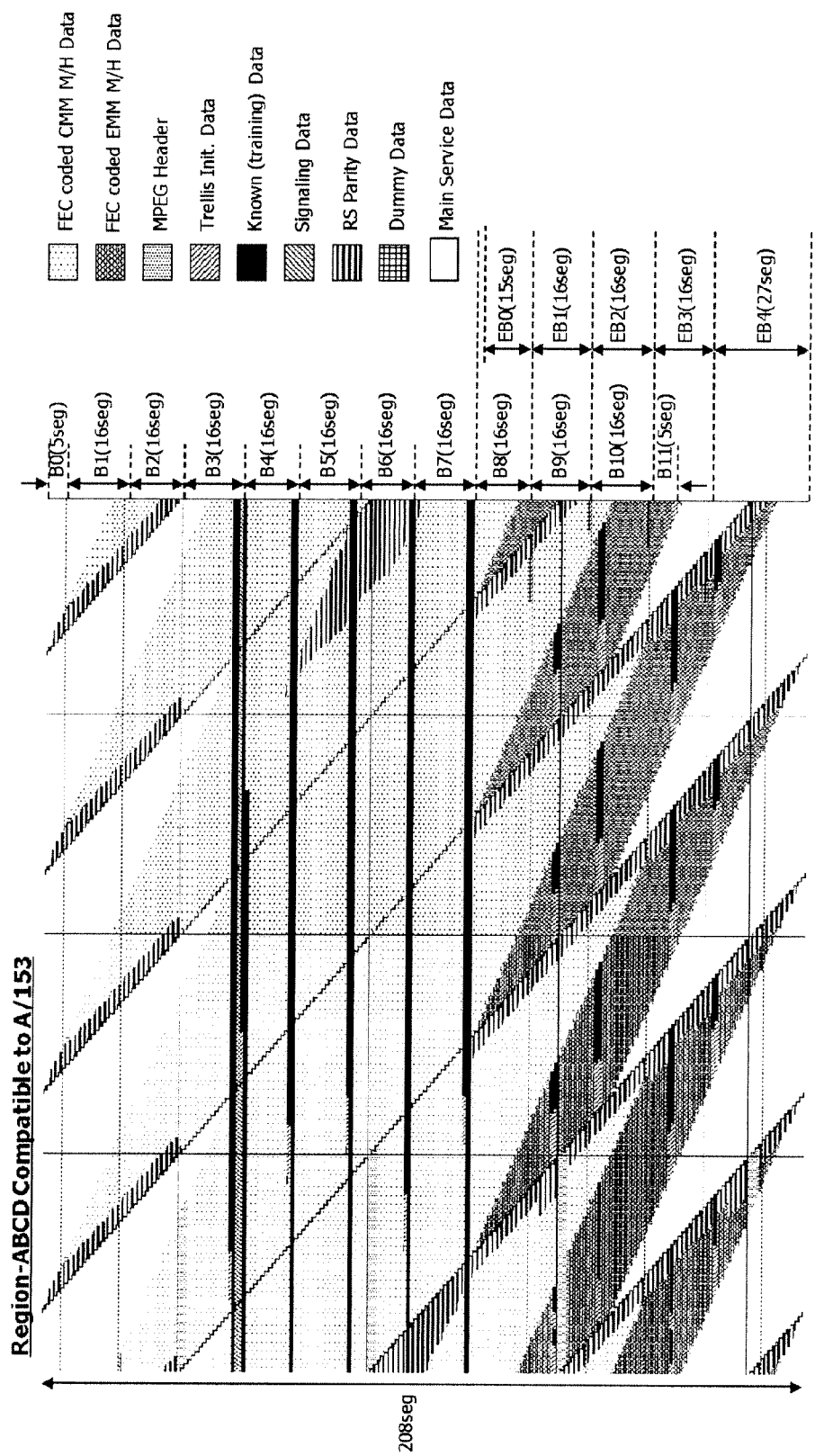
FIG. 12 illustrates a group structure of a segment domain of Group map 1-0 according to an embodiment of the present invention.

FIG. 11 illustrates a group structure of a packet domain of Group map 1-0 according to an embodiment of the present invention. Herein, FIG. 11 corresponds to a group structure prior to being processed with data-interleaving. FIG. 12 illustrates a group structure of a segment domain of Group map 1-0 according to an embodiment of the present invention. Herein, FIG. 12 corresponds to a group structure after being processed with data-interleaving.

Figure 13:
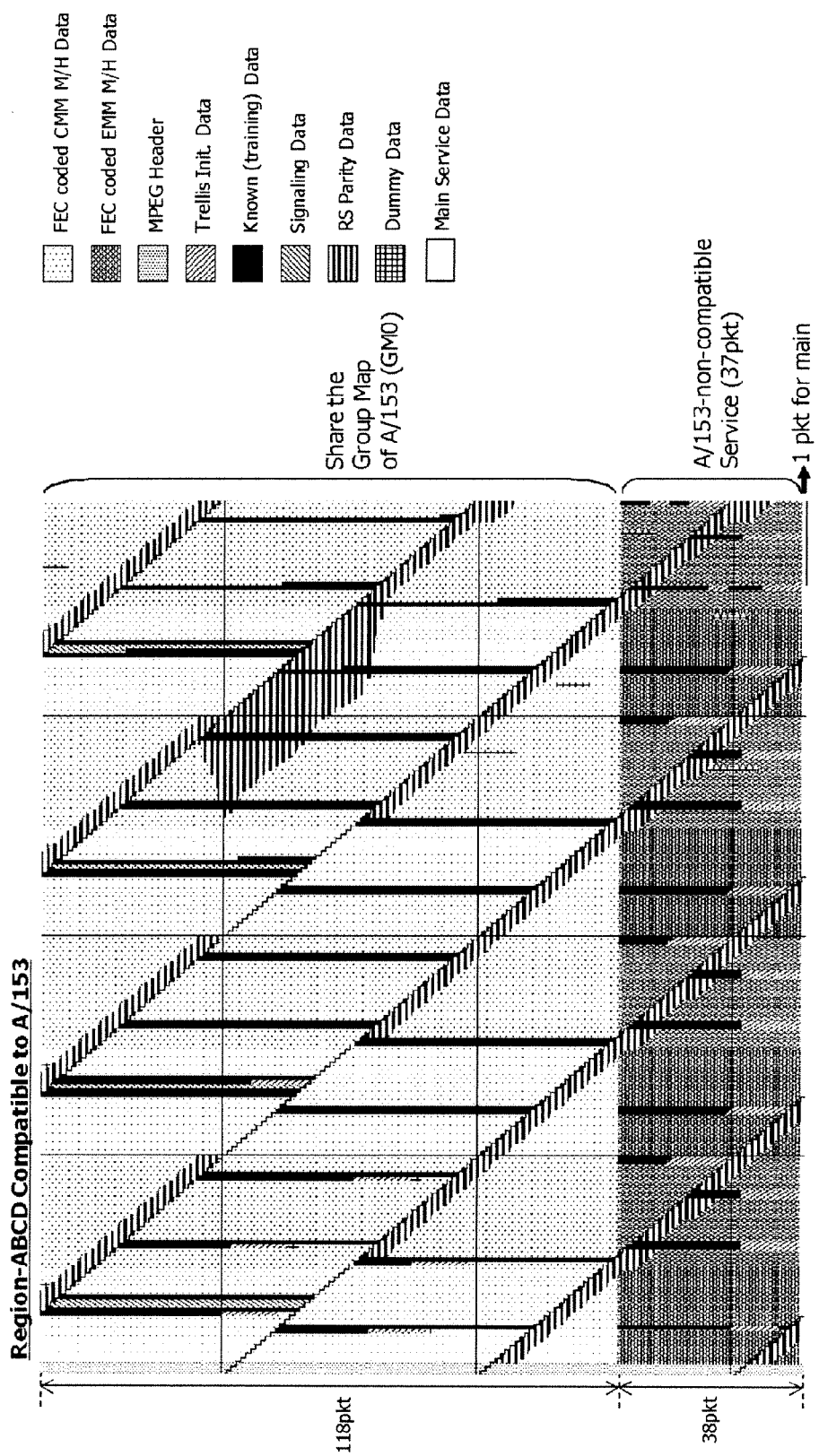
FIG. 13 illustrates a group structure of a packet domain of Group map 1-1 according to an embodiment of the present invention.
Figure 14:
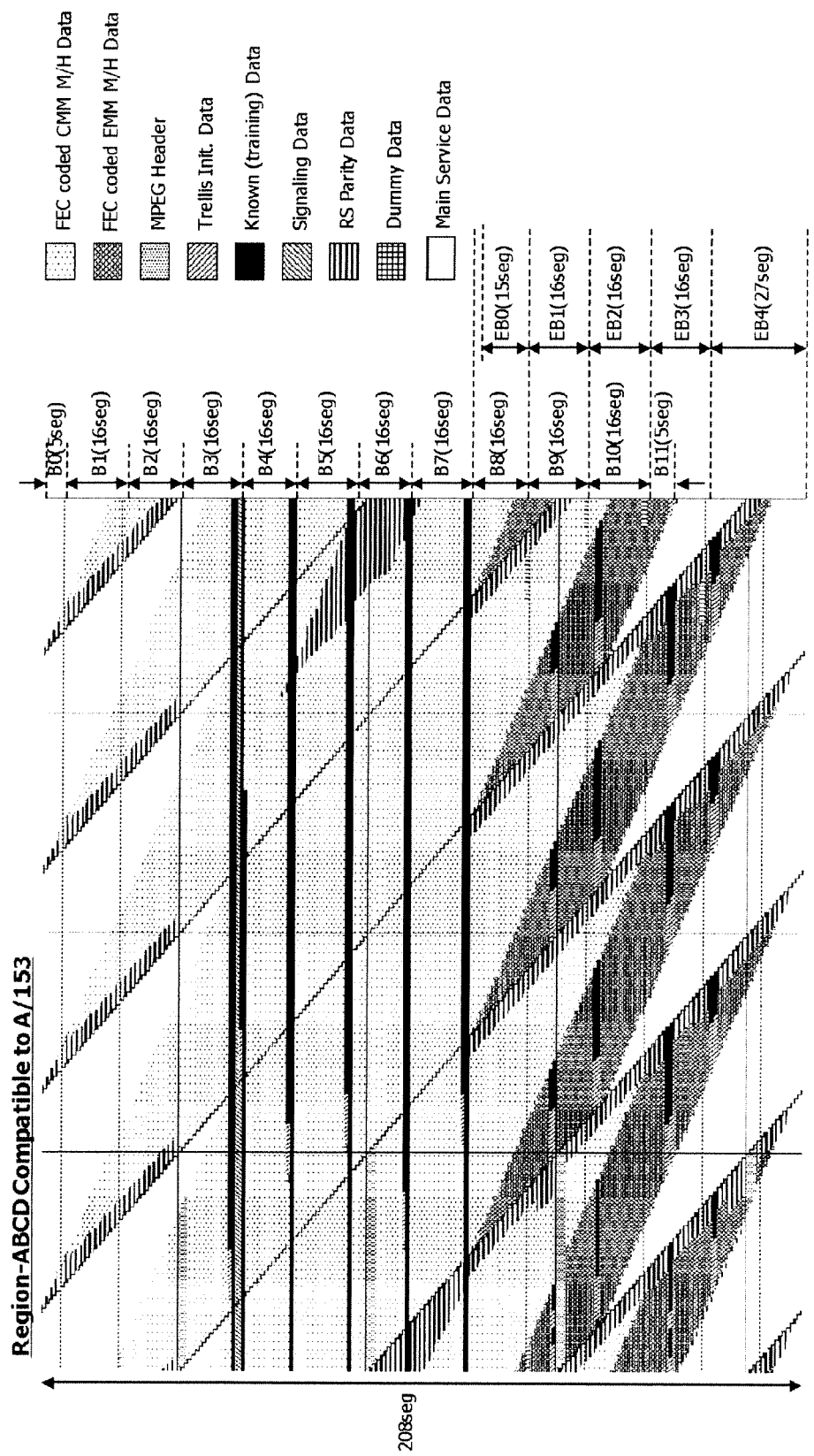
FIG. 14 illustrates a group structure of a segment domain of Group map 1-1 according to an embodiment of the present invention.

FIG. 13 illustrates a group structure of a packet domain of Group map 1-1 according to an embodiment of the present invention. Herein, FIG. 13 corresponds to a group structure prior to being processed with data-interleaving. FIG. 14 illustrates a group structure of a segment domain of Group map 1-1 according to an embodiment of the present invention. Herein, FIG. 14 corresponds to a group structure after being processed with data-interleaving.

Figure 15:
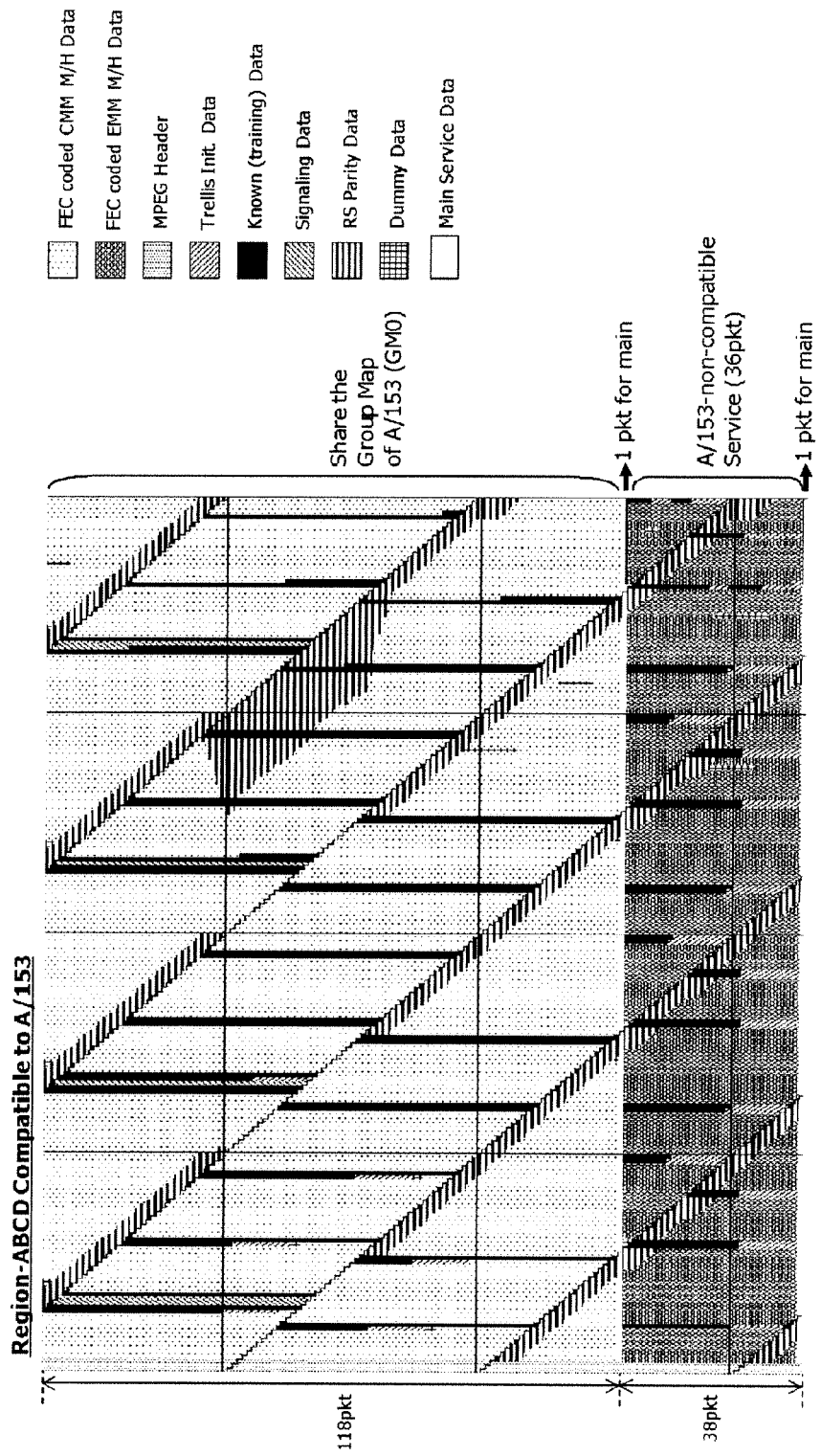
FIG. 15 illustrates a group structure of a packet domain of Group map 1-2 according to an embodiment of the present invention.
Figure 16:
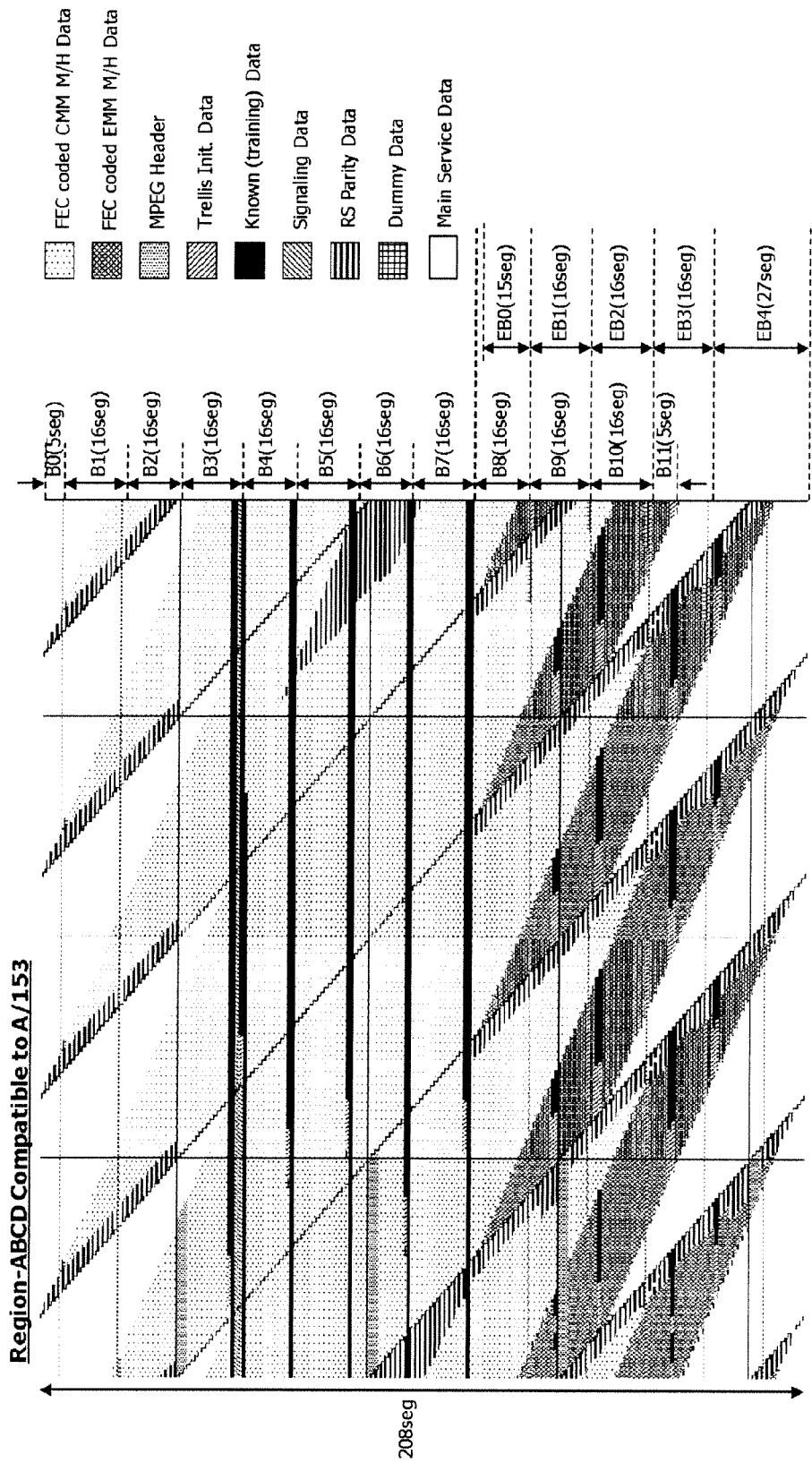
FIG. 16 illustrates a group structure of a segment domain of Group map 1-2 according to an embodiment of the present invention.

FIG. 15 illustrates a group structure of a packet domain of Group map 1-2 according to an embodiment of the present invention. Herein, FIG. 15 corresponds to a group structure prior to being processed with data-interleaving. FIG. 16 illustrates a group structure of a segment domain of Group map 1-2 according to an embodiment of the present invention. Herein, FIG. 16 corresponds to a group structure after being processed with data-interleaving.

Figure 17:
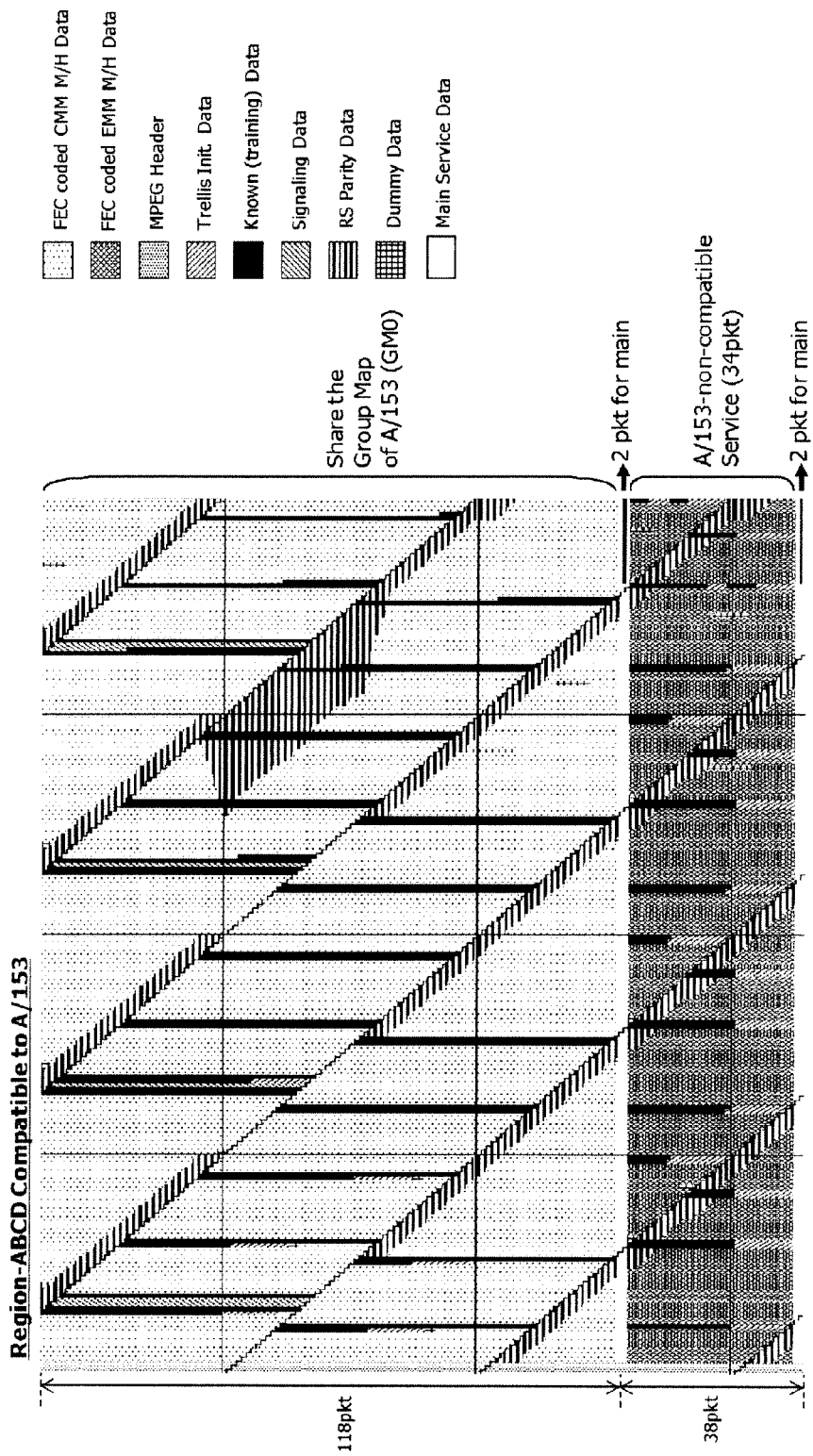
FIG. 17 illustrates a group structure of a packet domain of Group map 1-4 according to an embodiment of the present invention.
Figure 18:
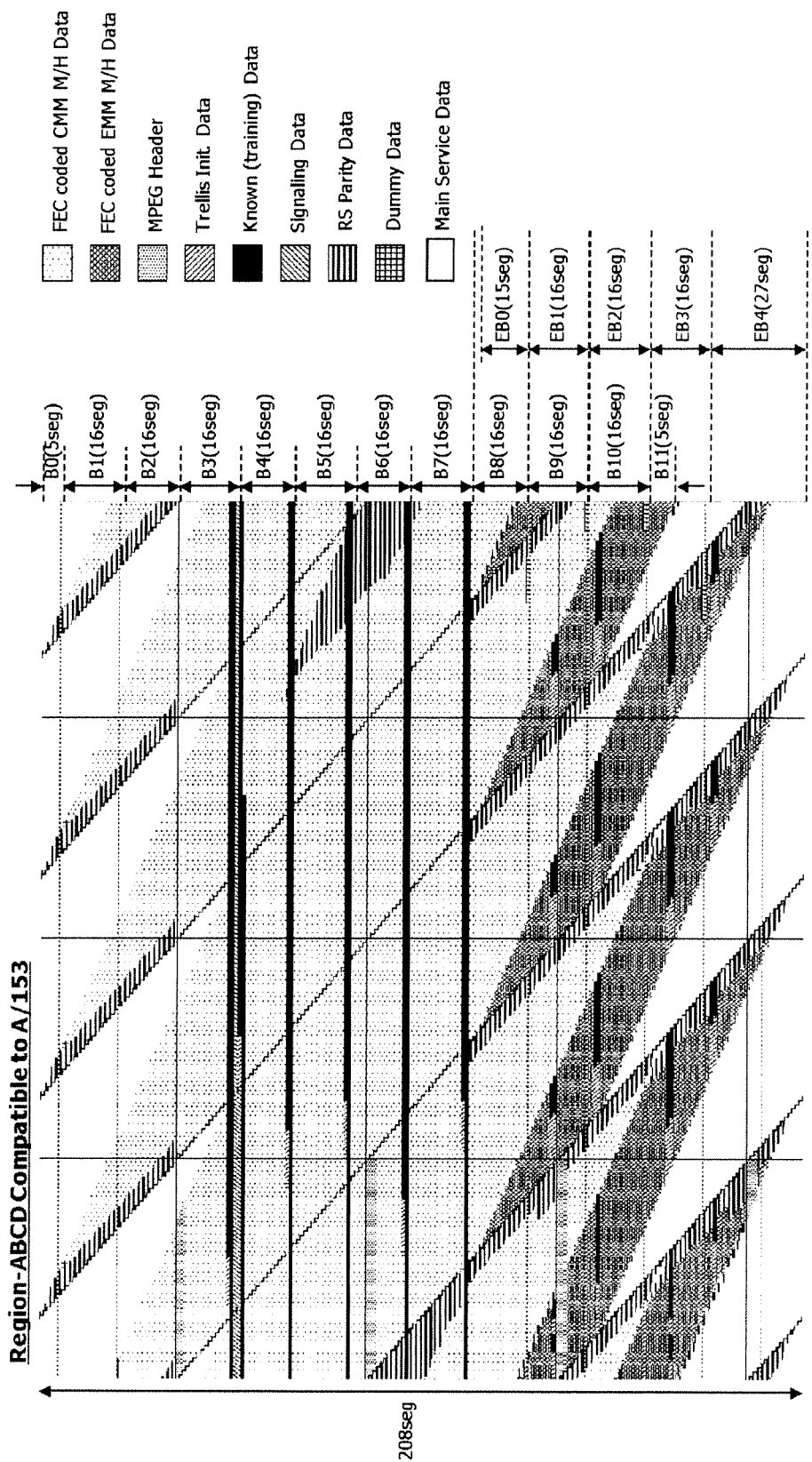
FIG. 18 illustrates a group structure of a segment domain of Group map 1-4 according to an embodiment of the present invention.

FIG. 17 illustrates a group structure of a packet domain of Group map 1-4 according to an embodiment of the present invention. Herein, FIG. 17 corresponds to a group structure prior to being processed with data-interleaving. FIG. 18 illustrates a group structure of a segment domain of Group map 1-4 according to an embodiment of the present invention. Herein, FIG. 18 corresponds to a group structure after being processed with data-interleaving.

Figure 19:
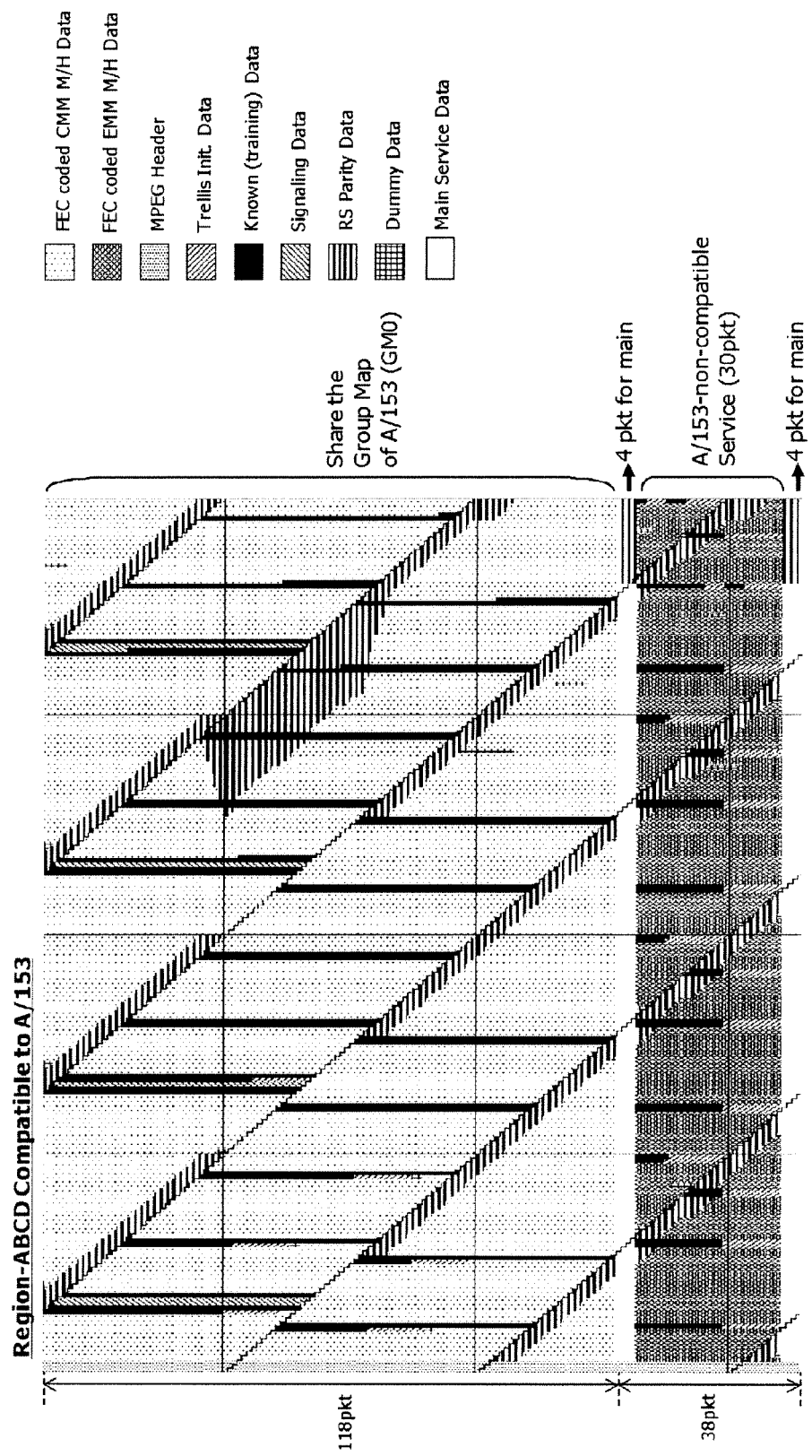
FIG. 19 illustrates a group structure of a packet domain of Group map 1-8 according to an embodiment of the present invention.
Figure 20:
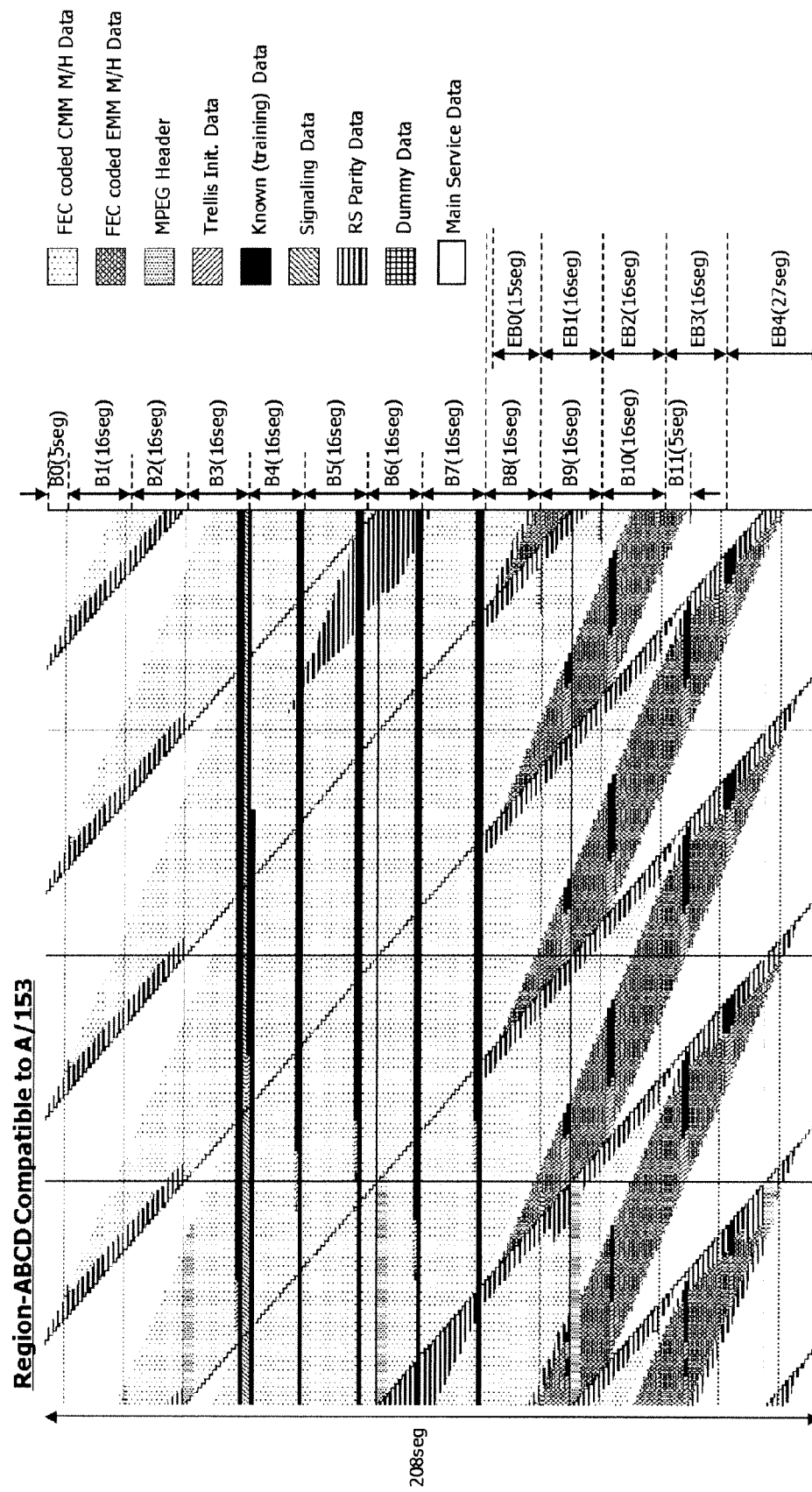
FIG. 20 illustrates a group structure of a segment domain of Group map 1-8 according to an embodiment of the present invention.

FIG. 19 illustrates a group structure of a packet domain of Group map 1-8 according to an embodiment of the present invention. Herein, FIG. 19 corresponds to a group structure prior to being processed with data-interleaving. FIG. 20 illustrates a group structure of a segment domain of Group map 1-8 according to an embodiment of the present invention. Herein, FIG. 20 corresponds to a group structure after being processed with data-interleaving.

Referring to the group structure of the segment domains shown in FIG. 11 to FIG. 20, a group is divided into 12 M/H blocks (MH blocks B0~B11) and 5 extended M/H blocks (MH blocks EB0~EB4).

At this point, a receiving system for the first mobile mode may receive and process only the data included in the 12 M/H blocks (MH blocks B0~B11). And, a receiving system for the second mobile mode may receive all data included in both the 12 M/H blocks (MH blocks B0~B11) and the 5 extended M/H blocks (MH blocks EB0~EB4), thereby processing both the mobile data of the first mobile mode and the mobile data of the second mobile mode. Furthermore, since B0 and B11 of the above-described 12 M/H blocks do not have any mobile data bytes, the receiving system is not required to receive the corresponding data.

Meanwhile, Group type 2 may be further segmented to group types (i.e., group types 2-0, 2-1, 2-2, 2-4, and 2-8). In the data group of group type 2, a primary group division is configured of regions A and B, and a secondary group division is configured of regions C, D, and E. Group type 2 uses Group map 2, and Group map 2 may also be further segmented to 5 group maps (i.e., Group maps 2-0, 2-1, 2-2, 2-4, and 2-8) depending upon the number of mobile service data packets of region E.

FIG. 21 to FIG. 30 respectively illustrate examples of a group structure of Group map 2 in a packet domain and a segment domain according to the present invention.

Figure 21:
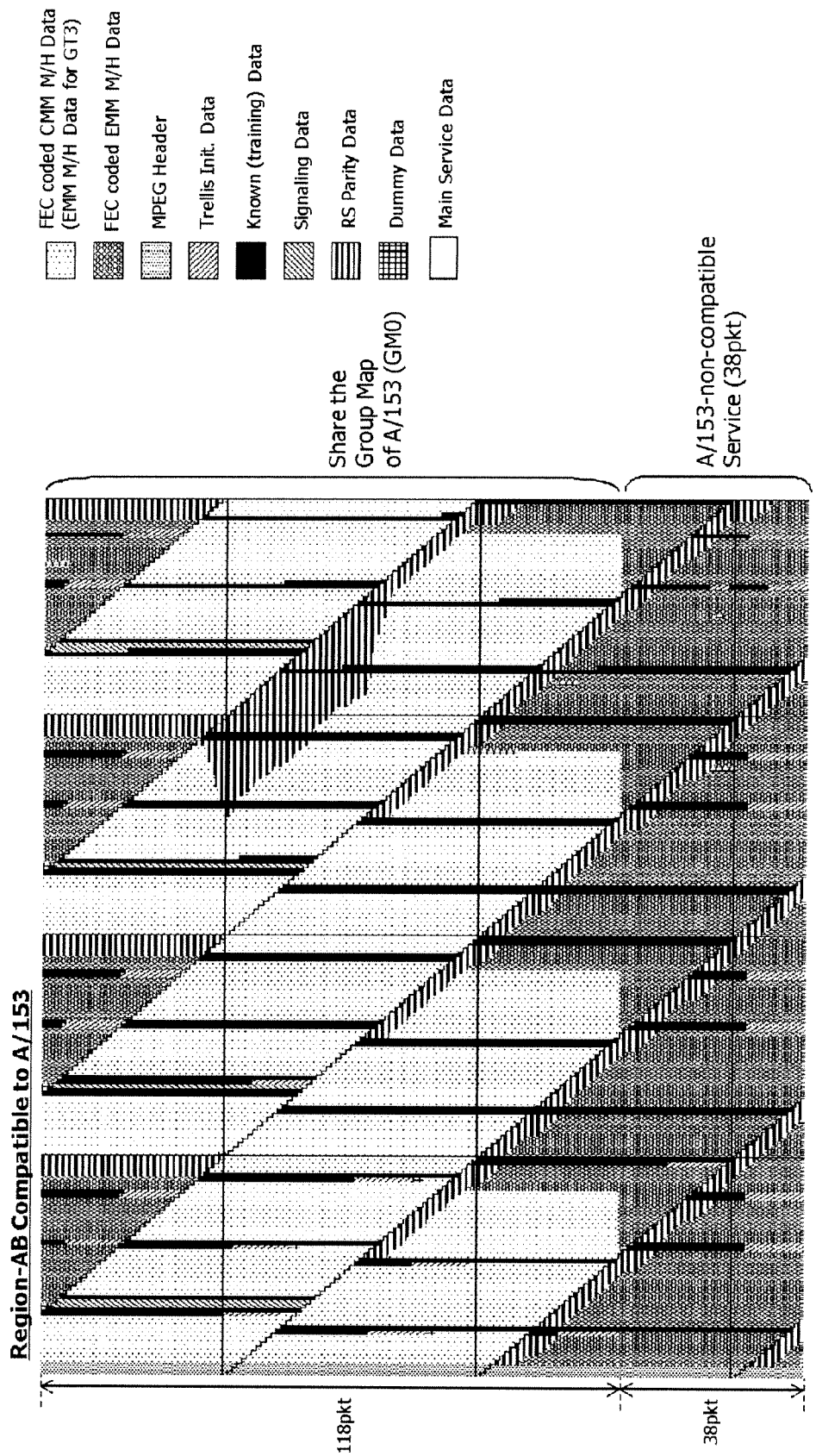
FIG. 21 illustrates a group structure of a packet domain of Group map 2-0 according to an embodiment of the present invention.
Figure 22:
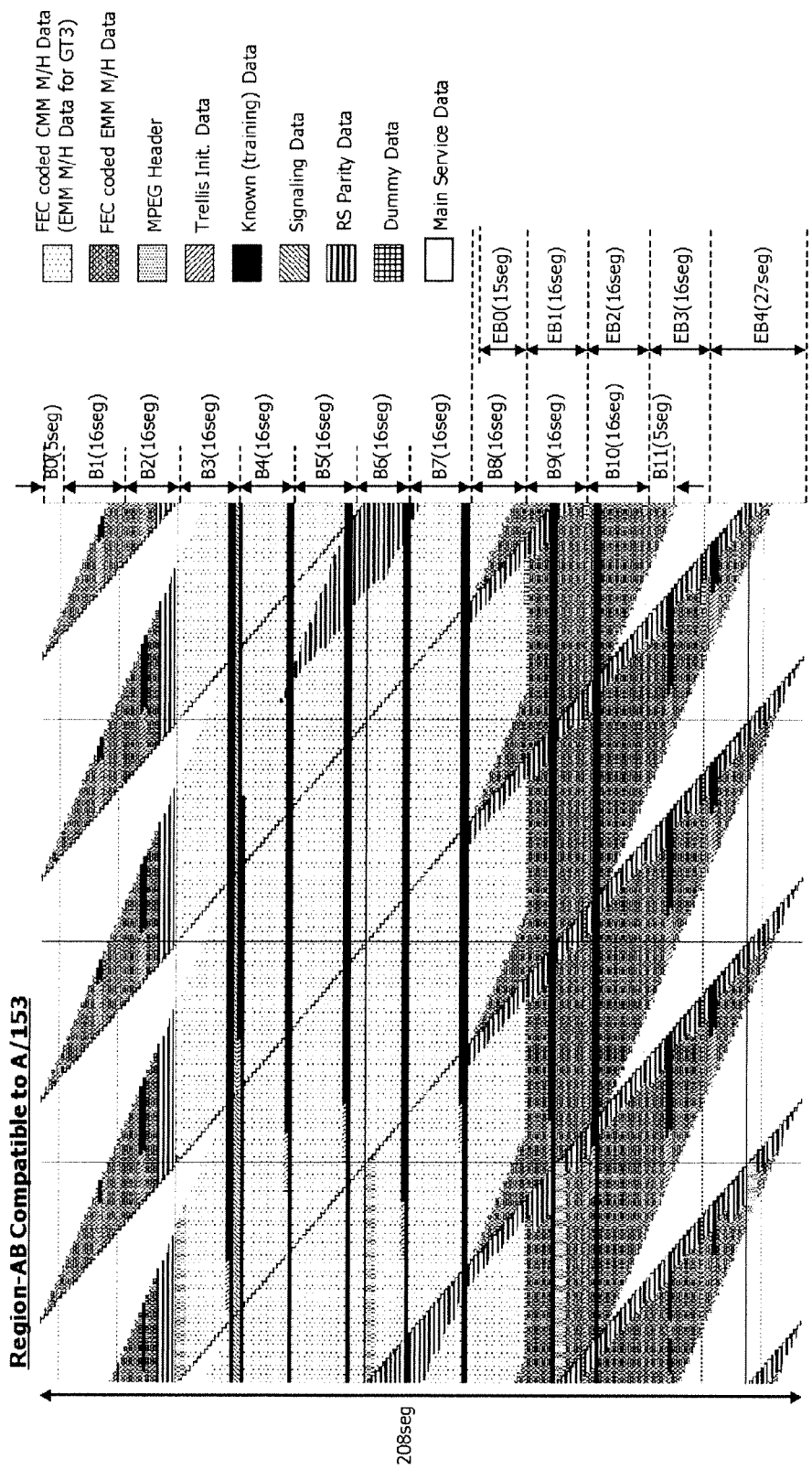
FIG. 22 illustrates a group structure of a segment domain of Group map 2-0 according to an embodiment of the present invention.

FIG. 21 illustrates a group structure of a packet domain of Group map 2-0 according to an embodiment of the present invention. Herein, FIG. 21-1 corresponds to a group structure prior to being processed with data-interleaving. FIG. 22 illustrates a group structure of a segment domain of Group map 2-0 according to an embodiment of the present invention. Herein, FIG. 22 corresponds to a group structure after being processed with data-interleaving.

Figure 23:
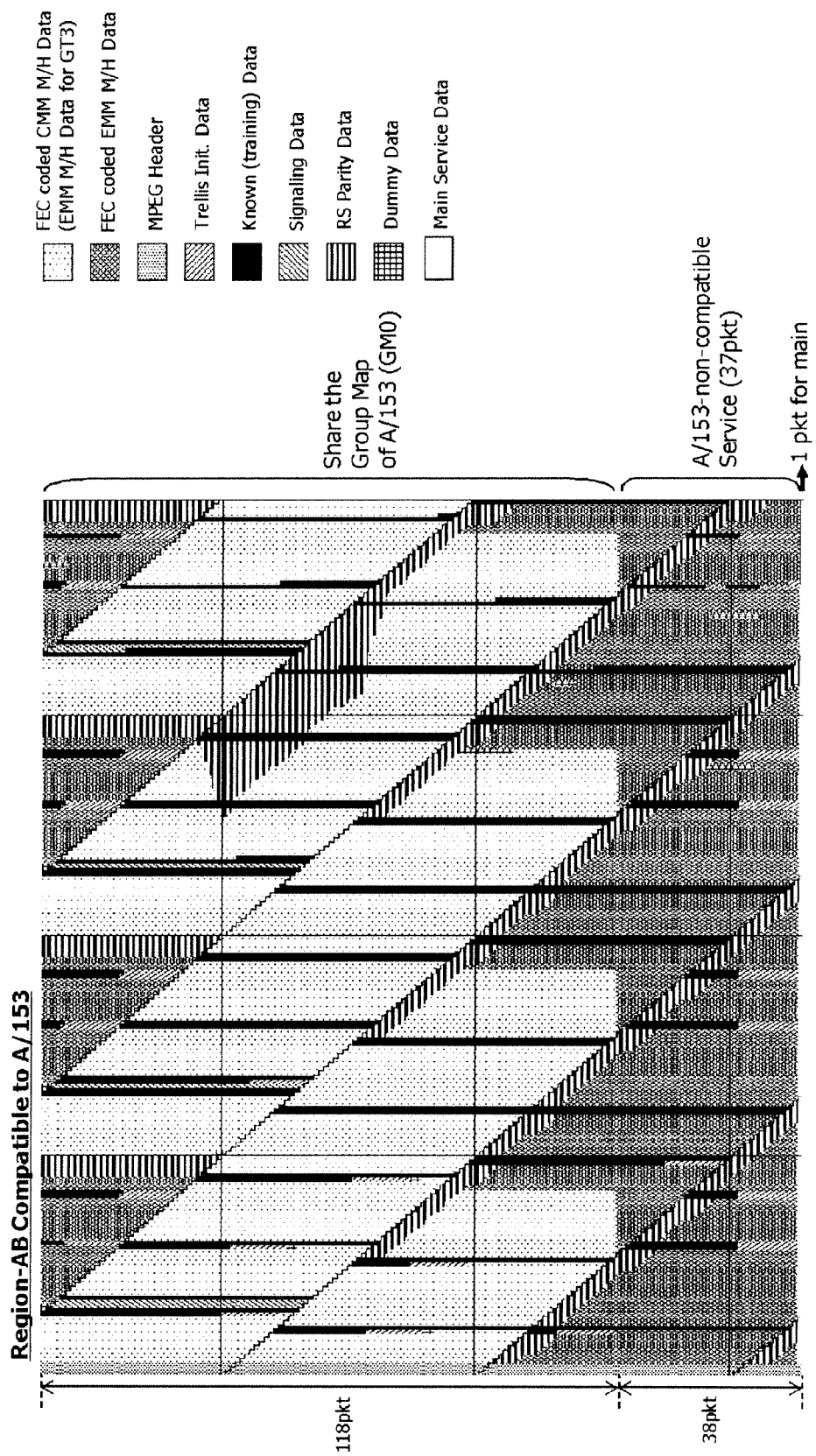
FIG. 23 illustrates a group structure of a packet domain of Group map 2-1 according to an embodiment of the present invention.
Figure 24:
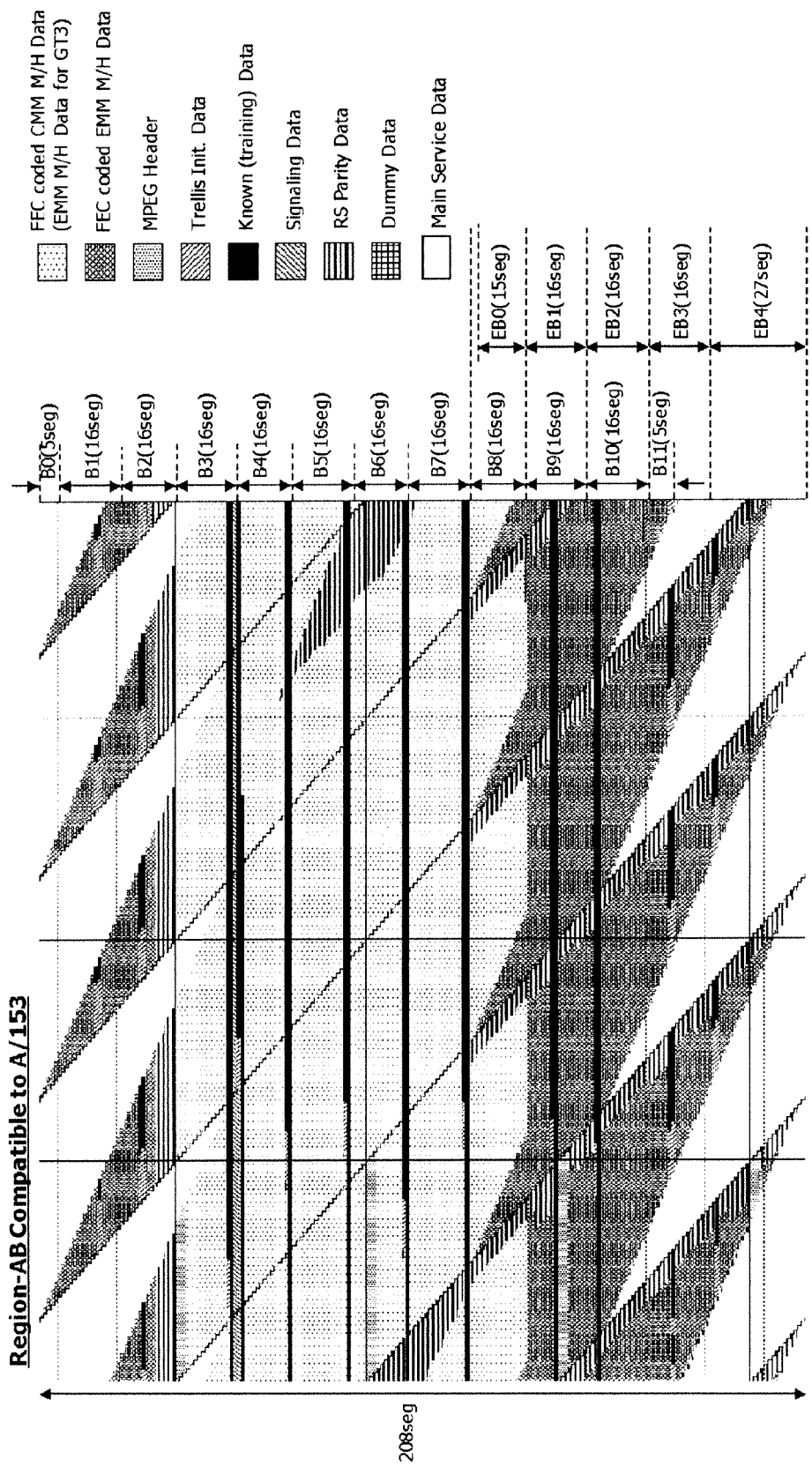
FIG. 24 illustrates a group structure of a segment domain of Group map 2-1 according to an embodiment of the present invention.

FIG. 23 illustrates a group structure of a packet domain of Group map 2-1 according to an embodiment of the present invention. Herein, FIG. 23 corresponds to a group structure prior to being processed with data-interleaving. FIG. 24 illustrates a group structure of a segment domain of Group map 2-1 according to an embodiment of the present invention. Herein, FIG. 24 corresponds to a group structure after being processed with data-interleaving.

Figure 25:
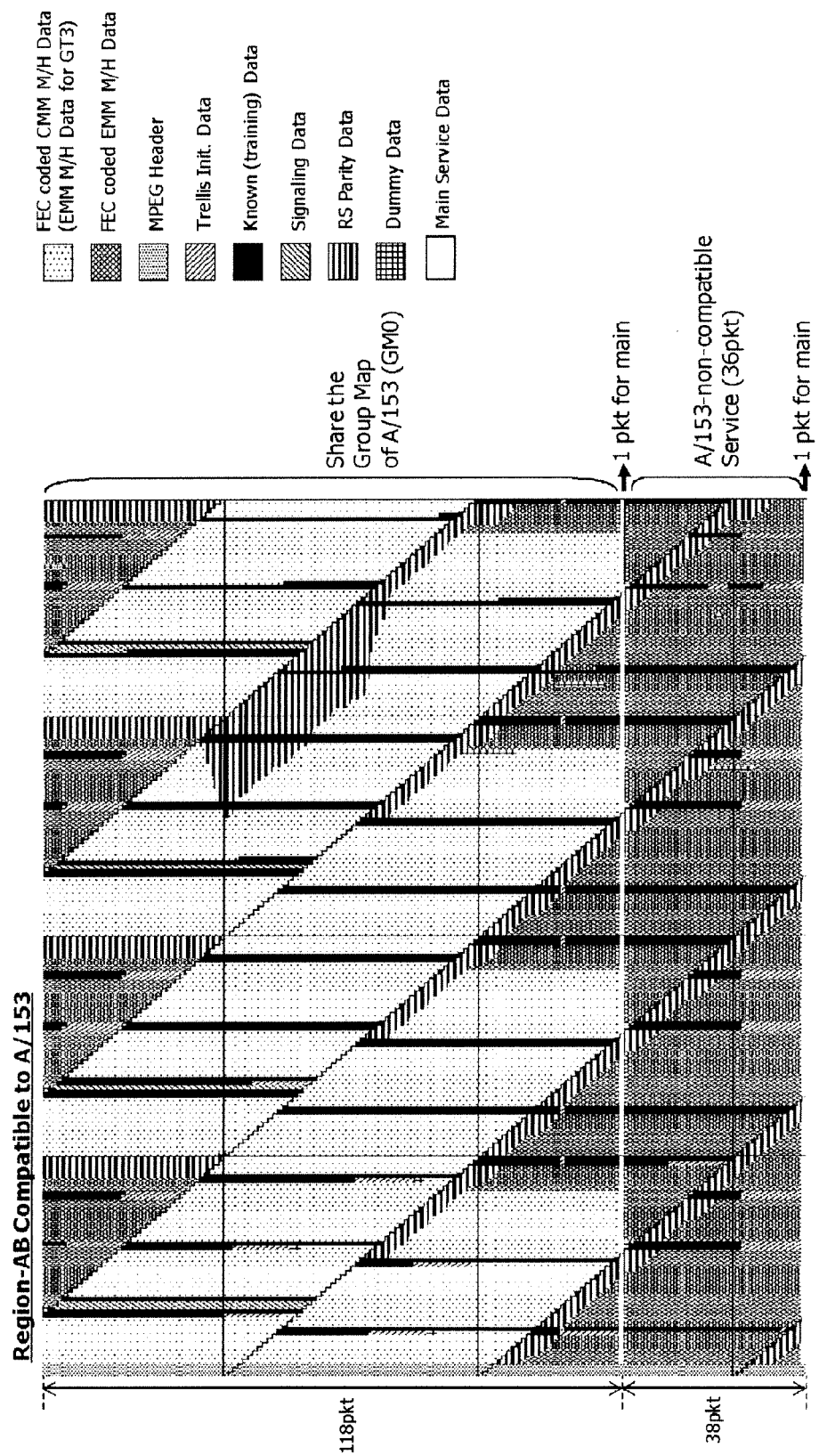
FIG. 25 illustrates a group structure of a packet domain of Group map 2-2 according to an embodiment of the present invention.
Figure 26:
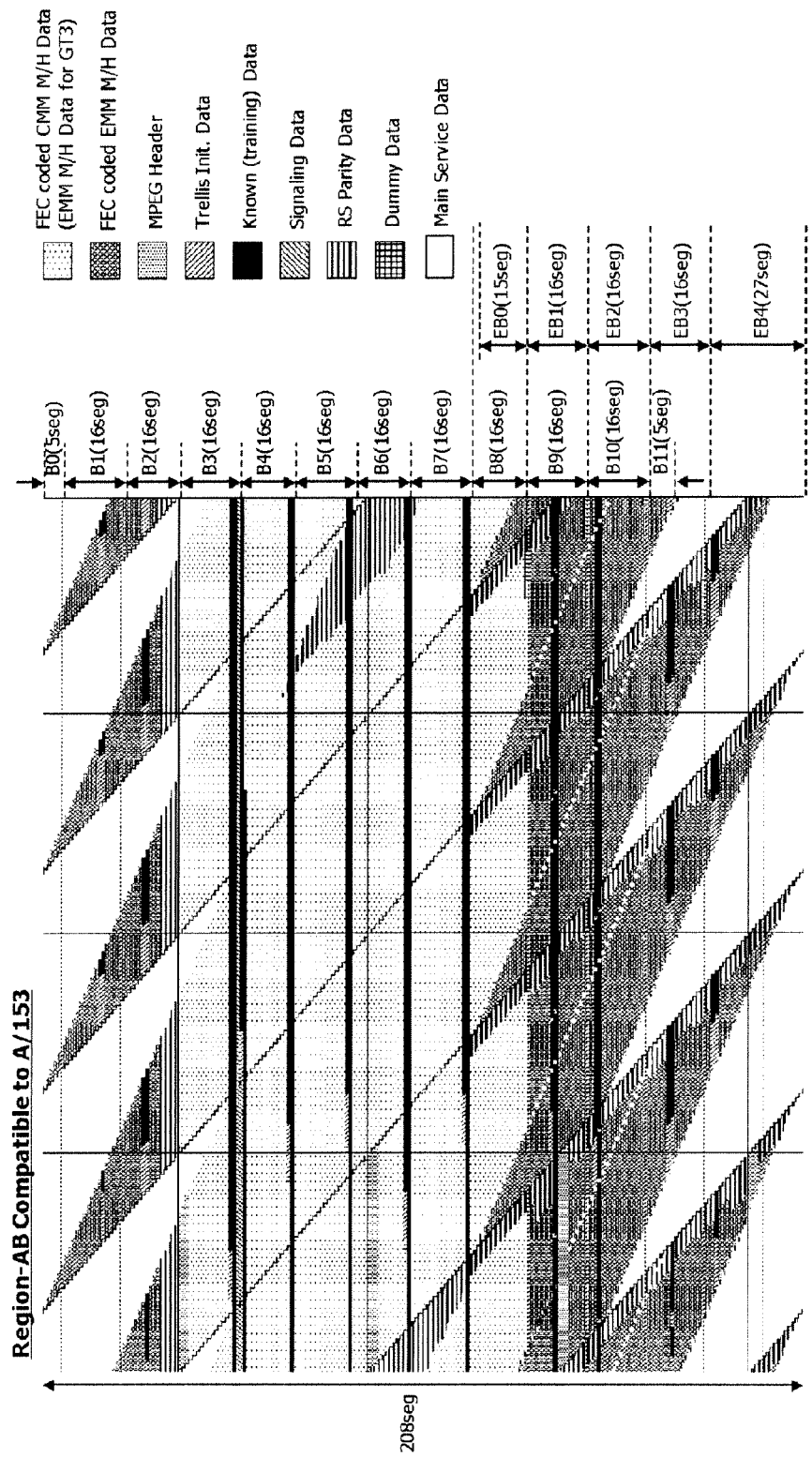
FIG. 26 illustrates a group structure of a segment domain of Group map 2-2 according to an embodiment of the present invention.

FIG. 25 illustrates a group structure of a packet domain of Group map 2-2 according to an embodiment of the present invention. Herein, FIG. 25 corresponds to a group structure prior to being processed with data-interleaving. FIG. 26 illustrates a group structure of a segment domain of Group map 2-2 according to an embodiment of the present invention. Herein, FIG. 26 corresponds to a group structure after being processed with data-interleaving.

Figure 27:
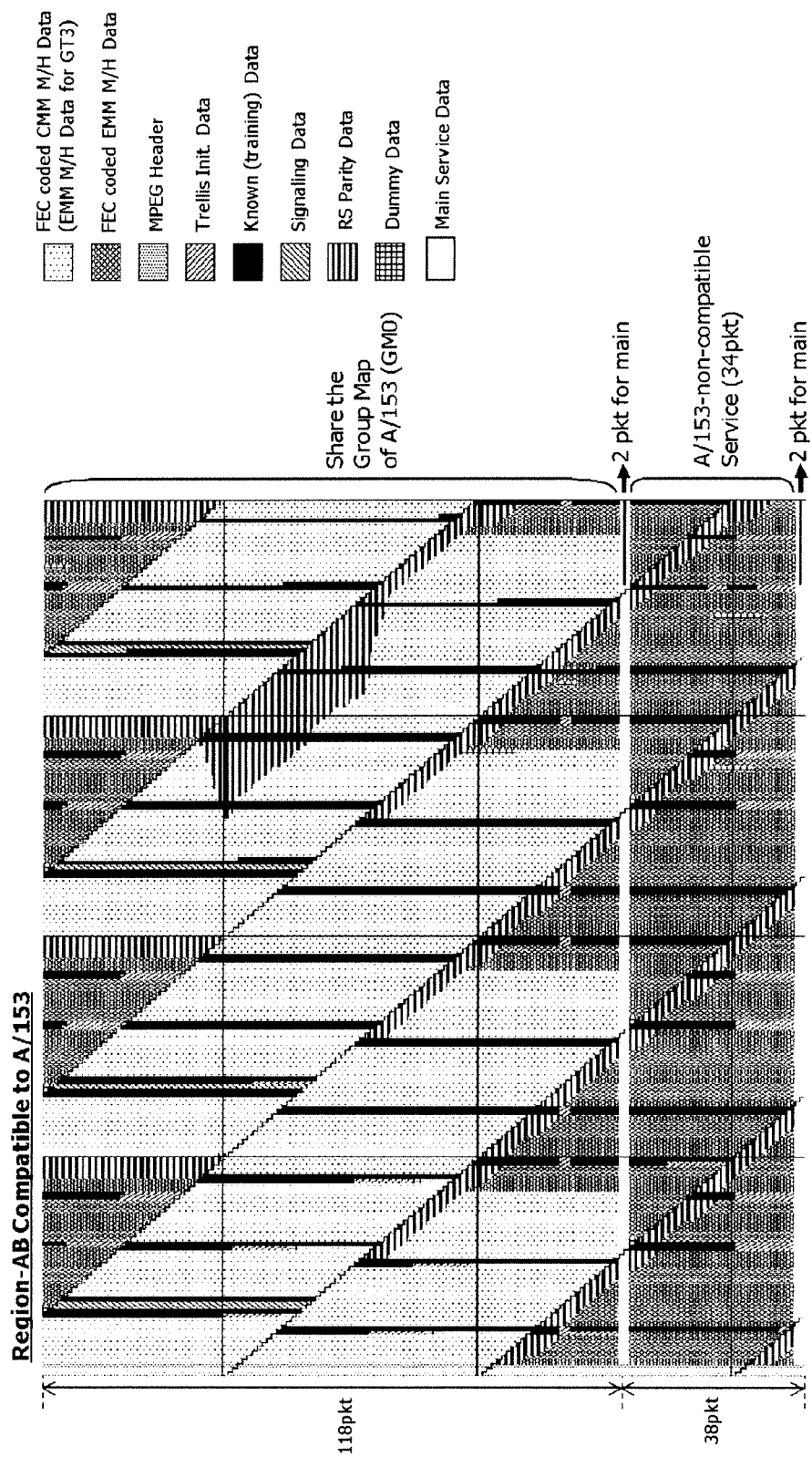
FIG. 27 illustrates a group structure of a packet domain of Group map 2-4 according to an embodiment of the present invention.
Figure 28:
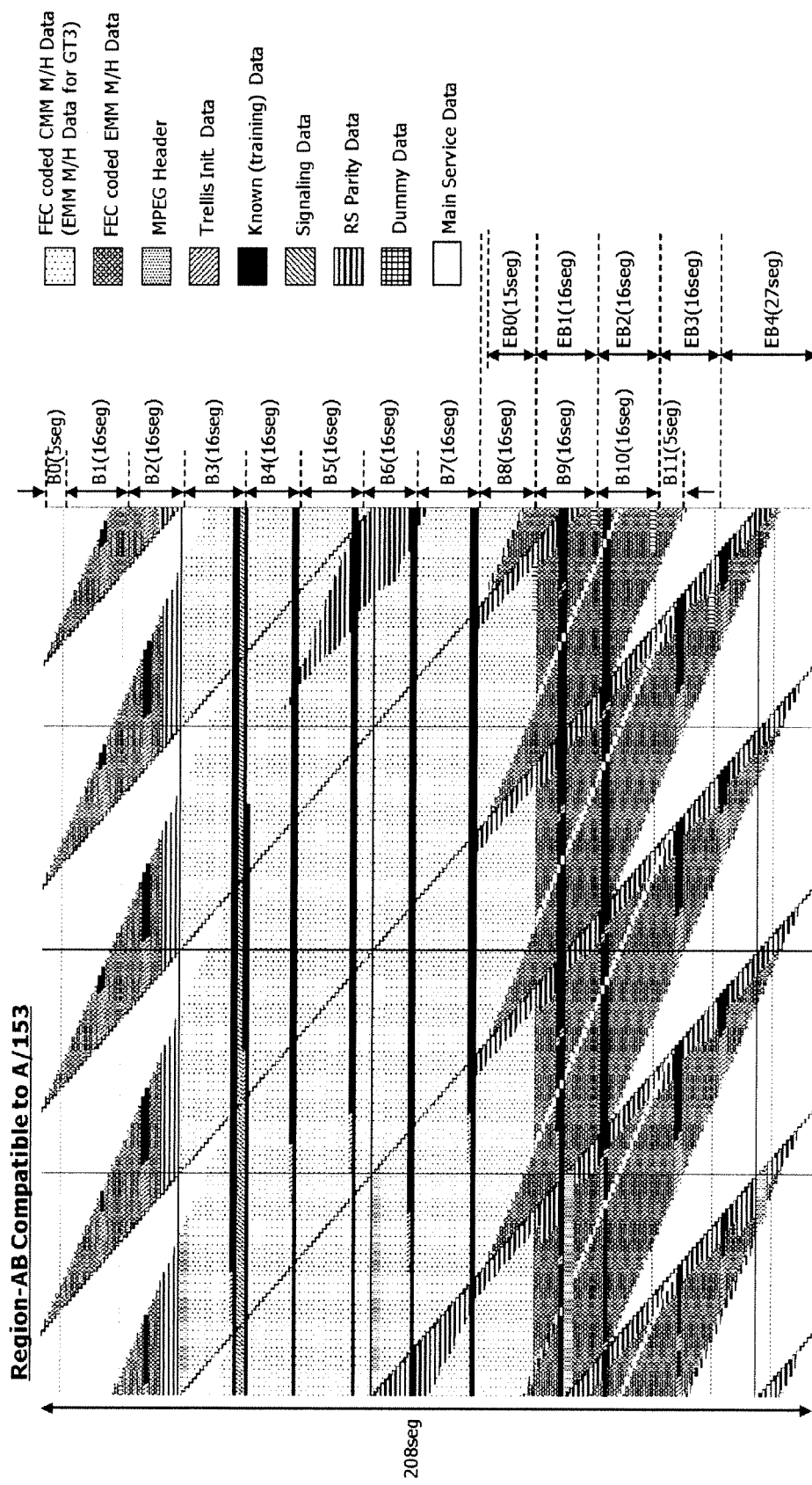
FIG. 28 illustrates a group structure of a segment domain of Group map 2-4 according to an embodiment of the present invention.

FIG. 27 illustrates a group structure of a packet domain of Group map 2-4 according to an embodiment of the present invention. Herein, FIG. 27 corresponds to a group structure prior to being processed with data-interleaving. FIG. 28 illustrates a group structure of a segment domain of Group map 2-4 according to an embodiment of the present invention. Herein, FIG. 28 corresponds to a group structure after being processed with data-interleaving.

Figure 29:
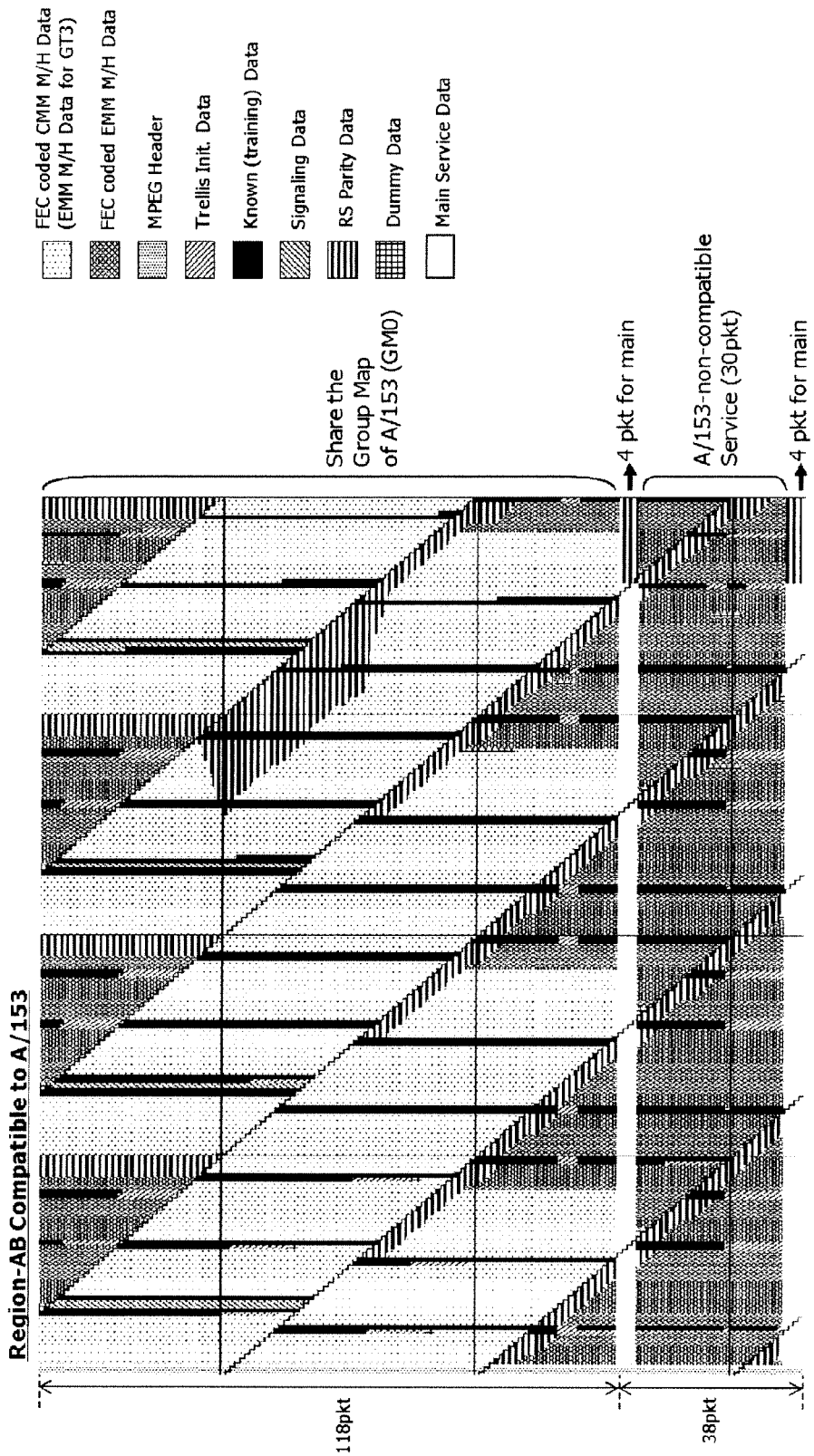
FIG. 29 illustrates a group structure of a packet domain of Group map 2-8 according to an embodiment of the present invention.
Figure 30:
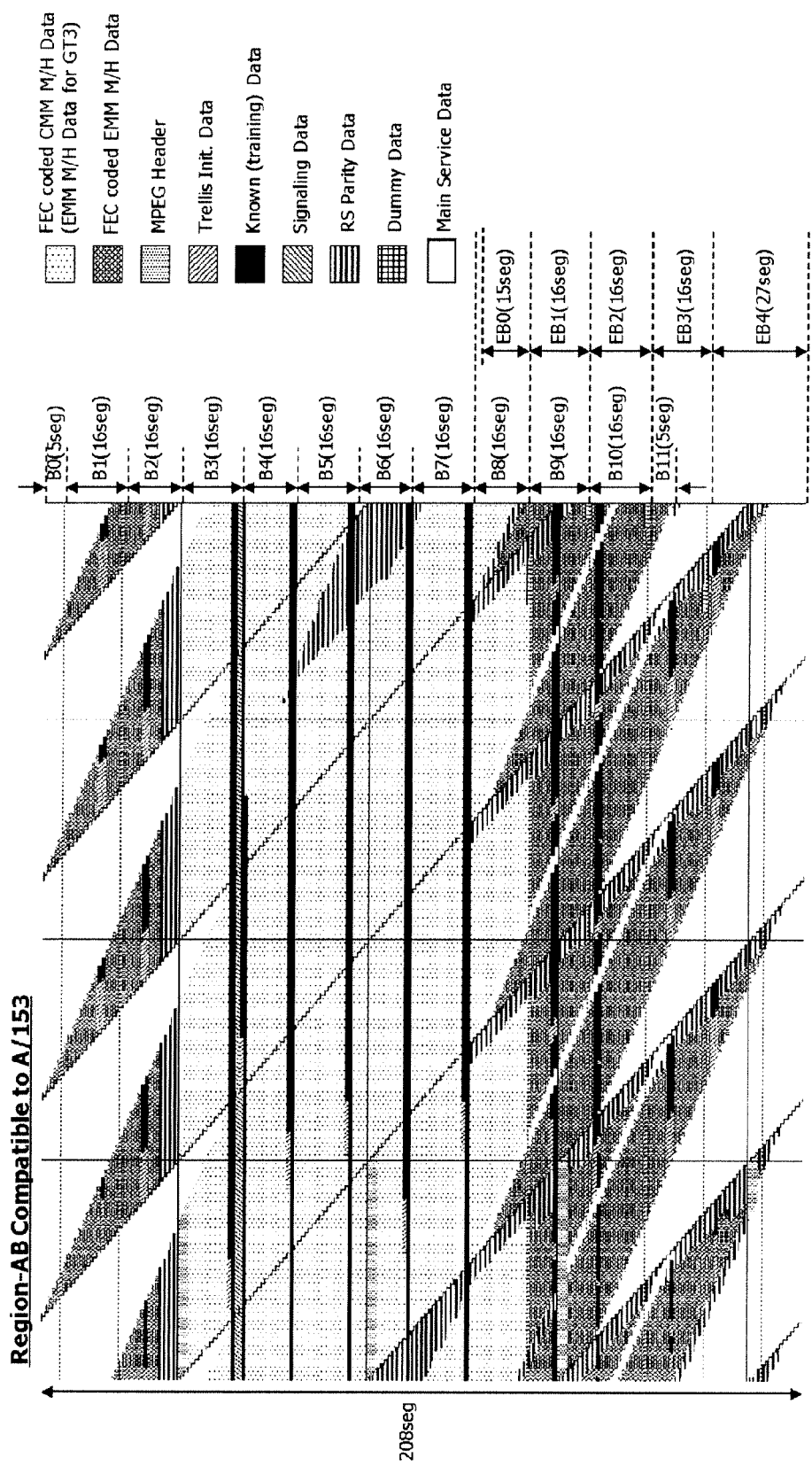
FIG. 30 illustrates a group structure of a segment domain of Group map 2-8 according to an embodiment of the present invention.

FIG. 29 illustrates a group structure of a packet domain of Group map 2-8 according to an embodiment of the present invention. Herein, FIG. 29 corresponds to a group structure prior to being processed with data-interleaving. FIG. 30 illustrates a group structure of a segment domain of Group map 2-8 according to an embodiment of the present invention. Herein, FIG. 30 corresponds to a group structure after being processed with data-interleaving.

Referring to the group structure of the segment domains shown in FIG. 21 to FIG. 30, a group is divided into 12 M/H blocks (MH blocks B0~B11) for the first mobile mode. Also, the same group is divided into 5 extended M/H blocks (MH blocks EB0~EB4) for the second mobile mode.

At this point, a receiving system for the first mobile mode may receive and process only the data included in 6 M/H blocks (MH blocks B3~B8). And, a receiving system for the second mobile mode may receive all data included in both the 12 M/H blocks (MH blocks B0~B11) and the 5 extended M/H blocks (MH blocks EB0~EB4), thereby processing both the mobile data of the first mobile mode and the mobile data of the second mobile mode.

Meanwhile, depending upon the number of mobile service data packets of region E, group type 3 may be further segmented to 5 group types (i.e., group types 3-0, 3-1, 3-2, 3-4, and 3-8). In the data group of group type 3, a primary group division includes regions A, B, C, D, and E, and a secondary group division does not exist. More specifically, the primary group division is assigned with mobile service data for the second mobile mode in regions A, B, C, D, and E, and the mobile service data of the first mobile mode are not assigned. At this point, the group format of group type 2 is identical to the group format of group type 3. In other words, group type 3 also uses group map 2. Therefore, reference may be made to FIG. 21-1 to FIG. 30-1 for the description of the group map for each of the sub group types 3-0, 3-1, 3-2, 3-4, and 3-8 of group type 3. However, the receiving system for the first mobile mode cannot receive and process group type 3. And, the receiving system for the second mobile mode may receive and process all data included in the 12 M/H blocks (MH blocks B0~B11) and the 5 extended M/H blocks (MH blocks EB0~EB4).

Detailed Description of ICM

One M/H frame transmits main service data, mobile service data for a first mobile mode and mobile service data for a second mobile mode. Alternatively, one M/H frame may transmit a part of these services.

If the mobile service data of the second mobile mode is transmitted along with the main service and the service of the first mobile mode, a group is segmented into group types 0 to 3 according to a method of assigning a CMM or an EMM to each region.

A group of a group type 0 transmits mobile service data of a first mobile mode through group regions A, B, C and D and does not transmit mobile service data of a second mobile mode. Accordingly, a group region E does not exist.

A group of a group type 1 transmits mobile service data of a first mobile mode through group regions A, B, C and D and transmits mobile service data of a second mobile mode to a group region E.

A group of a group type 2 transmits mobile service data of a first mobile mode through group regions A and B and transmits mobile service data of a second mobile mode through group regions C, D and E.

A group of a group type 3 transmits mobile service data of a second mobile mode through all group regions A, B, C, D and E.

Group type 0 may transmit main service data along with the mobile service data of the first mobile mode and group types 1 to 3 may or may not transmit main service data. Accordingly, in the group types 1 to 3, a low-level group type is set according to the number of main service data packets assigned per slots.

The M/H frame may transmit only mobile service data for a second mobile mode. In addition, all channel capacities may be assigned for transmission of only the mobile service data for the second mobile mode.

For example, if groups are assigned to all slots within all M/H frames and all the assigned groups are of a group type 3-0, all channel capacities are assigned for transmission of only the mobile service data for the second mobile mode. In this case, the mobile service need not be backward compatible with the main service and the service of the first mobile mode. However, since the group type 3-0 may configure M/H frames along with another group type, the group type 3-0 should always be compatible with the main service and the service of the first mobile mode.

Accordingly, in the present invention, a mode for ignoring compatibility with the main service and the service of the first mobile mode if all M/H channel capacities are assigned to transmission of the mobile service data for the second mobile mode will be described.

This mode is referred to as an Increased Capacity Mode (ICM).

In ICM, groups are assigned to all slots in all M/H frames and the main service data or the mobile service data of the first mobile mode is not transmitted to any slot. Groups assigned to all slots transmit only the mobile service of the second mobile mode.

In ICM, a group of a new group type is used and is referred to as a group type 4 (GT4). That is, a group of a group type 4 is transmitted to all slots.

The group type 4 transmits the mobile service data of the second mobile mode to all group regions A, B, C, D and E similar to the group type 3. Since the group type 4 does not include main service data packets, a low-level group type does not exist.

In the groups of the group types 0 to 3, all data packets include an MPEG-2 header for compatibility with the main service, and all data packets include 20-byte RS parity data through systematic/non-systematic RS encoding. However, since the group of the group type 4 ignores the compatibility with the main service, data bytes used for the MPEG-2 header and RS parity bytes may be used for transmission of the mobile service data.

That is, group types 0 to 3 include 184-byte mobile service data, a 3-byte MPEG-2 header, and 20-byte RS parity data, but group type 4 includes 207-byte mobile service data, in a packet domain.

Since the amount of transmitted mobile service data is increased as described above, the channel capacity for transmission of the mobile service data is increased from 19.39 Mbps to 21.35 Mbps.

One group type has a group map corresponding thereto.

The group type 0 has a group map 0 (GM0).

The group type 1 has a group map 1 (GM1). The group map 1 is subdivided into five group maps (group maps 1-0, 1-1, 1-2, 1-4 and 1-8) according to the number of mobile service data packets of the region E. The group type 1-0 uses a group map 1-0 (GM1-0) and the group type 1-1 uses a group map 1-1 (GM1-1), the group type 1-2 uses a group map 1-2 (GM1-2), the group type 1-4 uses a group map 1-4 (GM1-4), and the group type 1-8 uses a group map 1-8 (GM1-8).

The group type 2 and the group type 3 have a group map 2 (GM2). The group map 2 is subdivided into five group maps (group maps 2-0, 2-1, 2-2, 2-4 and 2-8) according to the number of mobile service data packets of the region E. The group types 2-0 and 3-0 use a group map 2-0 (GM2-0) and the group types 2-1 and 3-1 use a group map 2-1 (GM2-1), the group types 2-2 and 3-2 use a group map 2-2 (GM2-2), the group types 2-4 and 3-4 use a group map 2-4 (GM2-4), a group types 2-8 and 3-8 use a group map 2-8 (GM2-8).

The group type 4 has a group map 3 (GM3). Since the group type 4 does not include the low-level group type, the group map 3 does not include a low-level group map.

Figure 31:
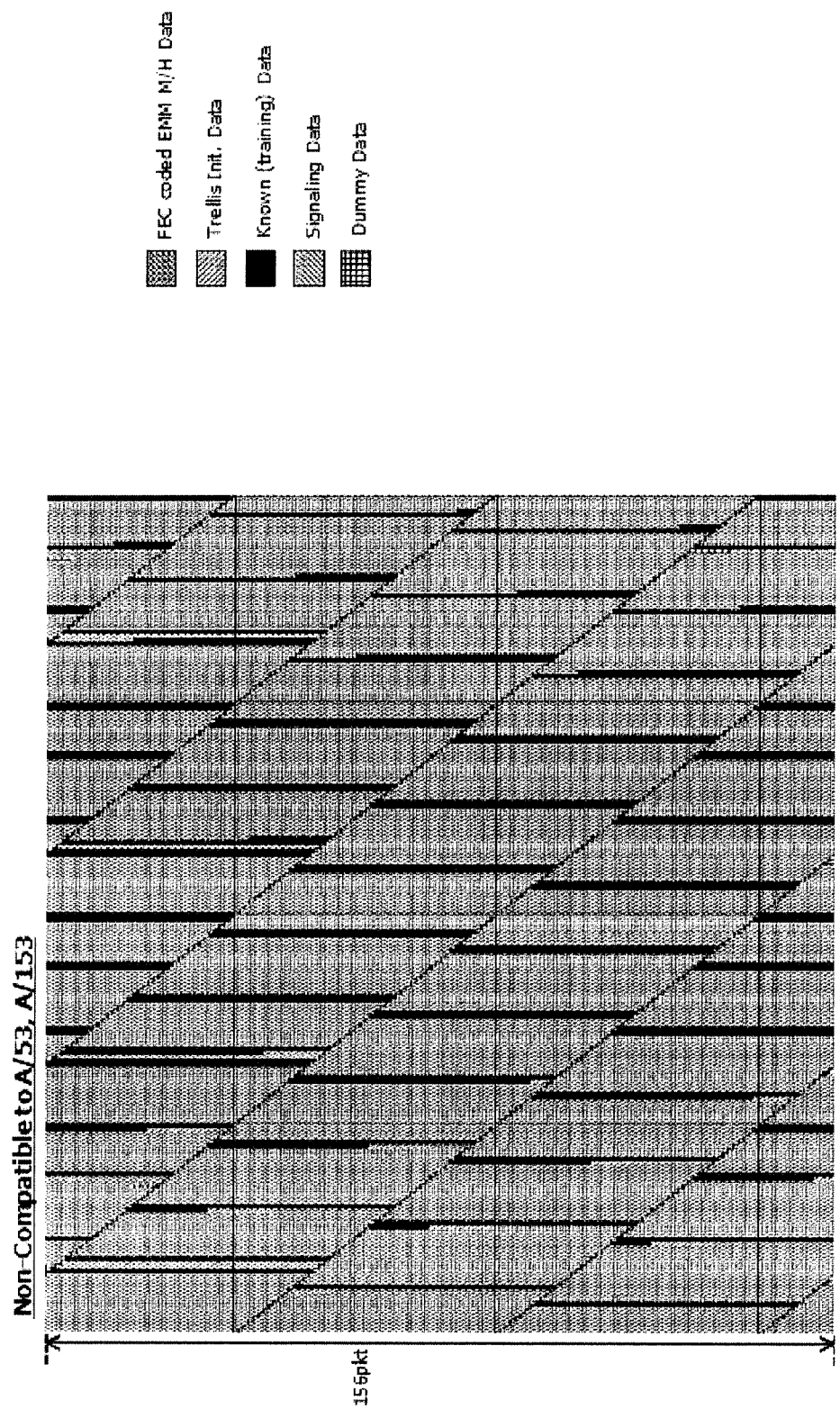
FIG. 31 shows an embodiment of a group structure of a packet domain of the group map 3 according to an embodiment of the present invention.
Figure 32:
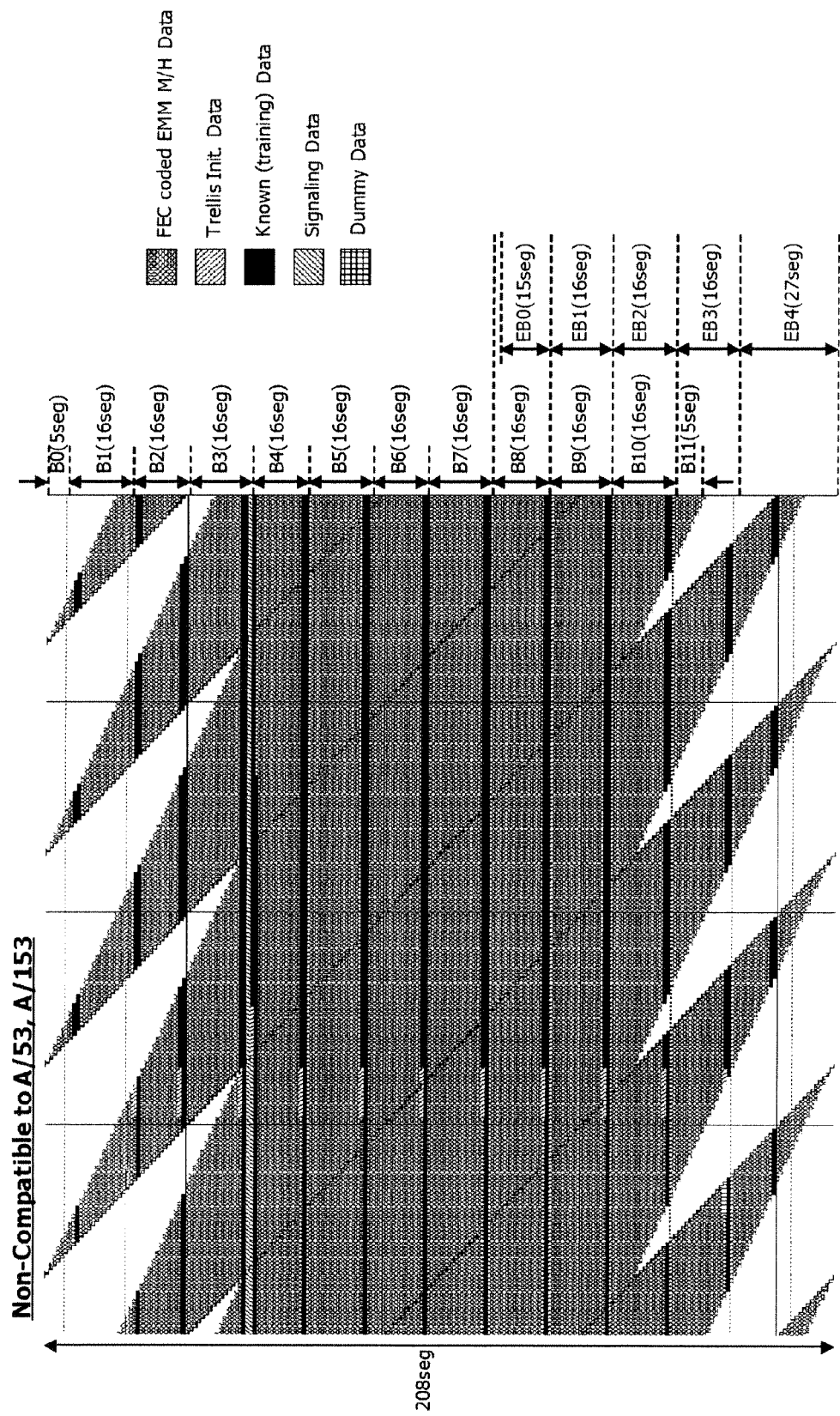
FIG. 32 shows an embodiment of a group structure of a segment domain of a group map 3 according to an embodiment of the present invention.

FIG. 31 shows an embodiment of a group structure of a packet domain of the group map 3. FIG. 31 shows the structure of the group before data interleaving. FIG. 32 shows an embodiment of a group structure of a segment domain of a group map 3. FIG. 32 shows the structure of the group after data interleaving.

The group map of the ICM may include a plurality of M/H blocks or a plurality of extended M/H blocks. The group map 3 of the present embodiment includes 12 M/H blocks and 5 extended M/H blocks, similar to the group map 1 or the group map 2. The size and the location of each M/H block or extended M/H block is equal to those of the group map 1 or 2.

The group type 4 includes only a primary group division. The primary group division is configured of regions A, B, C, D and E. The group of group type 4 may transmit a mobile service of a second mobile mode alone. Accordingly, an EMM primary parade is assigned to and transmitted through group type 4 having only the primary group division.

In ICM, since all groups are of group type 4, all parades are EMM primary parades and all ensembles are EMM primary ensembles. Therefore, an EMM secondary parade is not present. In addition, one super ensemble may be transmitted through two EMM primary parades. However, in ICM, since there is no difference between the transmission of one super ensemble through two EMM primary parades and the transmission of an ensemble through one EMM primary parade, the super ensemble need not to be configured.

M/H Parade

A parade (or M/H parade) is defined to be a collection of Group Divisions, transmitted through a single M/H Frame. The portion of an M/H Parade within an M/H Subframe shall consist of a collection of Group Divisions, where these Group Divisions belong to consecutively numbered M/H Groups. Also, a Parade consists of Group Divisions from Groups having an identical Group Type. For example, a random primary parade is configured of primary group divisions of groups corresponding to group type 1-1. In other words, the data of one parade are assigned to group divisions of groups having the same group type, thereby being transmitted. For example, data of a random primary parade are assigned to primary group divisions of groups having the same group type, thereby being transmitted.

A parade is determined (or identified) by a group type of a group to which the group division, which configures the corresponding parade, belongs.

A CMM parade corresponds to a parade that is backward compatible with mobile service data of the first mobile mode or mobile service data of CMM.

A CMM primary parade corresponds to a collection of primary group divisions. And, at this point, each primary group division includes mobile service data backward compatible with the first mobile mode. A CMM secondary parade corresponds to a collection of secondary group divisions. And, at this point, each secondary group division includes mobile service data backward compatible with the first mobile mode.

A primary group division configuring the CMM primary parade corresponds to a collection of group regions. And, the structure of the primary group division may vary depending upon the group type. Herein, the primary group division included in the CMM primary parade may include regions A, B, C, and D, or the primary group division included in the CMM primary parade may only include regions A and B.

A secondary group division configuring the CMM secondary parade corresponds to a collection of group regions. And, the structure of the secondary group division may vary depending upon the group type. Herein, the secondary group division included in the CMM secondary parade may include regions C and D.

An EMM parade corresponds to a parade that is backward compatible with mobile service data of the second mobile mode or mobile service data of EMM.

An EMM primary parade corresponds to a collection of primary group divisions. And, at this point, each primary group division includes mobile service data backward compatible with the second mobile mode. An EMM secondary parade corresponds to a collection of secondary group divisions. And, at this point, each secondary group division includes mobile service data backward compatible with the second mobile mode.

A primary group division configuring the EMM primary parade corresponds to a collection of group regions. And, the structure of the primary group division may vary depending upon the group type. Herein, the primary group division included in the EMM primary parade may include regions A, B, C, D, and E.

A secondary group division configuring the EMM secondary parade corresponds to a collection of group regions. And, the structure of the secondary group division may vary depending upon the group type. Herein, the secondary group division configuring in the EMM secondary parade may either include regions C, D, and E, or only include region E.

In case a secondary group division does not exist in the group, the CMM secondary parade or the EMM secondary parade does not exist in the corresponding group.

Also, when the EMM secondary parade exists in a group, the primary parade being paired with the EMM secondary parade corresponds to the CMM primary parade. For example, if the EMM secondary parade corresponds to a collection of secondary group divisions configured of regions C, D, and E, the primary parade being paired with the EMM secondary parade corresponds to a collection of primary group divisions configured of regions A and B. At this point, the primary parade corresponds to the CMM primary parade.

Also, depending upon its characteristics, the EMM secondary parade may be classified as an EMM Class 1 secondary parade and an EMM Class 2 secondary parade.

The secondary parade according to the embodiment of the present invention is always paired with a primary parade. And, the secondary group divisions respectively being paired with the primary group divisions are transmitted through the same slots as those of the primary group divisions. Furthermore, the pair of primary parade and secondary parade shares the same parade identifier (Parade ID) and the same Number Of Group Division (NOGD). Herein, the NOGD corresponds to the number of group divisions included in one parade within a subframe. Also, the NOGD has the same value as the Number of Group (NOG). Herein, the NOG corresponds to a number of groups being assigned with parades having the same parade ID within a subframe. For example, when the NOGD of a primary parade is equal to 4, the NOGD of the secondary parade should also be equal to 4.

Conversely, the EMM secondary parade may have a different NOGD value from that of its paired CMM primary parade. When the EMM secondary parade has the same NOGD value as its paired CMM parade, the corresponding EMM secondary parade is classified as an EMM Class 1 secondary parade. And, when the EMM secondary parade has a different NOGD value from that of its paired CMM parade, the corresponding EMM secondary parade is classified as an EMM Class 2 secondary parade.

Meanwhile, the NOGD values of the CMM primary parade, the CMM secondary parade, and the EMM primary parade each has the same value as the respective NOG values.

Figure 33:
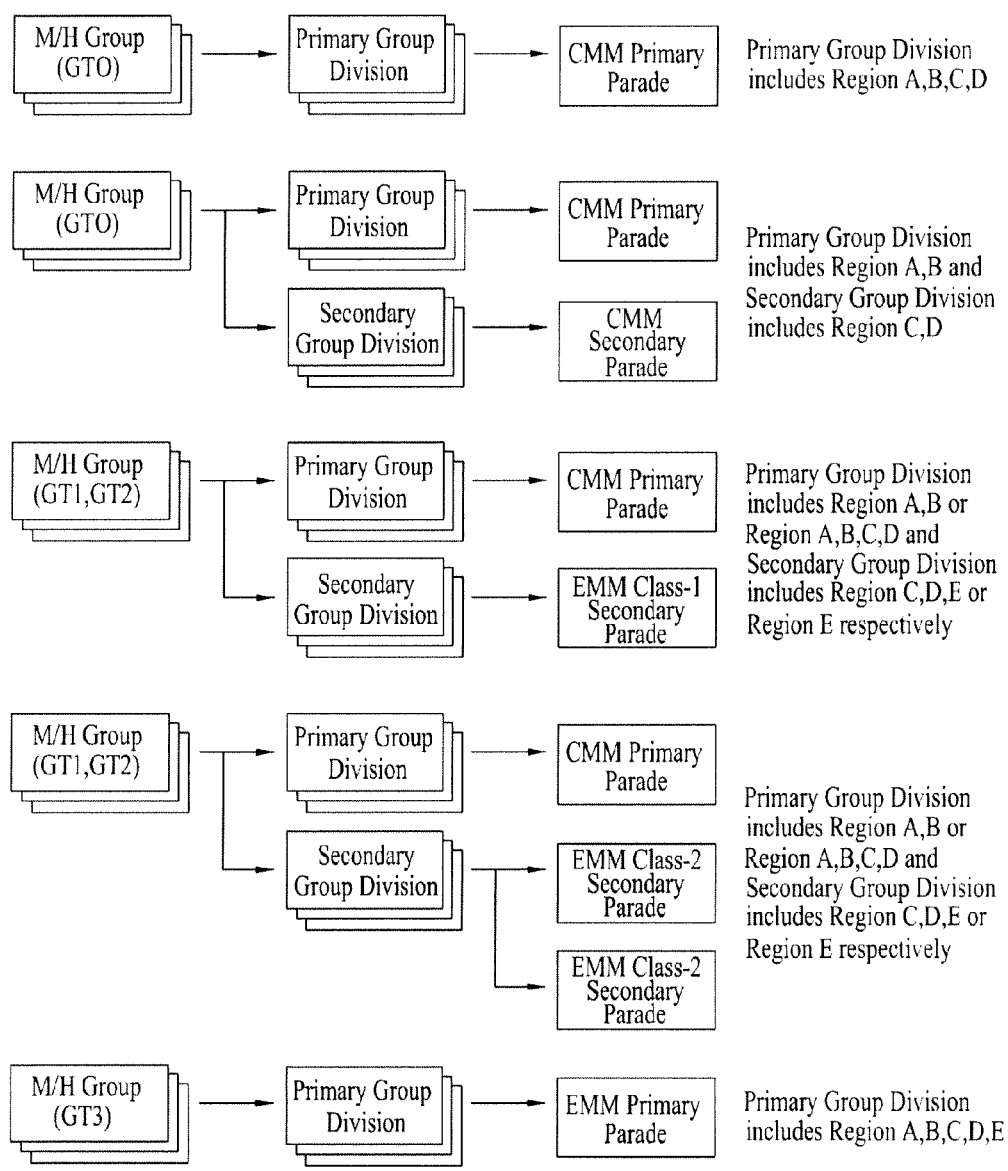
FIG. 33 illustrates a relation between a parade type and a group type according to an embodiment of the present invention.

FIG. 33 illustrates a relation between a parade type and a group type according to an embodiment of the present invention.

A group of group type 0 may only have a primary group division. And, in this case, the primary group division includes regions A, B, C, and D. Group type 0 may transmit only mobile services of the first mobile mode. Therefore, a CMM primary parade is assigned and transmitted to group type 0 having only the primary group division.

Moreover, a group of group type 0 may also have both a primary group division and a secondary group division. In this case, the primary group division includes regions A and B, and the secondary group division includes regions C and D. Herein, the group of group type 0 may transmit only the mobile services of the first mobile mode. Therefore, a CMM primary parade is assigned and transmitted to the primary group division of the group belonging to group type 0, and a CMM secondary parade is assigned and transmitted to the secondary group division.

A group of group type 1 has both the primary group division and the secondary group division. At this point, the primary group division includes regions A, B, C, and D, and the second group division includes region E. The group of group type 1 transmits mobile services of the first mobile mode to the primary group division and transmits mobile services of the second mobile mode to the secondary group division. Accordingly, a CMM primary parade is assigned and transmitted to the primary group division of the group of group type 1, and an EMM secondary parade is assigned and transmitted to the secondary group division.

A group of group type 2 has both the primary group division and the secondary group division. At this point, the primary group division includes regions A and B, and the second group division includes regions C, D, and E. The group of group type 2 transmits mobile services of the first mobile mode to the primary group division and transmits mobile services of the second mobile mode to the secondary group division. Accordingly, a CMM primary parade is assigned and transmitted to the primary group division of the group of group type 2, and an EMM secondary parade is assigned and transmitted to the secondary group division.

In the group of group type 1 or group type 1, the EMM secondary parade may correspond to the EMM Class 1 secondary parade, or the EMM secondary parade may correspond to the EMM Class 2 secondary parade.

A group of group type 3 only has a primary group division. And, in this case, the primary group division includes regions A, B, C, D, and E. The group of group type 3 may transmit only mobile services of the second mobile mode. Therefore, the EMM primary parade is assigned and transmitted to the group of group type 3, which only has the primary group division.

The EMM secondary parade may have an NOGD value different from that of its paired CMM primary parade. And, in this case, the EMM secondary parade is referred to as the EMM Class 2 secondary parade. When a plurality of primary group divisions is collected (or gathered) and included in a CMM primary parade, secondary group divisions of the same group may be collected (or gathered) and included in one EMM Class 1 secondary parade and may also be included in a plurality of EMM Class 2 secondary parades. Herein, in the example given according to the embodiment of the present invention, the number of EMM Class 2 secondary parades being paired with one CMM primary parade is limited to two EMM Class 2 secondary parades.

At this point, the sum of the NOGD values of two EMM Class 2 secondary parades is equal to the NOGD value of the paired CMM primary parade and also equal to the NOG value of the parades having the same parade identifier (parade ID).

Figure 34:
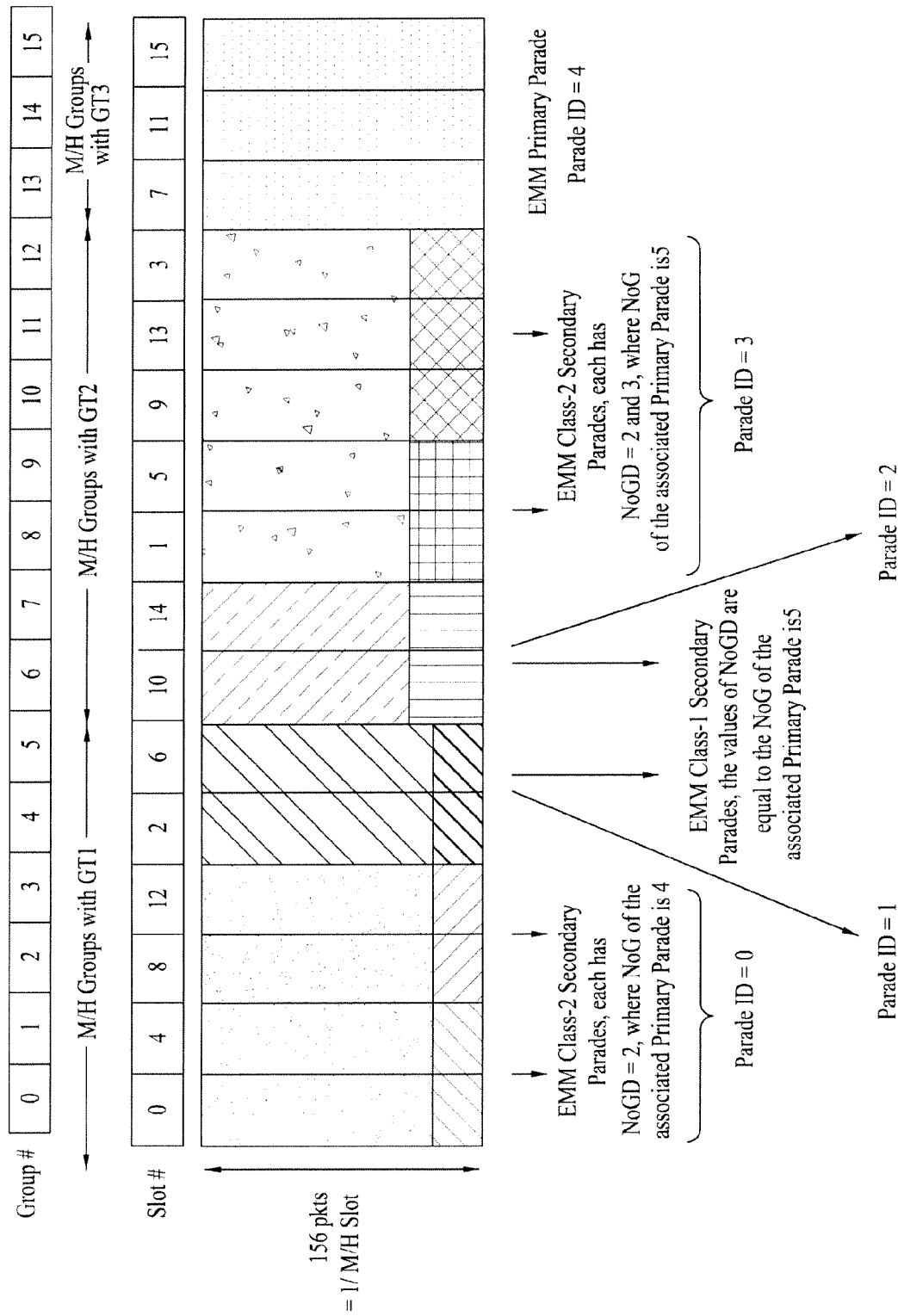
FIG. 34 illustrates an EMM Class 1 secondary parade and an EMM Class 2 secondary parade according to an embodiment of the present invention.

FIG. 34 illustrates an EMM Class 1 secondary parade and an EMM Class 2 secondary parade according to an embodiment of the present invention.

Referring to FIG. 34, each group and each parade are illustrates in accordance with the order of assigned to the respective slot, not corresponding order of transmission.

As shown in FIG. 34, one primary parade may have one EMM secondary parade, two EMM secondary parades, or no EMM secondary parade depending upon the structure of the corresponding parade or the group type of the corresponding group.

The EMM secondary parade exists only in a group belonging to group type 1 or group type 2. The group of group type 0 includes only the CMM parade, and the group of group type 3 includes only the EMM primary parade.

When the EMM secondary parade has the same NOGD value as that of its paired CMM primary parade, the EMM secondary parade corresponds to an EMM Class 1 secondary parade. Referring to FIG. 34, since the EMM secondary parade of Slot #2 and Slot #6 has the same NOGD value of 2 as that of its paired CMM primary parade, the corresponding EMM secondary parade is referred to as the EMM Class 1 secondary parade. At this point, since the group type is group type 1, the EMM Class 1 secondary parade includes region E. Furthermore, since the EMM secondary parade of Slot #10 and Slot #14 also has the same NOGD value of 2 as that of its paired CMM primary parade, the corresponding EMM secondary parade is also referred to as the EMM Class 1 secondary parade. At this point, since the group type is group type 2, the EMM Class 1 secondary parade includes regions C, D, and E.

Figure 40:
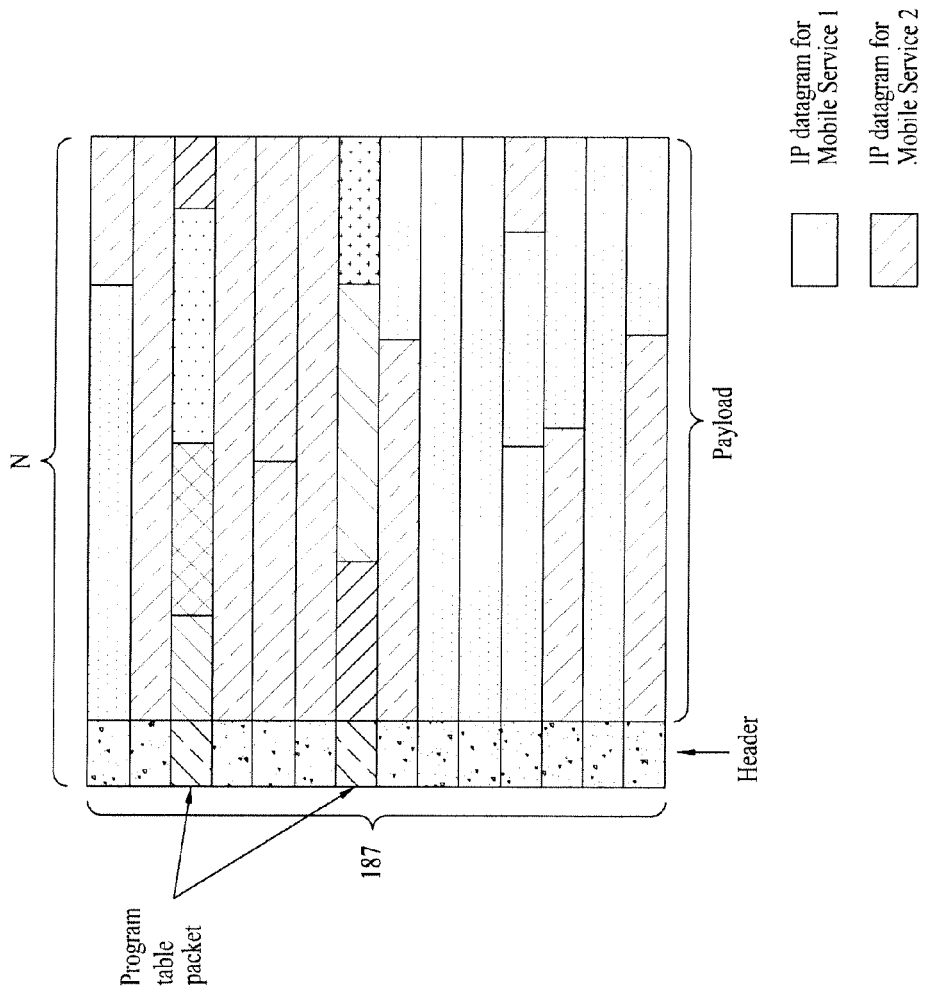
FIG. 40 illustrates a payload of an RS frame being outputted from a data frame encoder according to an embodiment of the present invention.

When the EMM secondary parade has a different NOGD value from that of its paired CMM primary parade, the corresponding EMM secondary parade is referred to as an EMM Class 2 secondary parade. Referring to FIG. 40, unlike the paired CMM primary parade, the EMM secondary parades of Slot #0, Slot #4, Slot #8, and Slot #12 are divided into two EMM secondary parades each having the NOGD value of 2. And, each of the corresponding EMM secondary parades is referred to as an EMM Class 2 secondary parade. The sum of the NOGD values of the EMM secondary parades is equal to 4, and this value is identical to the NOGD value of the CMM primary parade. At this point, since the group type is group type 1, the EMM Class 2 secondary parade includes region E. Furthermore, unlike the paired CMM primary parade, the EMM secondary parades of Slot #1, Slot #5, Slot #9, Slot #13, and Slot #3 are divided into two EMM secondary parades respectively having the NOGD value of 2 and the NOGD value of 3. And, each of the corresponding EMM secondary parades is referred to as an EMM Class 2 secondary parade. The sum of the NOGD values of the EMM secondary parades is equal to 5, and this value is identical to the NOGD value of the CMM primary parade. At this point, since the group type is group type 2, the EMM Class 2 secondary parade includes region C, D, and E.

At this point, a method of assigning (or allocating) groups to each slot may be identically applied to all subframes within a single M/H frame. Alternatively, the method of assigning (or allocating) groups to each slot may be differently applied for each subframe. At this point, when it is assumed that group assignment (or allocation) is identically applied to all subframes within the M/H frame, the number of groups being assigned to one M/H frame becomes a multiple of 5.

Also, according to the embodiment of the present invention, a plurality of groups included in one parade is assigned to be spaced apart as far away from one another as possible within the subframe. Thus, the data may be able to respond with robustness against burst errors that may occur within a subframe.

For example, when it is assumed that 3 groups are assigned (or allocated) to one subframe, each group is assigned to a first slot (Slot #0), a fifth slot (Slot #4), and a ninth slot (Slot #8) within the corresponding subframe. Accordingly, when it is assumed that 16 groups are assigned to one subframe by using the above-described assignment (or allocation) rule, the 16 groups are assigned by the order of Slot #0, Slot #4, Slot #8, Slot #12, Slot #2, Slot #6, Slot #10, Slot #14, Slot #1, Slot #5, Slot #9, Slot #13, Slot #3, Slot #7, Slot #11, and Slot #15.

Equation 1 below shows the above-described rule for assigning a plurality of groups to one sub-frame in the form of a mathematical equation.

$$j=(4i+O) \bmod 16, \qquad \text{[Equation 1]}$$

Herein,
O=0 if i<4,
O=2 else if i<8,
O=1 else if i<12,
O=3 else

Also, j indicates the slot number within one subframe. Herein, j may have a value ranging from 0 to 15. Furthermore, i represents a group number. Herein, i may have a value also ranging from 0 to 15.

At this point, groups respective to one parade may be assigned to one subframe. Alternatively, groups respective to a plurality of parades may also be assigned to one subframe.

FIG. 34 shows an example of assignment of groups to slots.

A CMM primary parade having Parade ID #0 and two EMM Class 2 secondary parades respectively have group numbers 0 to 3 (i.e., group #0 to group #3) and are assigned to Slot #0, Slot #4, Slot #8, and Slot #12 in accordance with Equation 1.

A CMM primary parade having Parade ID #1 and an EMM Class 1 secondary parade respectively have group numbers 4 and 5 (i.e., group #4 and group #5) and are assigned to Slot #2 and Slot #6 in accordance with Equation 1.

A CMM primary parade having Parade ID #2 and an EMM Class 1 secondary parade respectively have group numbers 6 and 7 (i.e., group #6 and group #7) and are assigned to Slot #10 and Slot #14 in accordance with Equation 1.

A CMM primary parade having Parade ID #3 and two EMM Class 2 secondary parades respectively have group numbers 8 to 12 (i.e., group #8 to group #12) and are assigned to Slot #1, Slot #5, Slot #9, Slot #13, and Slot #3 in accordance with Equation 1.

An EMM primary parade having Parade ID #4 has group numbers 13 to 15 (i.e., group #13 to group #15) and is assigned to Slot #7, Slot #11, and Slot #15 in accordance with Equation 1.

Although group numbers are given in accordance with the order of the parade identifiers and in accordance with the order of the group types, and although the slots are assigned in accordance with such given group numbers, this is merely exemplary, and, therefore, the group numbers may also be separately assigned without referring to the order of the parade identifiers or the group type of the groups. Nevertheless, parades having the same parade identifier should be assigned with consecutive group numbers, and each of the EMM Class 2 secondary parades should be assigned with consecutive group numbers. For example, in case of the parade having the parade identifier Parade ID #3, as shown in FIG. 32, should be assigned with consecutive group numbers from #8 to #12. And, each of the EMM Class 2 secondary parades should be respectively assigned with consecutive group numbers #8 and #9 and consecutive group number #10 to #12.

When parades having the same parade identifiers include the EMM Class 2 secondary parades, the EMM Class 2 secondary parade having the smaller group number is referred to as the first ($1^{st}$) EMM Class 2 secondary parade, and the EMM Class 2 secondary parade having the greater group number is referred to as the second ($2^{nd}$) EMM Class 2 secondary parade.

M/H Ensemble

An ensemble (also referred to as an M/H ensemble) refers to a collection of RS frame payload having the same quality of service (QoS). Herein, each RS frame payload encapsulates a collection of a collection of IP streams.

A primary ensemble (also referred to as a primary M/H ensemble) corresponds to a collection of consecutive primary RS frames.

A secondary ensemble (also referred to as a secondary M/H ensemble) corresponds to a collection of consecutive secondary RS frames.

A super ensemble (also referred to as a super M/H ensemble) corresponds to a collection of consecutive super RS frames.

One RS frame payload is RS-CRC encoded so as to become an RS frame. Also, one RS frame is transmitted through one parade or two parades within a single M/H frame.

The CMM primary RS frame payload (ensemble) is RS-CRC encoded to a CMM primary RS frame, thereby being transmitted through a CMM primary parade. Similarly, the CMM secondary RS frame payload (ensemble) is RS-CRC encoded to a CMM secondary RS frame, thereby being transmitted through a CMM secondary parade.

The EMM primary RS frame payload (ensemble) is RS-CRC encoded to an EMM primary RS frame, thereby being transmitted through an EMM primary parade. Similarly, the EMM Class 1 secondary RS frame payload (ensemble) is RS-CRC encoded to an EMM Class 1 secondary RS frame, thereby being transmitted through an EMM Class 1 secondary parade. And, the EMM Class 2 secondary RS frame payload (ensemble) is RS-CRC encoded to an EMM Class 2 secondary RS frame, thereby being transmitted through an EMM Class 2 secondary parade.

The super RS frame payload (ensemble) is RS-CRC encoded to a super RS frame, thereby being transmitted through two random parades. At this point, since the super RS frame payload (ensemble) cannot be received by a receiver of the first mobile mode, the super RS frame payload (ensemble) is transmitted through two EMM parades.

The super RS frame payload (ensemble) may be transmitted through an EMM primary parade and another EMM primary parade. Also, super RS frame payload (ensemble) may be transmitted through an EMM primary parade and an EMM Class 1 secondary parade or an EMM Class 2 secondary parade. Alternatively, the super RS frame payload (ensemble) may be transmitted through an EMM Class 1 secondary parade and another EMM Class 1 secondary parade, and the super RS frame payload (ensemble) may also be transmitted through an EMM Class 1 secondary parade and an EMM Class 2 secondary parade. Furthermore, the super RS frame payload (ensemble) may be transmitted through an EMM Class 2 secondary parade and another EMM Class 2 secondary parade.

At this point, the two parades through which the super ensemble is transmitted, each has a different parade identifier.

Figure 35:
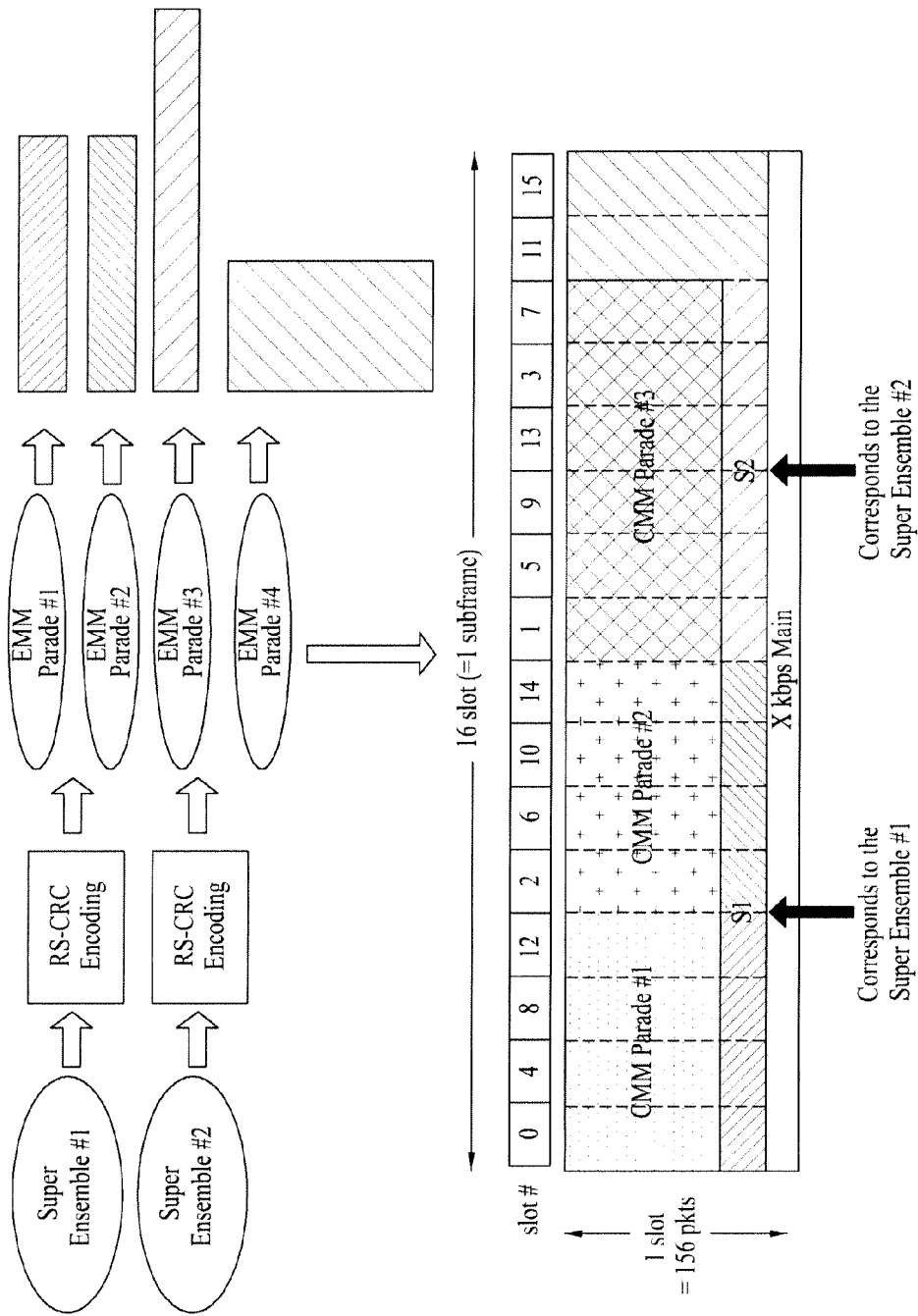
FIG. 35 illustrates the relation between a super ensemble, a super RS frame, and a parade according to an embodiment of the present invention.

FIG. 35 illustrates the relation between a super ensemble, a super RS frame, and a parade according to an embodiment of the present invention.

Super ensemble #1 is RS-CRC encoded so as to form Super RS frame #1. Herein, super RS frame #1 is transmitted through Parade #1 and Parade #2. Also, Super ensemble #2 is RS-CRC encoded so as to form Super RS frame #2. Herein, super RS frame #2 is transmitted through Parade #3 and Parade #4. One super ensemble and super RS frame may be transmitted to parades of the same type, such as Parade #1 and Parade #2. Also, the super ensemble and super RS frame may be transmitted to parades belonging to different parade types, such as Parade #3 and Parade #4.

Transmitting System

Figure 36:
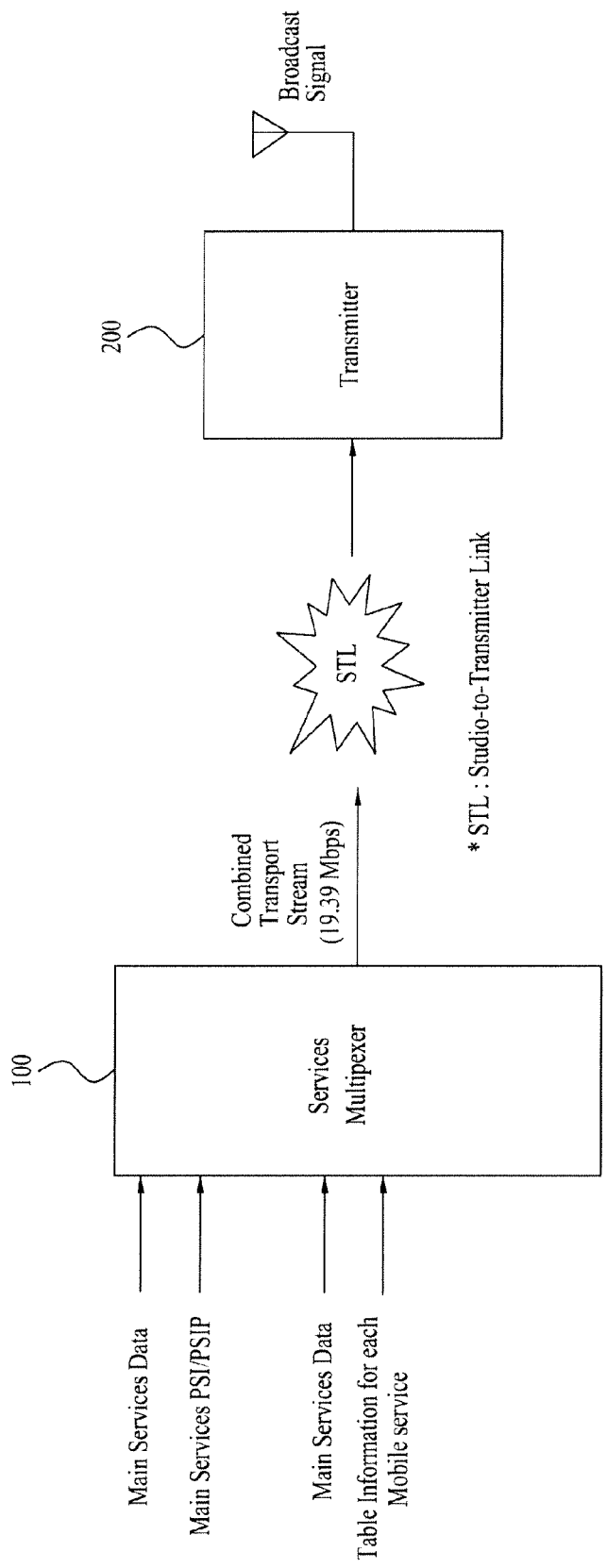
FIG. 36 illustrates a block diagram showing a general structure of a digital broadcast transmitting system according to an embodiment of the present invention.

FIG. 36 illustrates a block diagram showing a general structure of a digital broadcast transmitting system according to an embodiment of the present invention.

Herein, the digital broadcast transmitting includes a service multiplexer 100 and a transmitter 200. Herein, the service multiplexer 100 is located in the studio of each broadcast station, and the transmitter 200 is located in a site placed at a predetermined distance from the studio. The transmitter 200 may be located in a plurality of different locations. Also, for example, the plurality of transmitters may share the same frequency. And, in this case, the plurality of transmitters receives the same signal. This corresponds to data transmission using Single Frequency Network (SFN). Accordingly, in the receiving system, a channel equalizer may compensate signal distortion, which is caused by a reflected wave, so as to recover the original signal. In another example, the plurality of transmitters may have different frequencies with respect to the same channel. This corresponds to data transmission using Multi Frequency Network (MFN).

A variety of methods may be used for data communication each of the transmitters, which are located in remote positions, and the service multiplexer. For example, an interface standard such as a synchronous serial interface for transport of MPEG-2 data (SMPTE-310M). In the SMPTE-310M interface standard, a constant data rate is decided as an output data rate of the service multiplexer. For example, in case of the 8VSB mode, the output data rate is 19.39 Mbps, and, in case of the 16VSB mode, the output data rate is 38.78 Mbps. Furthermore, in the conventional 8VSB mode transmitting system, a transport stream (TS) packet having a data rate of approximately 19.39 Mbps may be transmitted through a single physical channel. Also, in the transmitting system according to the present invention provided with backward compatibility with the conventional transmitting system, additional encoding is performed on the mobile service data. Thereafter, the additionally encoded mobile service data are multiplexed with the main service data to a TS packet form, which is then transmitted. At this point, the data rate of the multiplexed TS packet is approximately 19.39 Mbps.

At this point, the service multiplexer 100 receives at least one type of main service data and table information (e.g., PSI/PSIP table data) for each main service and encapsulates the received data into a transport stream (TS) packet.

Also, according to an embodiment of the present invention, the service multiplexer 100 receives at least one type of mobile service data and table information (e.g., PSI/PSIP table data) for each mobile service and encapsulates the received data into a transport stream (TS) packet.

The mobile service data being inputted to the service multiplexer 100 may correspond to mobile service data of the first mobile mode or may correspond to mobile service data of the second mobile mode. Also, the TS packet of the mobile service data of the first mobile mode will be referred to as a mobile service data packet of the first mobile mode, and the TS packet of the mobile service data of the second mobile mode will be referred to as a mobile service data packet of the second mobile mode.

The service multiplexer 100 multiplexes the encapsulated TS packets in accordance with a predetermined multiplexing rule, thereby outputting the multiplexed TS packets to the transmitter 200.

Service Multiplexer

Figure 37:
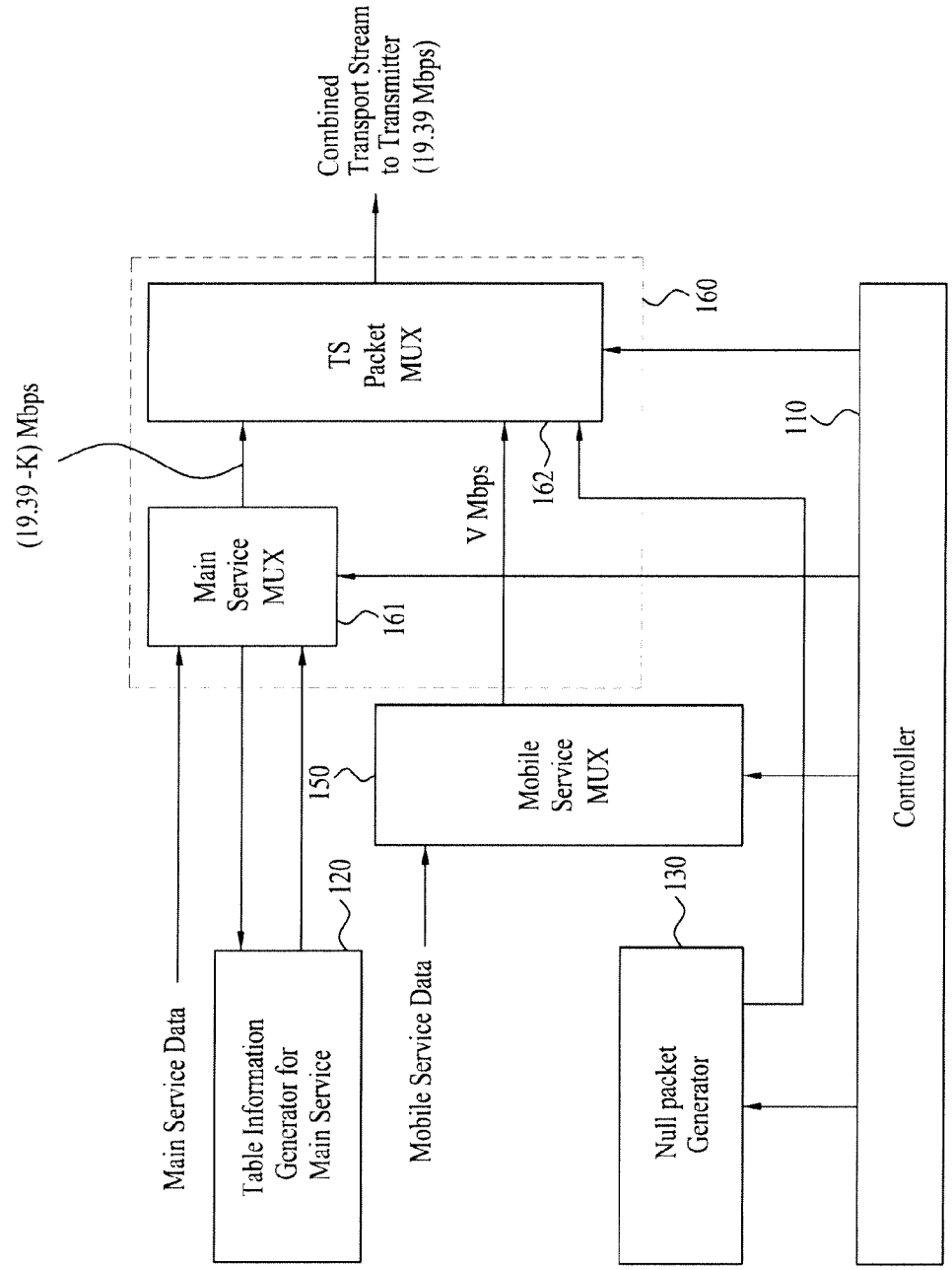
FIG. 37 illustrates a block diagram showing an example of the service multiplexer.

FIG. 37 illustrates a block diagram showing an example of the service multiplexer.

The service multiplexer includes a controller 110 for controlling the overall operations of the service multiplexer, a table information generator 120 for the main service, a null packet generator 130, an OM packet encapsulator 140, a mobile service multiplexer 150, and a transport multiplexer 160.

The transport multiplexer 160 may include a main service multiplexer 161 and a transport stream (TS) packet multiplexer 162.

Referring to FIG. 37, at least one type of compression-encoded main service data and table data generated from the table information generator 120 for the main services are inputted to the main service multiplexer 161 of the transport multiplexer 160. According to the embodiment of the present invention, the table information generator 120 generates PSI/PSIP table data, which is configured in the form of an MPEG-2 private section.

The main service multiplexer 161 respectively encapsulates each of the main service data and the PSI/PSIP table data, which are being inputted, to MPEG-2 TS packet formats, thereby multiplexing the encapsulated TS packets and outputting the multiplexed packets to the TS packet multiplexer 162. Herein, the data packet being outputted from the main service multiplexer 161 will hereinafter be referred to as a main service data packet for simplicity.

The mobile service multiplexer 150 receives and respectively encapsulates at least one type of compression-encoded mobile service data and the table information (e.g., PSI/PSIP table data) for mobile services to MPEG-2 TS packet formats. Then, the mobile service multiplexer 150 multiplexes the encapsulated TS packets, thereby outputting the multiplexed packets to the TS packet multiplexer 162. Hereinafter, the data packet being outputted from the mobile service multiplexer 150 will be referred to as a mobile service data packet for simplicity.

At this point, the mobile service data being inputted to the mobile service multiplexer 150 may correspond to mobile service data of the first mobile mode or may correspond to mobile service data of the second mobile mode. Also, the mobile service data of the first mobile mode and the mobile service data of the second mobile mode may both be simultaneously inputted to the mobile service multiplexer 150. Also, a TS packet of mobile service data of the first mobile mode is referred to as a mobile service data packet of the first mobile mode, and a TS packet of mobile service data of the second mobile mode is referred to as a mobile service data packet of the first mobile mode, for simplicity.

At this point, in order to have the transmitter 200 identify and process the main service data packet, the mobile service data of the first mobile mode, and the mobile service data packet of the second mobile mode, identification information is required. A value pre-decided based upon an agreement between the transmitting system and the receiving system may be used as the identification information, or the identification information may include separate data, or a value of a predetermined position within the corresponding data packet may be modified and used as the identification information.

According to an embodiment of the present invention, different packet identifiers (PIDs) may be assigned to each of the main service data packet, the mobile service data packet of the first mobile mode, and the mobile service data packet of the second mobile mode, so as to identify the main service data packet, the mobile service data packet of the first mobile mode, and the mobile service data packet of the second mobile mode. More specifically, by assigning a PID that is not used for a main service (or a null PID) to a mobile service, the transmitter 200 may refer to the PID of the data packet that is being inputted, thereby being capable of identifying the main service data packet, the mobile service data packet of the first mobile mode, and the mobile service data packet of the second mobile mode.

The TS packet multiplexer 162 of the transport multiplexer 160 multiplexes the main service data packet being outputted from the main service multiplexer 161 with the mobile service data packet of the first mobile mode and/or the second mobile mode being outputted from the mobile service multiplexer 150. Then, the TS packet multiplexer 162 transmits the multiplexed data packets to the transmitter 200. If there are no main service data being outputted from the main service multiplexer 161, only the mobile service data packets being outputted from the mobile service multiplexer 150 are transmitted to the transmitter 200.

At this point, the output data rate of the TS packet multiplexer 162 included in the transport multiplexer 160 does not reach 19.39 Mbps. This is because, in case of the mobile service data, additional encoding is performed on the mobile service data by a pre-processor of the transmitter 200, thereby increasing the data size.

For example, since the pre-processor of the transmitter performs an encoding process on the mobile service data at a coding rate of 1/2 or lower, the amount (or size) of the data being outputted from the pre-processor becomes two times larger than the inputted data or more. Therefore, the sum of the data rate of the main service data being multiplexed by the service multiplexer 100 and the data rate of the mobile service data is always equal to or less than 19.39 Mbps.

The service multiplexer 100 according to the embodiment of the present invention may perform diverse exemplary embodiments in order to match the final output data rate of the TS Packet multiplexer 162 to 19.39 Mbps.

For example, a null packet generator 130 generates a null data packet and outputs the generated null data packet to the TS packet multiplexer 162. And, the TS Packet multiplexer 162 multiplexes the null data packet, the mobile service data packet, and the main service data packet, so as to match the output data rate to 19.39 Mbps. If there is no main service data packet being outputted from the main service multiplexer 161, the TS Packet multiplexer 162 multiplexes the null data packet with the mobile service data packet, so as to match the output data rate to 19.39 Mbps.

At this point, the null data packet is transmitted to the transmitter 200, thereby being discarded. More specifically, the null data packet is not transmitted to the receiving system. In order to do so, identification information for identifying the null data is also required. Herein, the identification information for identifying the null data may also use a value pre-decided based upon an agreement between the transmitting system and the receiving system and may also be configured of a separate set of data. And, the identification information for identifying the null data may also change a predetermined position value within the null data packet and use the changed value. For example, the null packet generator 130 may modify (or change) a synchronization byte value within the header of the null data packet, thereby using the changed value as the identification information. Alternatively, the transport_error_indicator flag may be set to '1', thereby being used as the identification information. According to the embodiment of the present invention, the transport_error_indicator flag within the header of the null data packet is used as the identification information for identifying the null data packet. In this case, the transport_error_indicator flag of the null data packet is set to '1', and the transport_error_indicator flag for each of the other remaining data packets is reset to '0', so that the null data packet can be identified (or distinguished).

More specifically, when the null packet generator 130 generated a null data packet, and if, among the fields included in the header of the null data packet, the transport_error_indicator flag is set to '1' and then transmitted, the transmitter 200 may identify and discard the null data packet corresponding to the transport_error_indicator flag.

Herein, any value that can identify the null data packet may be used as the identification information for identifying the null data packet. Therefore, the present invention will not be limited only to the example proposed in the description of the present invention.

Meanwhile, signaling data, such as transmission parameters, are required for enabling the transmitter 200 to process the mobile service data.

According to an embodiment of the present invention, the transmission parameter is inserted in the payload region of the OM packet, thereby being transmitted to the transmitter.

At this point, in order to enable the transmitter 200 to identify the insertion of the transmission parameter in the OM packet, identification information that can identify the insertion of the transmission parameter in the type field of the corresponding OM packet (i.e., OM_type field).

More specifically, an operations and maintenance packet (OMP) is defined for the purpose of operating and managing the transmitting system. For example, the OMP is configured in an MPEG-2 TS packet format, and the value of its respective PID is equal to '0x1FFA'. The OMP consists of a 4-byte header and a 184-byte payload. Among the 184 bytes, the first byte corresponds to the OM_type field indicating the type of the corresponding OM packet (OMP). And, the remaining 183 bytes correspond to an OM_payload field, wherein actual data are inserted.

According to the present invention, among the reserved field values of the OM_type field, a pre-arranged value is used, thereby being capable of indicating that a transmission parameter has been inserted in the corresponding OM packet. Thereafter, the transmitter 200 may locate (or identify) the corresponding OMP by referring to the respective PID. Subsequently, by parsing the OM_type field within the OMP, the transmitter 200 may be able to know (or recognize) whether or not a transmission parameter has been inserted in the corresponding OM packet.

The transmission parameters that can be transmitted to the OM packet include M/H frame information (e.g., M/H frame_index), FIC information (e.g., next_FIC_version_number), parade information (e.g., number_of_parades, parade_id, parade_repetition_cycle, and ensemble_id), group information (e.g., number_of_group and start_group_number), SCCC information (e.g., SCCC_block_mode and SCCC_outer_code_mode), RS frame information (e.g., RS_Frame_mode and RS_frame_continuity_counter), RS encoding information (e.g., RS_code_mode), and so on.

At this point, the OM packet in which the transmission parameter is inserted may be periodically generated by a constant cycle, so as to be multiplexed with the mobile service data packet.

The multiplexing rules and the generation of null data packets of the mobile service multiplexer 150, the main service multiplexer 161, and the TS packet multiplexer 160 are controlled by the controller 110.

Transmitter

Figure 38:
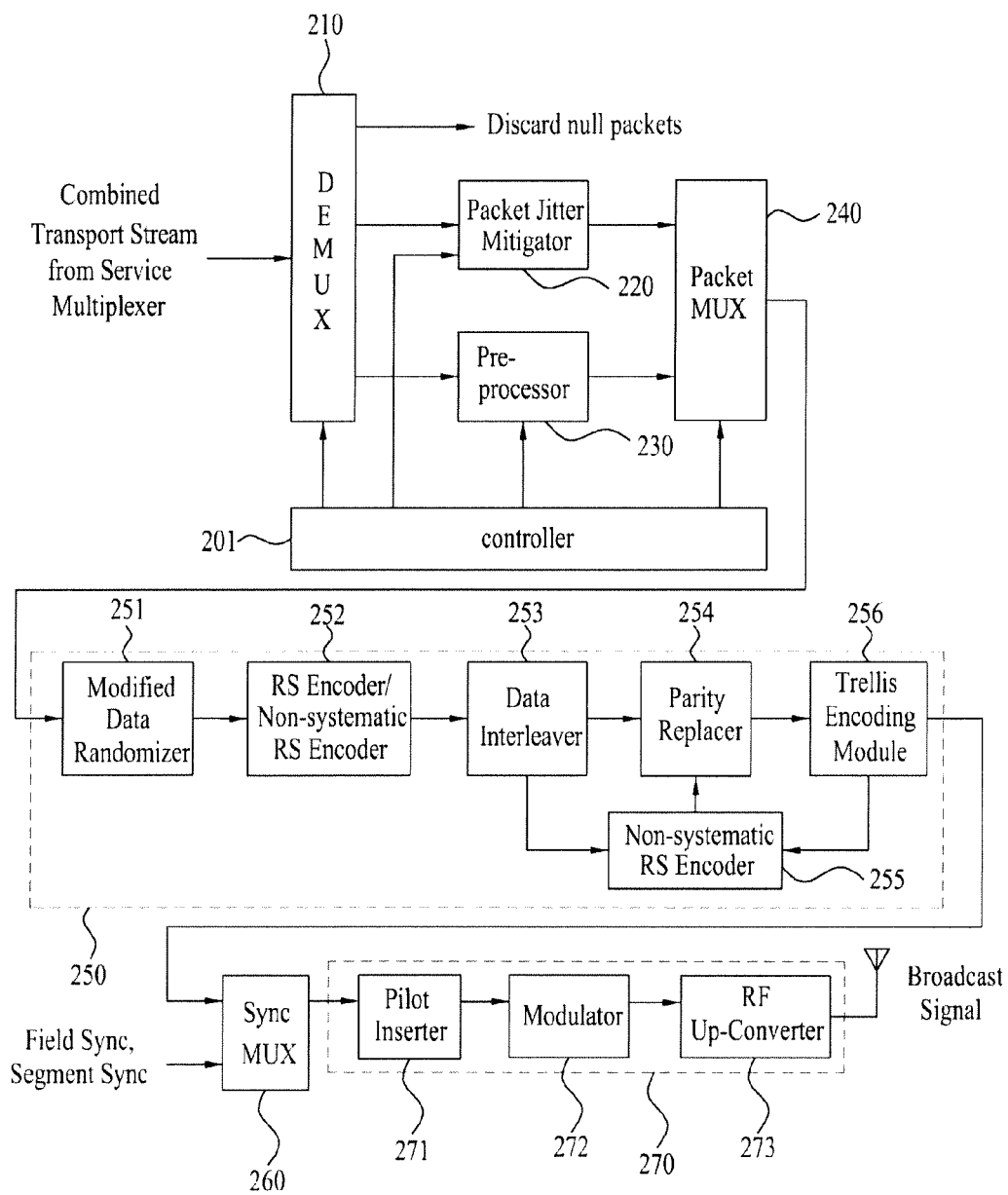
FIG. 38 illustrates a block view showing a structure of a transmitter according to an embodiment of the present invention.

FIG. 38 illustrates a block view showing a structure of a transmitter according to an embodiment of the present invention. Herein, the transmitter may include a Packet timing & PCR adjustment 220, a Pre-Processor 230, a packet multiplexer (MUX) 240, a Post-Processor 250, a Sync multiplexer (MUX) 260, and a transmission unit 270.

Main service data packets are inputted to the Packet timing & PCR adjustment 220, and the mobile service data packets of the first mobile mode and the mobile service data packets of the second mobile mode are inputted to the Pre-Processor 230. A demultiplexer (Demux) 210 exists are the front portion of the transmitter, so as to be able to identify (or differentiate) the main service data packets from the mobile service data packets. The Demux 210 may also identify (or differentiate) the mobile service data packets of the first mobile mode from the mobile service data packets of the second mobile mode. Moreover, when an OM packet is included in a data packet, and when a transmission parameter is included in the OM packet, the corresponding transmission parameter may be extracted so as to be inputted to the respective block of the Pre-Processor 230 and the Post-Processor 250, and the OM packet may be discarded (or deleted). A controller 201, which is configured to extract the transmission parameter and to output the extracted transmission parameter to the corresponding block, may be included in the transmitter. Furthermore, if a null data packet is included in the data packet, the null data packet is discarded (or deleted) at the front portion of the transmitter.

The Pre-Processor 230 performs an additional encoding process of the mobile service data of the first mobile mode extracted from the mobile service data packet of the first mobile mode and/or the mobile service data of the second mobile mode extracted from the mobile service data packet of the second mobile mode and also performs a group forming process enabling data that are to be transmitted (or carried) over a transmission frame to be placed in a specific position depending upon the characteristics of the data. This is to allow the mobile service data to respond more swiftly and with robustness against noise and change in channels.

Figure 39:
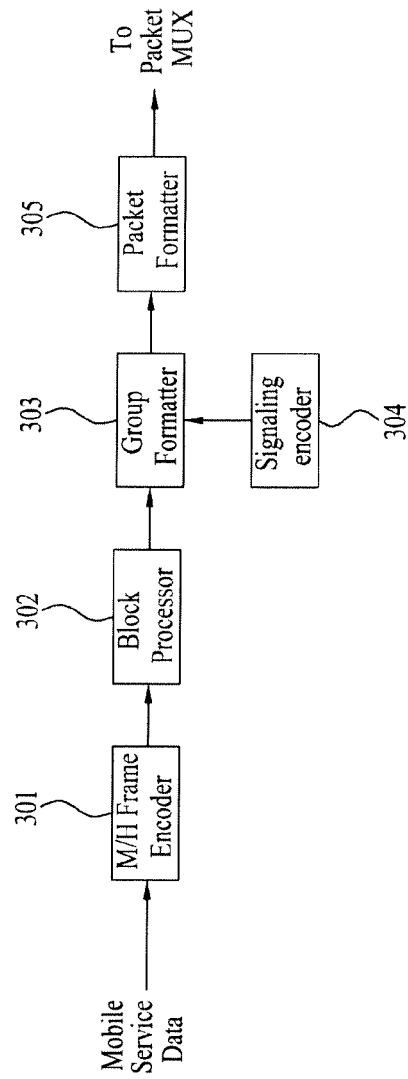
FIG. 39 illustrates a block view showing a structure of a preprocessor according to an embodiment of the present invention.

As shown in FIG. 39, the pre-processor 230 may include an M/H Frame Encoder 301, a Block Processor 302, a Group Formatter 303, a Signaling Encoder 304, and a Packet Formatter 305.

The M/H Frame Encoder 301 data-randomizes the mobile service data of the first mobile mode and/or the mobile service data of the second mobile mode and performs RS-CRC encoding on the data-randomized data, so as to form (or create) an RS frame. Herein, the mobile service data included in the RS frame may correspond to the mobile service data of the first mobile mode, or may correspond to the mobile service data of the second mobile mode. Alternatively, the RS frame may include both the mobile service data of the first mobile mode and the mobile service data of the second mobile mode.

The Block Processor 302 performs SCCC outer encoding on the output of the M/H frame encoder 301. More specifically, the block processor 302 performs another encoding process on the error-correction encoded and inputted data of each RS frame at a coding rate of 1/H (wherein H is an integer greater than or equal to 2), thereby outputting the 1/H-rate encoded data to the group formatter 303. According to the embodiment of the present invention, the input data are encoded at one of a coding rate of 1/2 (also referred to as a 1/2 coding rate), a coding rate of 1/3 (also referred to as a 1/3 coding rate), and a coding rate of 1/4 (also referred to as a 1/4 coding rate), thereby being outputted. The data of the RS frame that are outputted from the M/H frame encoder 301 include raw (i.e., non-processed) mobile service data, CRC data, stuffing data, and so on. However, in a broader definition, such data all correspond to data for mobile services.

Therefore, the data of each frame will hereinafter be described under the assumption that the data all correspond to mobile service data.

According to the embodiment of the present invention, the mobile service data of the first mobile mode are encoded at a coding rate of 1/2 or 1/4, and the mobile service data of the second mobile mode are encoded at a coding rate of 1/2, or 1/4, or 1/3. At this point, the SCCC outer encoding process of the block processor 301 is performed in SCCC block units. Herein, one SCCC block may be configured of a region within the group, or may be configured of a group division, or may be configured of an M/H block.

The group formatter 303 inserts mobile service data that are processed with SCCC outer encoding and outputted from the block processor 302 in a respective region within a group being formed in accordance with a pre-defined rule. Thereafter, the group formatter 303 inserts place holders and known data, which replace the main service data, MPEG-2 header, non-systematic RS parity data, and so on, in a respective region within the group. The group formatter 303 may also insert signaling information being encoded and outputted from the signaling encoder 304 in a respective region within the group.

When diverse place holders, known data, signaling information, and so on, are inserted in the respective regions within the corresponding group, the group formatter 303 deinterleaves the corresponding group and outputs the deinterleaved group to the packet formatter 305. At this point, the deinterleaving process corresponds to an inverse process of the data interleaver included in the post-processor 250.

The signaling encoder 304 performs error correction encoding on the signaling information that is to be inserted in the signaling information region. Herein, the signaling information may include Transmission Parameter Channel (TPC) and Fast Information Channel.

The packet formatter 305 gathers data deinterleaved and inputted so as to form a 188-byte unit mobile service data packet (i.e., MPEG TS packet), thereby providing the formed mobile service data packet to the packet multiplexer (MUX) 240.

At this point, the packet formatter 305 removes the place holder of the non-systematic RS parity from the output of the group formatter 303 and, also, replaces the place holder of the MPEG-2 header with an MPEG-2 header value having a pre-defined PID among the PIDs that are not used in the main service data packet.

Thereafter, 1 byte of MPEG-2 TS sync byte is added to the very beginning of the 187-byte packet obtained as a result of the above-described process, thereby forming a 188-byte unit mobile service data packet.

The packet MUX 240 multiplexes the mobile service data packet being processed with packet-formatting and outputted from the packet formatter 305 with the main service data packet being outputted from the Packet timing & PCR adjustment 220. Thereafter, the packet MUX 240 outputs the multiplexed data packets to the post-processor 250.

The post-processor 250 may include a Modified Data Randomizer (or Data Randomizer) 251, a Systematic/non-systematic RS Encoder 252, a Data Interleaver (or Interleaver) 253, a Parity Replacer 254, a Non-systematic RS Encoder 255, and a Modified Trellis Encoder 256.

When the inputted data correspond to a main service data packet, the Modified Data Randomizer 251 performs a randomizing process identical to that of the conventional randomizer More specifically, the Modified Data Randomizer 251 discards (or deletes) the sync byte within the main service data packet and uses a pseudo random byte generated from within the remaining 187 bytes, so as to perform the randomizing process, thereby outputting the processed data to the Systematic/non-systematic RS Encoder 252.

Conversely, when the inputted data correspond to a mobile service data packet, only a portion of the data packet may be randomized. For example, when it is assumed that the pre-processor 230 has performed randomizing in advance on the mobile service data, the Modified Data Randomizer 251 discards (or deletes) the sync byte among the 4 bytes of the MPEG header included in the mobile service data packet. Then, the Modified Data Randomizer 251 performs randomizing only on the remaining 3 bytes, thereby outputting the processed data bytes to the Systematic/non-systematic RS Encoder 252. More specifically, the randomizing process is not performed on the remaining mobile service data excluding the MPEG header, and the non-processed mobile service data are outputted to the Systematic/non-systematic RS Encoder 252. The Modified Data Randomizer 251 may or may not perform randomizing on the known data and initialization data place holders included in the mobile service data packet.

The Systematic/non-systematic RS Encoder 252 performs RS encoding on the data being randomized by the Modified Data Randomizer 251 or the data bypassing the Modified Data Randomizer 251, so as to add 20 bytes of RS parity data to the corresponding data, thereby outputting the processed data to the data interleaver 253. At this point, when the inputted data correspond to a main service data packet, the Systematic/non-systematic RS Encoder 252 performs the same systematic RS encoding process as the conventional broadcasting system, thereby adding the 20 bytes of RS parity data behind the 187-byte data. Also, when the inputted data correspond to a mobile service data packet, the Systematic/non-systematic RS Encoder 252 performs non-systematic RS encoding. Then, the Systematic/non-systematic RS Encoder 252 inserts the 20 bytes of RS parity data obtained from the non-systematic RS encoding process in a pre-decided parity byte place within the data packet.

Herein, the data interleaver 253 corresponds to a byte-unit convolutional interleaver.

The output of the data interleaver 253 is inputted to the parity replacer 254 and the Non-systematic RS Encoder 255.

Meanwhile, in order to set the data outputted from the Modified Trellis Encoder 256, which is positioned at the end portion of the parity replacer 254, as known data pre-defined based upon an agreement between the transmitting system and/or the receiving system, the memory within the Modified Trellis Encoder 256 is required to be initialized. More specifically, the memory of the Modified Trellis Encoder should first be initialized before the inputted known data sequence is trellis encoded.

At this point, the beginning (or starting point) of the known data sequence that is being inputted does not correspond to the actual known data but corresponds the initialization data place holder inserted by the group formatter 303 within the pre-processor 230. Therefore, a process of generating initialization data immediately before the inputted known data sequence is trellis encoded and of replacing the respective trellis memory initialization data place holder with the generated initialization data is required.

Furthermore, the value of the trellis memory initialization data is decided based upon the state of the memory of the Modified Trellis Encoder 256, so that the trellis memory initialization data can be generated. Also, due to the influence of the replaced initialization data, a process of recalculating the RS parity and replacing the RS parity being outputted from the data interleaver 253 with the recalculated RS parity is required.

Accordingly, the Non-systematic RS Encoder 255 receives a mobile service data packet including an initialization data place holder, which is to be replaced with the initialization data, from the data interleaver 253, and the Non-systematic RS Encoder 255 also receives initialization data from the Modified Trellis Encoder 256. Additionally, the Non-systematic RS Encoder 255 replaces the initialization data place holder included in the mobile service data packet with the received initialization data, removes (or deletes) the RS parity data added to the mobile service data packet, and then performs non-systematic RS encoding on the processed mobile service data packet. Thereafter, the Non-systematic RS Encoder 255 outputs the RS parity data obtained from the non-systematic RS encoding process to the parity replacer 254. Accordingly, the parity replacer 254 selects the output of the data interleaver 253 for the data included in the mobile service data packet and selects the output of the Non-systematic RS Encoder 255 for the RS parity, thereby outputting the selected data to the Modified Trellis Encoder 256.

Meanwhile, when a main service data packet is inputted, or when a mobile service data packet, which does not include any initialization data place holder that is to be replaced, is inputted, the parity replacer 254 selects the data being outputted from the data interleaver 253 and the RS parity, thereby directly outputting the selected data to the Modified Trellis Encoder 256 without any data modification.

The Modified Trellis Encoder 256 converts the byte-unit data being outputted from the parity replacer 254 to symbol-unit data, and performs a 12-way interleaving process on the converted data and trellis encodes the 12-wat interleaved data, thereby outputting the processed data to the sync multiplexer 260.

The sync multiplexer 260 inserts a field sync and a segment sync to the data outputted from the Modified Trellis Encoder 256, thereby outputting the processed data to a pilot inserter 271 of the transmission unit 270.

The pilot-inserted data processed by the pilot inserter 271 are modulated by a modulator 272 by using a pre-determined modulation method, e.g., a VSB method. Thereafter, the modulated data are transmitted to each receiving system through an RF up-converter (or transmission unit) 273.

Specific Explanation of M/H Frame Encoder

FIG. 40 illustrates a payload of an RS frame being outputted from a data frame encoder according to an embodiment of the present invention.

Payloads of the RS frame are gathered (or collected) to form an ensemble. Herein, an ensemble corresponds to a collection of services having the same quality of service (QoS).

A data frame encoder 103 includes at least one or more RS frame encoders. Herein, one RS frame encoder receives one RS frame payload and encodes the received RS frame payload, thereby outputting the encoded RS frame payload.

According to the embodiment of the present invention, the RS frame payload has the size of (N×187) bytes, as shown in FIG. 38. Herein, N represents the length of a row (i.e., the number of columns), and 187 indicates the length of a column (i.e., the number of rows).

According to the embodiment of the present invention, each row configured of N bytes will be referred to as a mobile service data packet for simplicity. The mobile service data packet may include a 2-byte header and an (N-2)-byte mobile service payload. Herein, the assignment of 2 bytes to the header region is merely exemplary. Accordingly, the assignment of the data bytes may be varied and modified by the system designer. Therefore, the present invention will not be limited only to the examples given in the description of the present invention.

One RS frame payload is created by gathering (or collecting) table information and/or IP datagrams having the size of (N-2)×187 bytes from one ensemble. Also, one RS frame payload may include table information and IP datagrams corresponding to at least one or more mobile services. For example, IP datagrams and table information for two different types of mobile services, such as news (e.g., IP datagram for mobile service 1) and stock information (e.g., IP datagram for mobile service 2), may be included in one RS frame payload.

More specifically, table information of a section structure or IP datagrams of mobile service data may be assigned to a mobile payload within a mobile service data packet included in the RS frame payload. Alternatively, IP datagrams of table information or IP datagrams of mobile service data may be assigned to a mobile payload within a mobile service data packet included in the RS frame payload.

In case the size of a mobile service data packet does not reach the size of N bytes, even when including a mobile header, stuffing data bytes may be assigned to the remaining payload portion of the corresponding mobile service data packet. For example, after assigning program table information to a mobile service data packet, if the length of the mobile service data packet including the header is (N-20) bytes, stuffing data bytes may be assigned to the remaining 20-byte portion of the corresponding mobile service data packet.

FIG. 41 is a diagram illustrating examples of fields allocated to the header region within the mobile service data packet according to the present invention. Examples of the fields include type_indicator field, error_indicator field, stuff_indicator field, and pointer field.

The type_indicator field can allocate 3 bits, for example, and represents a type of data allocated to payload within the corresponding mobile service data packet. In other words, the type_indicator field indicates whether data of the payload is IP datagram or program table information. At this time, each data type constitutes one logical channel. In the logical channel which transmits the IP datagram, several mobile services are multiplexed and then transmitted. Each mobile service undergoes demultiplexing in the IP layer.

The error_indicator field can allocate 1 bit, for example, and represents whether the corresponding mobile service data packet has an error. For example, if the error_indicator field has a value of 0, it means that there is no error in the corresponding mobile service data packet. If the error_indicator field has a value of 1, it means that there may be an error in the corresponding mobile service data packet.

The stuff_indicator field can allocate 1 bit, for example, and represents whether stuffing byte exists in payload of the corresponding mobile service data packet. For example, if the stuff_indicator field has a value of 0, it means that there is no stuffing byte in the corresponding mobile service data packet. If the stuff_indicator field has a value of 1, it means that stuffing byte exists in the corresponding mobile service data packet.

The pointer field can allocate 11 bits, for example, and represents position information where new data (i.e., new signaling information or new IP datagram) starts in the corresponding mobile service data packet.

For example, if IP datagram for mobile service 1 and IP datagram for mobile service 2 are allocated to the first mobile service data packet within the RS frame payload as illustrated in FIG. 39, the pointer field value represents the start position of the IP datagram for mobile service 2 within the mobile service data packet.

Also, if there is no new data in the corresponding mobile service data packet, the corresponding field value is expressed as a maximum value exemplarily. According to the embodiment of the present invention, since 11 bits are allocated to the pointer field, if 2047 is expressed as the pointer field value, it means that there is no new data in the packet. The point where the pointer field value is 0 can be varied depending on the type_indicator field value and the stuff_indicator field value.

It is to be understood that the order, the position, and the meaning of the fields allocated to the header within the mobile service data packet illustrated in FIG. 41 are exemplarily illustrated for understanding of the present invention. Since the order, the position and the meaning of the fields allocated to the header within the mobile service data packet and the number of additionally allocated fields can easily be modified by those skilled in the art, the present invention will not be limited to the above example.

FIGS. 42(*a*) to 42(*b*) illustrate an example of a data frame encoder according to the present invention.

(a) of FIG. 42 corresponds to an example of a data frame encoder 301. The data frame encoder 301 receives a plurality of ensembles, and an input demultiplexer outputs the received ensembles by distributing the received ensembles to each RS frame encoder. The output of each RS frame encoder passes through an output multiplexer, so as to become the output of the data frame encoder 301. According to the embodiment of the present invention, one data frame encoder includes a number of RS frame encoders corresponding to the number of the received ensembles.

(b) of FIG. 42 corresponds to an example of an RS frame encoder. The RS frame encoder may include a data randomizer, an RS-CRC encoder, and an RS Frame divider.

A CMM primary ensemble, a CMM secondary ensemble, an EMM primary ensemble, an EMM secondary ensemble, and a super ensemble may be inputted as the input of the RS frame encoder.

The randomizer within the RS frame encoder randomizes an (N×187)-byte RS frame payload included in the received ensemble. Thereafter, the randomized result is outputted to the RS-CRC encoder.

Figure 43:
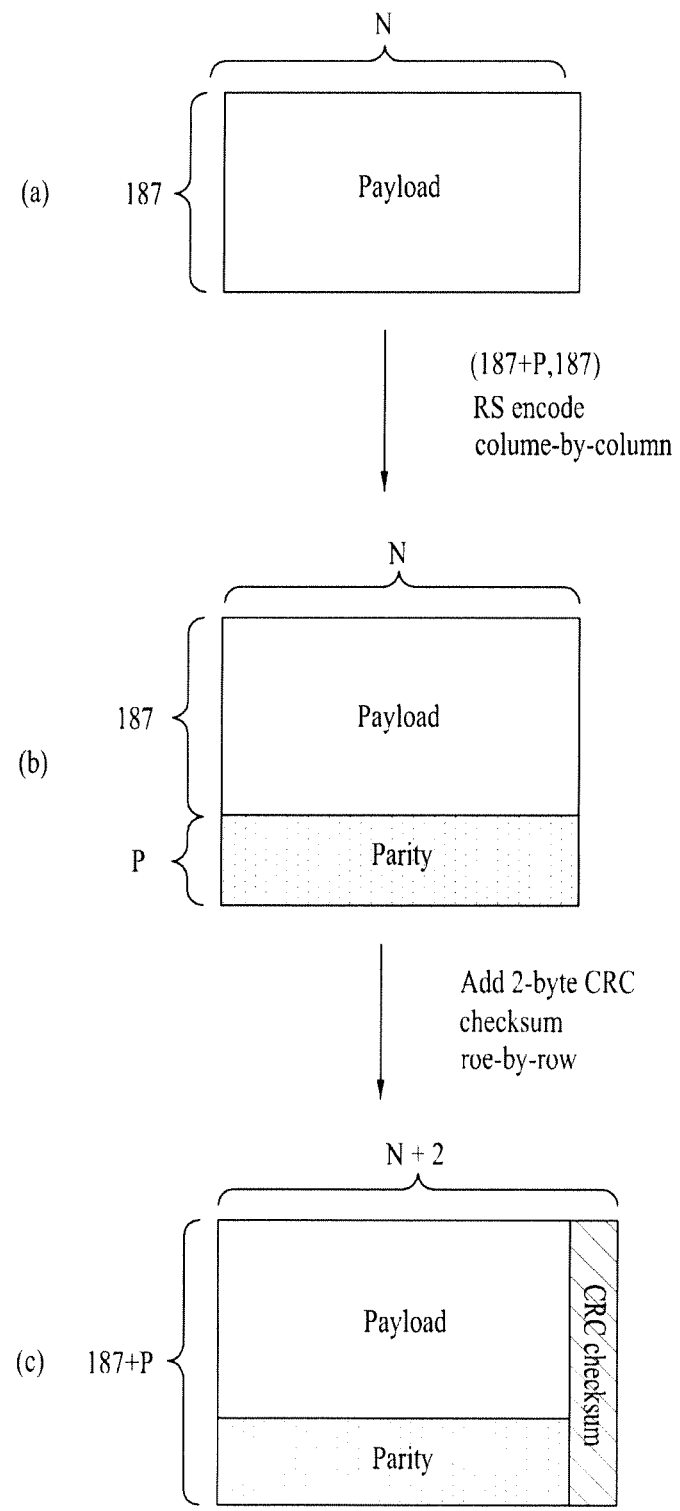
FIGS. 43(a) to 43(c) illustrate the operations of an RS-CRC encoder according to an embodiment of the present invention.

FIGS. 43(*a*) to 43(*c*) illustrate the operations of an RS-CRC encoder according to an embodiment of the present invention.

FIG. 43(*a*) illustrates an example of an RS frame being generated from the RS-CRC encoder according to the present invention.

The RS-CRC encoder performs a (Nc,Kc)-RS encoding process on each column, so as to generate Nc-Kc(=P) number of parity bytes. Then, the RS-CRC encoder adds the newly generated P number of parity bytes after the very last byte of the corresponding column, thereby creating a column of (187+P) bytes. Herein, as shown in FIG. 41(*a*), Kc is equal to 187 (i.e., Kc=187), and Nc is equal to 187+P (i.e., Nc=187+P). Herein, the value of P may vary depending upon the RS code mode. Table a below shows an example of an RS code mode, as one of the RS encoding information.

TABLE 1

| RS code mode | RS code | Number of parity bytes (P) |
|---|---|---|
| 00 | (211, 187) | 24 |
| 01 | (223, 187) | 36 |

TABLE 1-continued

| RS code mode | RS code | Number of parity bytes (P) |
|---|---|---|
| 10 | (235, 187) | 48 |
| 11 | Reserved | Reserved |

Table 1 shows an example of 2 bits being assigned in order to indicate the RS code mode. The RS code mode represents the number of parity bytes corresponding to the RS frame payload.

Figure 45:
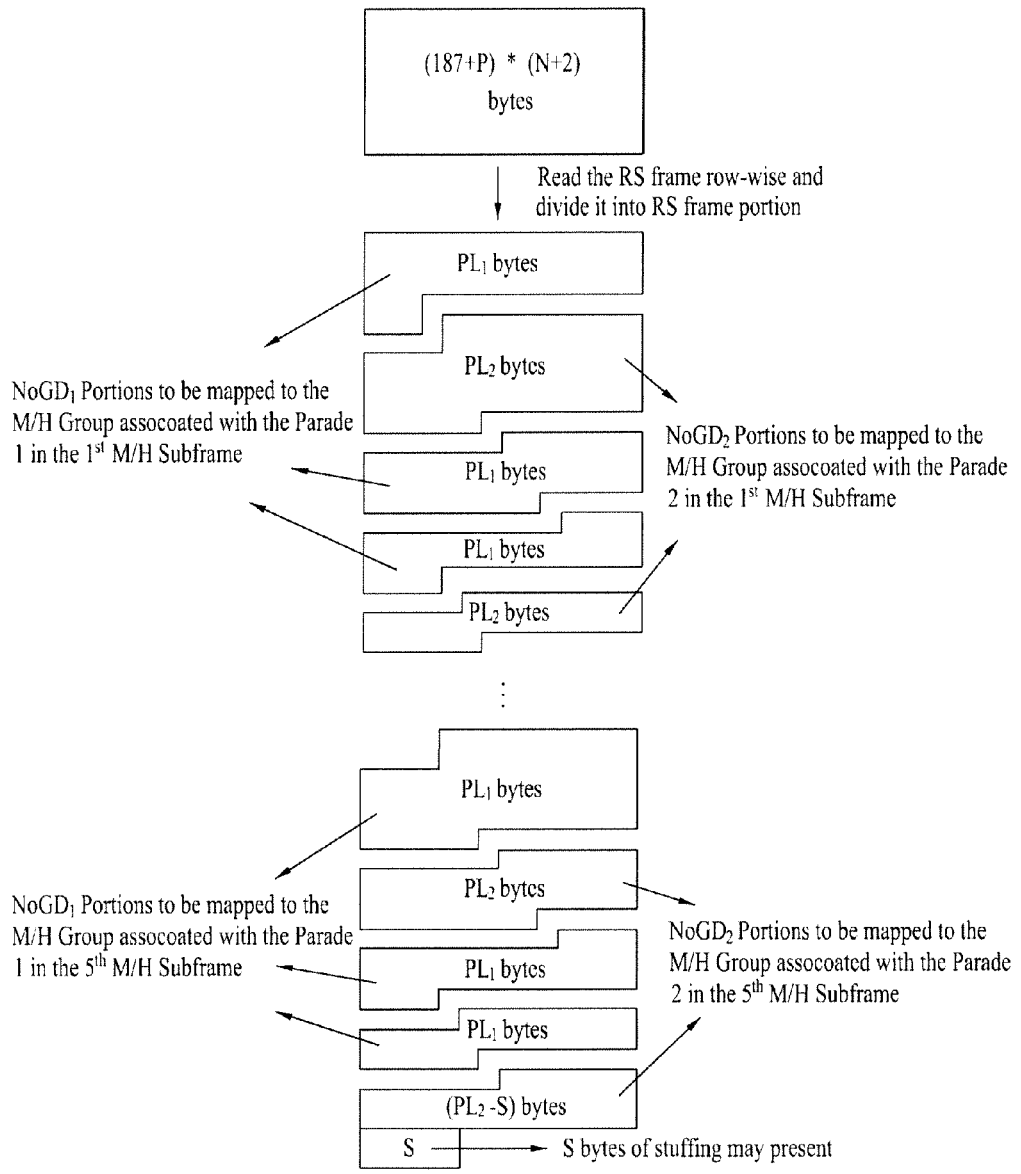
FIG. 45 illustrates the operation of the RS frame divider according to an embodiment of the present invention, when the output of the RS frame encoder corresponds to a super RS frame.

For example, when the RS code mode value is equal to '10', (235,187)-RS-encoding is performed on the RS frame payload of FIG. 45(*a*), so as to generate 48 parity data bytes. Thereafter, the 48 parity bytes are added after the last data byte of the corresponding column, thereby creating a column of 235 data bytes.

When such RS encoding process is performed on all N number of columns, a size of N(row)×(187+P)(column) bytes may be generated, as shown in FIG. 41(*b*).

The RS-CRC encoder may perform CRC encoding on the mobile service data being RS encoded so as to create (or generate) the CRC data. The CRC data being generated by CRC encoding may be used to indicate whether the mobile service data have been damaged while being transmitted through the channel.

The present invention may also use different error detection encoding methods other than the CRC encoding method. Alternatively, the present invention may use the error correction encoding method to enhance the overall error correction ability of the receiving system.

FIG. 43(*c*) illustrates an example of using a 2-byte (i.e., 16-bit) CRC checksum as the CRC data. Herein, a 2-byte CRC checksum is generated for N number of bytes of each row, thereby adding the 2-byte CRC checksum at the end of the N number of bytes. Thus, each row is expanded to (N+2) number of bytes. Equation 2 below corresponds to an exemplary equation for generating a 2-byte CRC checksum for each row being configured of N number of bytes.

$$g(x)x^{16}+x^{12}+x^5+1 \qquad \text{[Equation 2]}$$

The process of adding a 2-byte checksum in each row is only exemplary. Therefore, the present invention is not limited only to the example proposed in the description set forth herein. As described above, when the process of RS encoding and CRC encoding are completed, the (N×187)-byte RS frame payload is converted into a (N+2)×(187+P)-byte RS frame.

The RS frame having the size of (N+2)×(187+P) bytes, which is created by the RS-CRC encoder, is outputted to the RS frame divider.

When an RS frame payload created from a primary ensemble is inputted to the RS frame encoder, the RS-CRC encoder generates (or creates) a primary RS frame. Thereafter, the generated primary RS frame passes through the RS frame divider, so as to be transmitted through the primary parade.

When an RS frame payload created from a secondary ensemble is inputted to the RS frame encoder, the RS-CRC encoder generates (or creates) a secondary RS frame. Thereafter, the generated secondary RS frame passes through the RS frame divider, so as to be transmitted through the secondary parade.

When an RS frame payload created from a super ensemble is inputted to the RS frame encoder, the RS-CRC encoder generates (or creates) a super RS frame. Thereafter, the generated super RS frame passes through the RS frame divider, so as to be transmitted through two different parades. At this point, each of the two different parades may respectively correspond to one of an EMM primary parade, an EMM Class 1 secondary parade, and an EMM Class 2 secondary parade.

When the output of the RS frame encoder corresponds to a primary RS frame or a secondary RS frame, the number of columns N included in the RS frame may be decided in accordance with Equation 3 shown below.

$$N = \left\lfloor \frac{5 \times NoGD \times PL}{187+P} \right\rfloor - 2 \qquad \text{[Equation 3]}$$

In Equation 3, NOGD signifies the number of group divisions having a parade assigned to one subframe. PL represents the number of serial concatenated convolution code (SCCC) payload bytes assigned to one group division. And, P indicates the number of RS parity bytes added to each column of the RS frame. Finally, corresponds to the greatest integer equal to or less than X.

In Equation 3, the PL value may be differently decided based upon the group type of the group having the corresponding parade assigned thereto, the type of a group region included in the group division having the corresponding parade assigned thereto, the SCCC coding rate of each group region, and a combination method of an SCCC block and a DATA block.

When the output of the RS frame encoder corresponds to a super RS frame, the number of columns N included in the RS frame may be decided in accordance with Equation 4 shown below.

$$N = \left\lfloor \frac{(5 \times NoGD_1 \times PL_1) + (5 \times NoGD_2 \times PL_2)}{187+P} \right\rfloor - 1 \qquad \text{[Equation 4]}$$

In Equation 4, among the two parades through which a super RS frame passing through the RS frame divider is to be transmitted, NOGD1 signifies the number of group divisions having the first parade assigned to one subframe, and PL1 represents the number of SCCC payloads of the group division assigned to the first parade. Also, among the two parades through which a super RS frame passing through the RS frame divider is to be transmitted, NOGD2 signifies the number of group divisions having the second parade assigned to one subframe, and PL2 represents the number of SCCC payloads of the group division assigned to the second parade. At this point, the order of the first parade and the second parade may be decided based upon the transmission order of the group divisions that are assigned to the parades. And, P indicates the number of RS parity bytes added to each column of the RS frame. Finally, corresponds to the greatest integer equal to or less than X.

In Equation 4, each of the PL 1 and PL2 values may be differently decided based upon the group type of the group having the corresponding parade assigned thereto, the type of a group region included in the group division having the corresponding parade assigned thereto, the SCCC coding rate of each group region, and a combination method of an SCCC block and a DATA block.

The RS frame divider receives the RS frame having the size of (N+2)×(187+P) bytes, which is outputted from the RS-CRC encoder. Thereafter, the RS frame divider divides the received RS frame into a plurality of portions, thereby outputting the divided portions.

Figure 44:
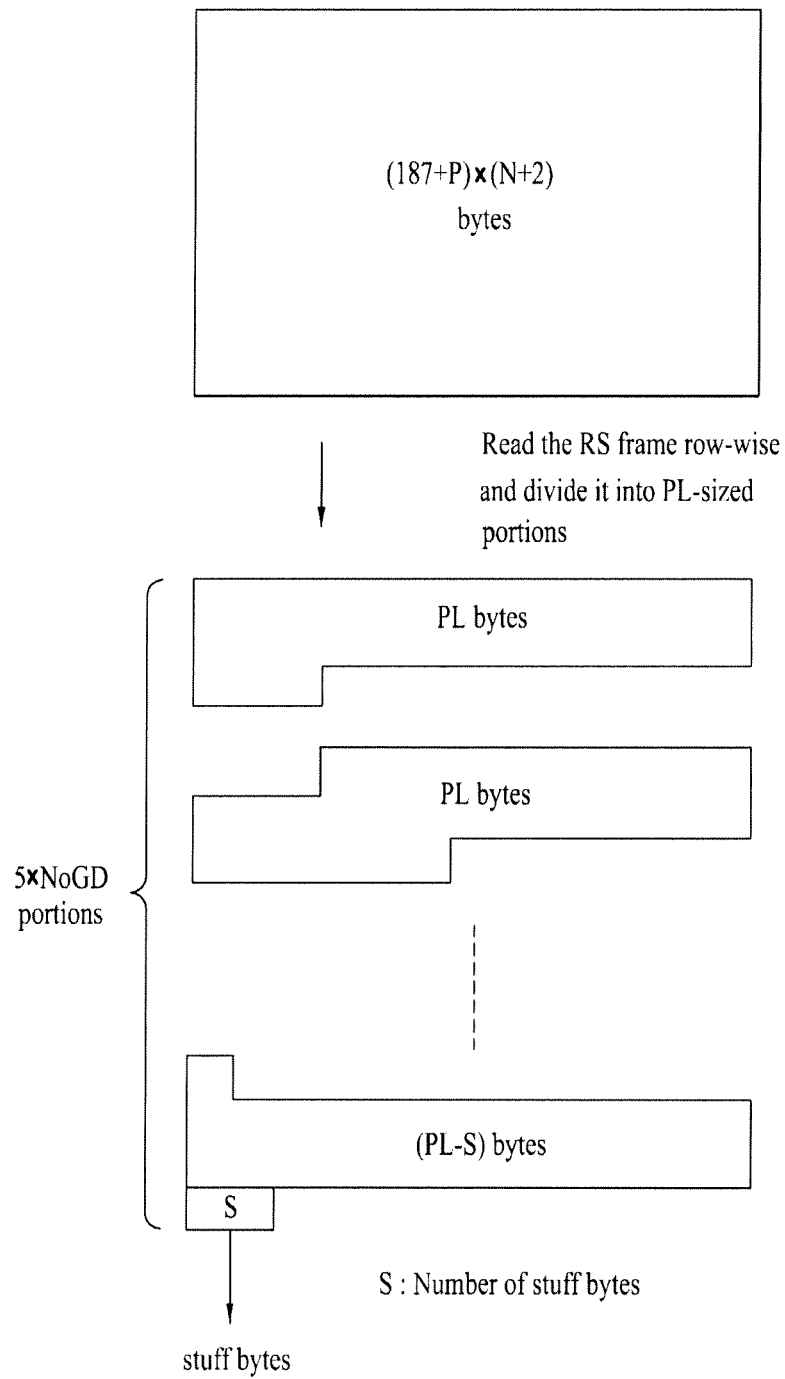
FIG. 44 illustrates the operation of the RS frame divider according to an embodiment of the present invention, when the output of the RS frame encoder corresponds to a primary RS frame or a secondary RS frame.

FIG. 44 illustrates the operation of the RS frame divider according to an embodiment of the present invention, when the output of the RS frame encoder corresponds to a primary RS frame or a secondary RS frame.

At this point, the number of portions divided and created from one RS frame is equal to 5×NOGD. Herein, 5 corresponds to the number of subframes existing in one M/H frame, and NOGD corresponds to the number of group divisions having a parade assigned to one subframe.

Herein, one portion includes data of PL bytes.

At this point, one portion is assigned to one group division, thereby being transmitted.

When dividing an RS frame having the size of (N+2)×(187+P) bytes into (5×NOGD) number of portions, wherein each portion includes PL bytes, one portion may have a byte size smaller than PL bytes. In this case, the last portion may include RS frame data having the size of (PL-S) bytes and may also include additional data byes of S bytes, wherein S has a random value. At this point, the value of S may be decided based upon Equation 5 shown below.

$$S=(5\times NoGD\times PL)-(187+P)\times(N+2) \qquad \text{[Equation 5]}$$

FIG. 45 illustrates the operation of the RS frame divider according to an embodiment of the present invention, when the output of the RS frame encoder corresponds to a super RS frame.

At this point, the number of portions divided and created from one RS frame is equal to 5×(NOGD1+NOGD2). Herein, 5 corresponds to the number of subframes existing in one M/H frame, and each of NOGD1 and NOGD2 corresponds to the number of group divisions having one of the first parade and the second parade, among the two parades through which a super RS frame passing through the RS frame divider is to be transmitted, assigned to one subframe. Herein, the order of the first parade and the second parade may be decided based upon the transmission order of the group divisions that are assigned to the parades.

One portion of the first parade includes data of PL1 bytes, and one portion of the second parade includes data of PL2 bytes.

At this point, one portion of PL1 bytes is assigned to a group division, through which the first parade is to be transmitted. Thereafter, the assigned portion of PL1 bytes is transmitted. Also, one portion of PL2 bytes is assigned to a group division, through which the second parade is to be transmitted. Thereafter, the assigned portion of PL2 bytes is transmitted.

When an RS frame having the size of (N+2)×(187+P) bytes is divided into (5×NOGD1+5×NOGD2) number of portions each having PL1 bytes or PL2 bytes, one portion may have a byte size smaller than PL1 bytes or PL2 bytes. In this case, when the last portion corresponds to a portion belonging to a group division assigned to the first parade, the last portion may include RS frame data having the size of (PL1-S) bytes and may also include additional data byes of S bytes, wherein S has a random value. Alternatively, when the last portion corresponds to a portion belonging to a group division assigned to the second parade, the last portion may include RS frame data having the size of (PL2-S) bytes and may also include additional data byes of S bytes, wherein S has a random value. At this point, the value of S may be decided based upon Equation 6 shown below.

$$S=(5\times NoGD_1\times PL_1+5\times NoGD_2\times PL_2)-\{(187+P)\times(N+2)\} \qquad \text{[Equation 6]}$$

Detailed Description of Block Processor

Figure 46:
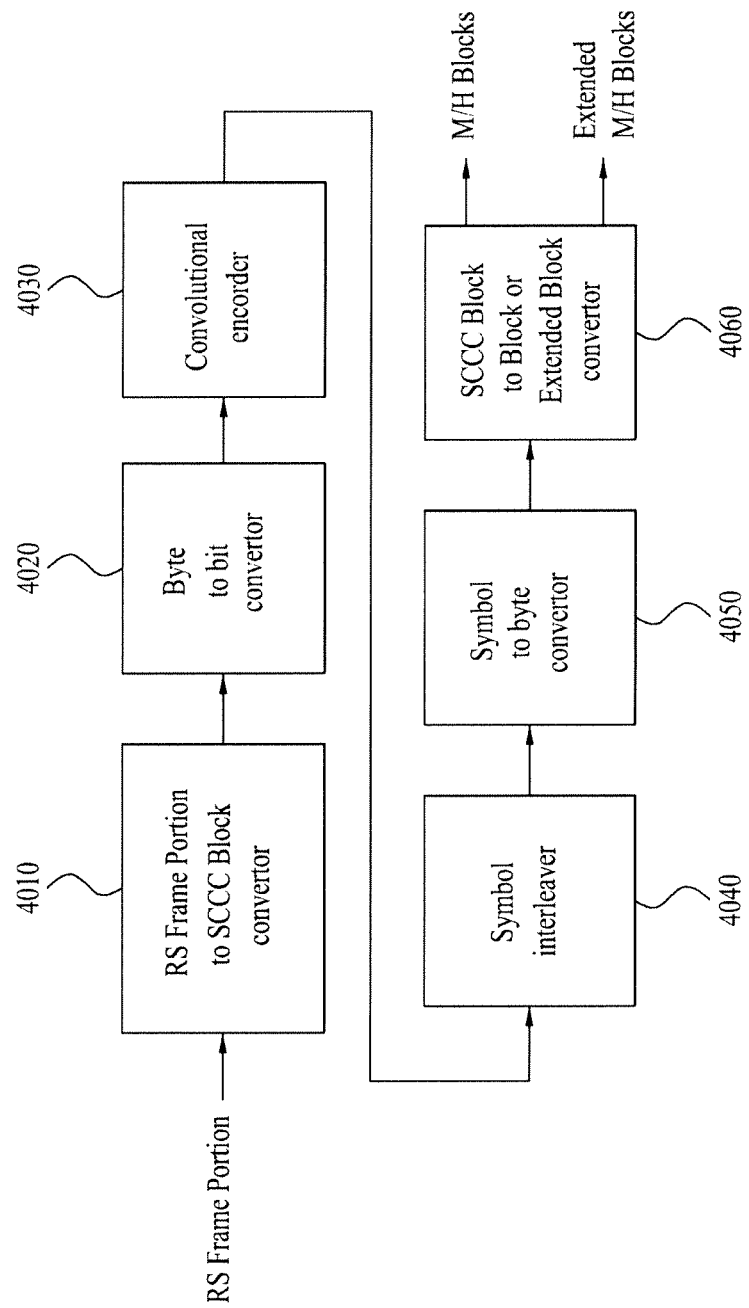
FIG. 46 is a block diagram of a block processor according to an embodiment of the present invention.

FIG. 46 is a block diagram of a block processor. The block processor receives an RS frame portion from an M/H frame encoder and configures an SCCC block.

With respect to a group of group type 0, one SCCC block may be composed of one M/H block or a plurality of M/H blocks. The group of group type 0 transmits only mobile service data of a first mobile mode and does not include an extended M/H block. Table 2 shows an embodiment of the configuration of the SCCC block of group type 2. In Table 2, an SCCC block mode represents a relation between M/H blocks and SCCC blocks.

TABLE 2

|  | SCCC Block Mode | |
|---|---|---|
| SCCC Block | 00<br>M/H Blocks | 01<br>M/H Blocks |
| SCB1 | B1 | B1, B6 |
| SCB2 | B2 | B2, B7 |
| SCB3 | B3 | B3, B8 |
| SCB4 | B4 | B4, B9 |
| SCB5 | B5 | B5, B10 |
| SCB6 | B6 |  |
| SCB7 | B7 |  |
| SCB8 | B8 |  |
| SCB9 | B9 |  |
| SCB10 | B10 |  |

If 1/H-rate encoding is performed in units of one M/H block with respect to the group of group type 0, M/H blocks B1 to B10 and SCCC blocks SCB1 to SCB10 are identical (SCB1=B1, SCB2=B2, SCB3=B3, SCB4=B4, SCB5=B5, SCB6=B6, SCB7=B7, SCB8=B8, SCB9=B9, SCB10=B10). For example, the M/H block B1 may be encoded at a 1/2 coding rate, the M/H block B2 may be encoded at a 1/4 coding rate, and the M/H block B3 may be encoded at a 1/2 coding rate. The same is true in the remaining M/H block. At this time, since the M/H block 0 (B0) and the M/H block 11 (B11) do not include mobile service data, they may be excluded from the SCCC block. This embodiment is an example of the SCCC block mode 00 of Table 2.

Alternatively, a plurality of M/H blocks within the regions A, B, C and D may be aggregated in one SCCC block and subjected to 1/H-rate encoding in units of one SCCC block. Thus, it is possible to improve reception performance of the region C/D. For example, the M/H blocks may be aggregated two by two so as to configure one SCCC block. For example, the M/H block B1 and the M/H block B6 may be aggregated to configure one SCCC (SCB1) block. Similarly, the M/H block B2 and the M/H block B7 may be aggregated to configure another SCCC (SCB2) block, the M/H block B3 and the M/H block B8 may be aggregated to configure another SCCC (SCB3) block, the M/H block B4 and the M/H block B9 may be aggregated to configure another SCCC (SCB4) block, and the M/H block B5 and the M/H block B10 may be aggregated to configure another SCCC (SCB5) block. In this case, 10 M/H blocks configure 5 SCCC blocks. This embodiment is an example of the SCCC block mode 01 of Table 2.

As another example, the M/H block B1 to the M/H block B5 are aggregated to configure one SCCC block and are subjected to 1/2-rate encoding, and the encoded mobile service data may be inserted from the M/H block B1 to the M/H block B5 of the group.

The M/H block B6 to the M/H block B10 are aggregated to configure another SCCC block and are subjected to 1/4-rate encoding, and the encoded mobile service data may be inserted from the M/H block B6 to the M/H block B10. In this case, one group includes two SCCC blocks.

If one SCCC block includes a plurality of M/H blocks, it is possible to compensate for reception performance of the regions C and D which have inferior reception performance to the region A, in reception environments with severe variation in channel quality. The number of main service data symbols is gradually increased from the region A to the region D, which causes performance deterioration of error correction coding. However, by configuring one SCCC block using a plurality of M/H blocks as described above, it is possible to reduce such performance deterioration.

With respect to a group of group type 1, one SCCC block may be composed of one M/H block or a plurality of M/H blocks. Alternatively, one SCCC block may be composed of one extended M/H block or a plurality of extended M/H blocks. The group of group type 1 transmits mobile service data of a first mobile mode through the M/H blocks B0 to B11 corresponding to the regions A, B, C and D and transmits mobile service data of a second mobile mode through the extended M/H blocks EB0 to EB4 corresponding to the region E. Accordingly, with respect to the group of group type 1, the case where one SCCC block is composed of M/H blocks and extended M/H blocks is excluded. At this time, since the M/H block 0 (B0) and the M/H block 11 (B11) do not include mobile service data, they may be excluded from the SCCC blocks.

Table 3 shows an embodiment of the configuration of the SCCC block of group type 1. In Table 3, an SCCC block mode represents a relation between M/H blocks and SCCC blocks.

TABLE 3

|  | SCCC Block Mode | |
|---|---|---|
| SCCC Block | 00<br>(Extended)<br>M/H Blocks | 01<br>(Extended)<br>M/H Blocks |
| SCB1 | B1 | B1, B6 |
| SCB2 | B2 | B2, B7 |
| SCB3 | B3 | B3, B8 |
| SCB4 | B4 | B4, B9 |
| SCB5 | B5 | B5, B10 |
| SCB6 | B6 | EB0~EB4 |
| SCB7 | B7 |  |
| SCB8 | B8 |  |
| SCB9 | B9 |  |
| SCB10 | B10 |  |
| SCB11 | EB0~EB4 |  |

In Table 3, if the SCCC block mode is 00, with respect to the M/H blocks for transmitting the mobile service data of the first mobile mode, one SCCC block is composed of one M/H block. This is identical to the case where the SCCC block mode is 00 in group type 0. With respect to the extended M/H blocks for transmitting the mobile service data of the second mobile mode, all extended M/H blocks are aggregated to configure one SCCC block.

If the SCCC block mode is 01, with respect to the M/H block for transmitting the mobile service data of the first mobile mode, one SCCC block is composed of two M/H blocks. This is identical to the case where the SCCC block mode is 01 in group type 0. With respect to the extended M/H block for transmitting the mobile service data of the second mobile mode, all extended M/H blocks are aggregated to configure one SCCC block.

With respect to a group of group type 2, one SCCC block may be composed of one M/H block or a plurality of M/H blocks. Alternatively, one SCCC block may be composed of one extended M/H block or a plurality of extended M/H blocks. One SCCC block may be composed of a combination of one or more M/H blocks and one or more extended M/H blocks. The group of group type 2 transmits mobile service data of a first mobile mode through the M/H blocks B3 to B8 corresponding to the regions A and B and transmits mobile service data of a second mobile mode through the M/H blocks B0 to B2 and B9 to B11 and the extended M/H blocks EB0 to EB4 corresponding to the regions C, D and E. Accordingly, with respect to the group of group type 2, the case where one SCCC block is composed of the M/H blocks corresponding to the regions A and B and the extended M/H blocks corresponding to the regions C, D and E or the extended M/H blocks is excluded.

Table 4 shows an embodiment of the configuration of the SCCC block of group type 2. In Table 4, an SCCC block mode represents a relation between M/H blocks and SCCC blocks.

TABLE 4

| | SCCC Block Mode | |
|---|---|---|
| SCCC Block | 00 (Extended) M/H Blocks | 01 (Extended) M/H Blocks |
| SCB1 | B3 | Not allowed |
| SCB2 | B4 | |
| SCB3 | B5 | |
| SCB4 | B6 | |
| SCB5 | B7 | |
| SCB6 | B8 | |
| SCB7 | B0~B2, B9, EB0, EB1 | |
| SCB8 | B10~B11, EB2~EB4 | |

In Table 4, if the SCCC block mode is 00, with respect to the M/H blocks B3 to B8 of the regions A and B for transmitting the mobile service data of the first mobile mode, one SCCC block is composed of one M/H block. This is identical to the case where the SCCC block mode is 00 in group type 0 and group type 1. With respect to the M/H blocks B0 to B2 and B9 to B11 and the extended M/H blocks EB0 to EB4 for transmitting the mobile service data of the second mobile mode, one SCCC block is composed of a plurality of M/H blocks and a plurality of extended M/H blocks.

In the above example, in the M/H blocks and the extended M/H blocks for transmitting the mobile service data of the second mobile mode, the M/H blocks and the extended M/H blocks located in the same segments belong to the same SCCC block. That is, B9 and EB1 are located in the same 16 segments so as to configure the same SCCC block. In addition, B10 and EB2 are located in the same 16 segments, the five segments of B11 are identical to the first five segments of EB3, and these M/H block and the extended M/H block configure the same SCCC block.

In the above example, the case where the SCCC block mode is 01 is not defined.

With respect to a group of group type 3, one SCCC block may be composed of one M/H block or a plurality of M/H blocks. One SCCC block may be composed of one extended M/H block or a plurality of extended M/H blocks. One SCCC block may be composed of a combination of one or more M/H blocks and one or more extended M/H blocks. The group of group type 2 does not transmit mobile service data of a first mobile mode and transmits mobile service data of a second mobile mode through all M/H blocks B0 to B11 and extended M/H blocks EB0 to EB4.

Table 5 shows an embodiment of the configuration of the SCCC block of group type 3. In Table 5, an SCCC block mode represents a relation between M/H blocks and SCCC blocks.

TABLE 5

| | SCCC Block Mode | |
|---|---|---|
| SCCC Block | 00 (Extended) M/H Blocks | 01 (Extended) M/H Blocks |
| SCB1 | Not allowed | B0~B2, B7 |
| SCB2 | | B3, B8, EB0 |
| SCB3 | | B4, B9, EB1 |
| SCB4 | | B5, B10, EB2 |
| SCB5 | | B6, B11, EB3, EB4 |

In Table 5, if the SCCC block mode is 01, one SCCC block is composed of a plurality of M/H blocks and a plurality of extended M/H blocks.

In the above example, in the M/H blocks and the extended M/H blocks, the M/H blocks and the extended M/H blocks located in the same segments belong to the same SCCC block. That is, B8 and EB0 are located in the same 16 segments to configure the same SCCC block. In addition, B9 and EB1 are located in the same 16 segments to configure the same SCCC block, and B10 and EB2 are located in the same 16 segments to configure the same SCCC block. The five segments of B11 are identical to the first five segments of EB3 and these M/H block and the extended M/H block configure the same SCCC block.

In the above example, the case where the SCCC block mode is 00 is not defined.

In the examples of Tables 2 to 5, with respect to the M/H blocks for transmitting the mobile service data of the first mobile mode, if one SCCC block is composed of one M/H block, the SCCC block mode is defined as 00. With respect to the M/H blocks for transmitting the mobile service data of the first mobile mode, if one SCCC block is composed of a plurality of M/H blocks or the M/H blocks for transmitting the mobile service data of the first mobile mode are not present, the SCCC block mode is defined as 01.

The number of bytes of each of the above-described SCCC blocks may vary according to the group type of the group and the coding rate of the SCCC block.

The data byte of the SCCC block configured according to the group type is converted into bits and is input to a convolutional encoder.

In one embodiment of the present invention, the convolutional encoder encodes the mobile service data of the first mobile mode at a 1/2 or 1/4 coding rate and encodes the mobile service data of the second mobile mode at a 1/2, 1/4 or 1/3 coding rate.

Figure 47:
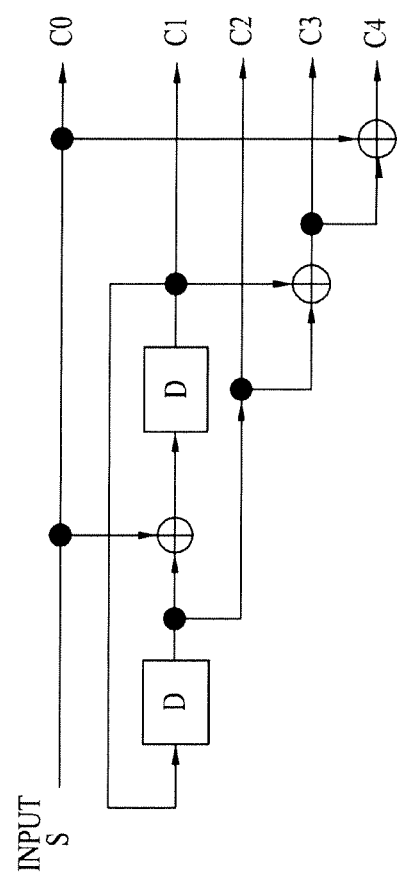
FIG. 47 shows an embodiment of a convolutional encoder according to an embodiment of the present invention.

FIG. 47 shows an embodiment of a convolutional encoder. 1/H-rate encoding may select and output H bits from among 5 output bits with respect to one input bit. 1/3-rate encoding may be performed by a combination of 1/2-rate encoding and 1/4-rate encoding. That is, if 2 bits are selected and output with respect to a first input bit and four bits are selected and output with respect to a second input bit, 1/3-rate encoding may be performed by outputting six output bits with respect to two input bits.

The selected H bits configure one symbol in units of two bits and the convolutional encoder outputs the configured symbol.

For each SCCC block or for each SCCC block belonging to each group region, the method of selecting the H output bits at each coding rate may vary according to the SCCC block mode and the group type.

Table 6 shows an embodiment of a coding rate according to the group type and the SCCC block mode for each SCCC block belonging to each group region. In the following embodiment, 1/3-rate encoding is performed by a combination of 1/2-rate encoding and 1/4-rate encoding.

TABLE 6

| Group Type | Group Region | 1/2 Rate | 1/4 Rate SCCC Block mode = '00' | 1/4 Rate SCCC Block mode = '01' | 1/3 Rate SCCC Block mode = '00' | 1/3 Rate SCCC Block mode = '01' |
|---|---|---|---|---|---|---|
| GT0 | A, B | (C0, C1) | (C0, C2), (C1, C4) | (C0, C2), (C1, C4), | Not allowed | Not allowed |
|  | C, D |  | (C0, C1), (C3, C4) |  | Not allowed |  |
| GT1 | A, B |  | (C0, C2), (C1, C4), | (C0, C2), (C1, C4), | Not allowed | Not allowed |
|  | C, D |  | (C0, C1), (C3, C4), |  | Not allowed |  |
|  |  |  | (C0, C1), (C3, C4), | (C0, C1), (C3, C4), | Combination of 1/2 and 1/4 | Combination of 1/2 and 1/4 |
| GT2 | A, B |  | (C0, C2), (C1, C4) | Not allowed | Not allowed | Not allowed |
|  | C, D, E |  | (C0, C1), (C3, C4) |  | Combination of 1/2 and 1/4 |  |
| GT3 | A, B, C, D, E |  | Not allowed | (C0, C2), (C1, C4) | Not allowed | Combination of 1/2 and 1/4 |

For example, in the case of the SCCC block belonging to the regions A and B with respect to the group of group type 1, that is, in the case where the SCCC block mode is 00 and the SCCC block is composed of a part of the M/H blocks B3 to B8 belonging to the regions C and D, if the SCCC block is encoded at a 1/4 coding rate, the convolutional encoder outputs two symbols with respect to one input bit. At this time, a first symbol is composed of output bits C0 and C2 and a second symbol is composed of output bits C1 and C4.

As another example, when the SCCC block belonging to the regions C, D and E is encoded at a 1/3 coding rate with respect to the group of group type 2, the convolutional encoder outputs three symbols with respect to two consecutive input bits. At this time, a first symbol is composed of output bits C0 and C1 obtained by encoding the first input bit at a 1/2 coding rate, a second symbol is composed of output bits C0 and C1 obtained by encoding the second input bit at a 1/4 coding rate and a third symbol is composed of output bits C3 and C4 obtained by encoding the second input bit at a 1/4 coding rate.

The memory of the convolutional encoder is initialized to 0 when each SCCC block is begun.

The output of the convolutional encoder is symbol-interleaved and output to a symbol-byte converter.

The symbol-byte converter aggregates four symbols composed of two bits to configure one byte.

The mobile service data bytes encoded by the above process are mapped to the M/H blocks or the extended M/H blocks corresponding to each byte and are output to the group formatter 303 located in a next stage of the block processor.

The relation between the SCCC block and the M/H block, the configuration method of the SCCC block, the value of the SCCC block mode and the coding rate of the SCCC block are only exemplary and the present invention is not limited thereto.

The transmitter of the ICM, that is, the transmitter supporting group type 4, is no different from the transmitters of the modes other than the ICM, that is, the transmitter supporting group types 0 to 3, and the transmitters of the modes other than the ICM may be extended so as to support the ICM.

The pre-processor of the transmitter for the ICM may include an M/H frame encoder, a block processor, a group formatter, a signaling encoder, and a packet formatter.

The M/H frame encoder may be configured similar to the transmitters of the modes other than the ICM.

The block processor may configure one SCCC block using one M/H block or a plurality of M/H blocks with respect to the group of group type 4. In addition, the block processor may configure one SCCC block using one extended M/H block or a plurality of extended M/H blocks. In addition, the block processor may configure one SCCC block using a combination of one or more M/H blocks and one or more extended M/H blocks. The group of group type 4 does not transmit mobile service data of a first mobile mode and transmits mobile service data of a second mobile mode through all M/H blocks B0 to B11 and extended M/H blocks EB0 to EB4. Table 5 shows an embodiment of the configuration of the SCCC block of group type 4 (or group type 3). In Table 5, the SCCC block mode represents a relation between M/H blocks and SCCC blocks.

In Table 5, if the SCCC block mode is 01, one SCCC block is composed of a plurality of M/H blocks and a plurality of extended M/H blocks.

In the above example, in the M/H blocks and the extended M/H blocks, M/H blocks and extended M/H blocks located in the same segments belong to the same SCCC block. That is, B8 and EB0 are located in the same 16 segments to configure the same SCCC block. In addition, B9 and EB1 are located in the same 16 segments to configure the same SCCC block, and B10 and EB2 are located in the same 16 segments to configure the same SCCC block. The five segments of B11 are identical to the first five segments of EB3 and these M/H block and the extended M/H block configure the same SCCC block.

In the above example, the case where the SCCC block mode is 00 is not defined.

Table 6 shows an embodiment of a coding rate according to the group type and the SCCC block mode, for each SCCC block belonging to each group region of group type 0 to group type 4. In the following embodiment, 1/3-rate encoding is performed by a combination of 1/2-rate encoding and 1/4-rate encoding.

The relation between the SCCC block of group type 4 and the M/H blocks in the above example is identical to that of the embodiment of the group type 3. The embodiment of the coding rate of the SCCC block belonging to each group region is identical to the embodiment of group type 3. However, the size of each M/H block or extended M/H block may be different from that of group type 3.

The group formatter and the signaling encoder may operate similar to those of the transmitters of the modes other than the ICM.

The packet formatter removes the place holder of the non-systematic RS parity from the output of the group formatter and, also, replaces the place holder of the MPEG-2 header with an MPEG-2 header value having a pre-defined PID among the PIDs that are not used in the main service data packet, with respect to group types 0 to 3. Thereafter, 1-byte MPEG-2 TS sync data is added to the very beginning of the 187-byte packet obtained as a result of the above-described process, thereby forming a 188-byte mobile service data packet.

However, since the group of group type 4 does not include the non-systematic RS parity, the process of removing the place holder is omitted. In addition, since the MPEG-2 header is not included, the PID replacement process is omitted. Since the MPEG-2 TS packets are not included, the MPEG-2 sync byte is not added. Therefore, the output of the packet formatter of the ICM becomes 207 bytes.

The packet MUX multiplexes the mobile service data and the main service data packet. In ICM, since the main service data packet is not present, the mobile service data packets are output without change.

The post-processor of the transmitter may include a Modified Data Randomizer, a Systematic/non-systematic RS Encoder, a Data Interleaver, a Parity Replacer, a Non-systematic RS Encoder, and a Modified Trellis Encoder.

Since the modified data randomizer does not randomize the mobile service data, the mobile service data output by the packet MUX is not modified by the modified data randomizer The modified data randomizer may be omitted from a transmitter which only operates in the ICM, that is, the transmitter supporting only group type 4.

Since group type 4 does not include RS parity bytes, the RS encoder/non-systematic RS encoder may be omitted in the transmitter which only operates in the ICM. Thus, the parity replacer and the non-systematic encoder may be omitted. In the transmitter supporting group types 0 to 4, the above blocks do not operate.

The trellis encoder operates in a similar manner to the transmitters for the modes other than the ICM. Since the parity replacer and the non-systematic RS encoder do not operate, no information is provided to the parity replacer and the non-systematic RS encoder upon trellis initialization.

Detailed Description of Known Data

If known data recognized by agreement between a transmission system and a receiving system is inserted into a group, the receiving system may perform equalization using channel information obtained from the known data. The known data may be inserted by the group formatter and consecutive symbols output by passing the known data through the blocks of the transmitter are referred to as a training signal or a training sequence.

In a system for inserting known data into a group and transmitting the group, when consecutive long known data is periodically inserted into mobile service data, it is possible to periodically insert known data having a predetermined length into a region that does not suffer from interference of main service data (that is, a region in which main service data is not mixed). However, in a region that suffers from interference of main service data, it is difficult to periodically insert known data and to insert consecutive long known data, due to the interference from the main service data. The insertion of the known data will be described in detail with reference to FIGS. 10, 16 to 20 and 26 to 30.

As shown in FIG. 10, the group of group type 0 is transmitted in a state of being assigned to a group map 0 after interleaving. The group map may include six known data sequences. A symbol output obtained by the six known data sequences configures a long training sequence.

In the group map 0, a first long training sequence is located in the last two segments of the M/H block B3. A second long training sequence is located in second and third segments of the M/H block B4. Third to sixth training sequences are located in the last two segments of the M/H blocks B4 to B7.

The first long training sequence and the third to sixth long training sequences among the long training sequences have an interval of 16 segments between adjacent training sequences. The first long training sequence and the third to sixth long training sequences share the same value based on a shortest training sequence. In the second training sequence, the value of the first half of the training sequence is equal to that of the second half of the training sequence.

The receiver may improve equalization performance using the channel information obtained using the long training sequences and may use the long training sequences upon demodulation such as timing restoration or carrier restoration.

In the very beginning of each known data, 12 trellis initialization bytes for memory initialization of 12 trellis encoders are present. In order to set the training sequences to values that can be recognized by the transmission system and the receiving system, there is a need for memory initialization of the trellis encoder before the known data is trellis-encoded. If symbols of trellis initialization bytes are input to the trellis initialization unit, the memory of the trellis encoder is initialized to a pre-defined value.

FIG. 12 shows an embodiment of a group structure of a segment domain of a group map 1-0. FIG. 12 shows a group map after data interleaving. The group of the group type 1-0 is transmitted in a state of being assigned to the group map 1-0.

FIG. 14 shows an embodiment of a group structure of a segment domain of a group map 1-1. FIG. 14 shows a group map after data interleaving. The group of the group type 1-1 is transmitted in a state of being assigned to the group map 1-1.

FIG. 16 shows an embodiment of a group structure of a segment domain of a group map 1-2. FIG. 16 shows a group map after data interleaving. The group of the group type 1-2 is transmitted in a state of being assigned to the group map 1-2.

FIG. 18 shows an embodiment of a group structure of a segment domain of a group map 1-4. FIG. 18 shows a group map after data interleaving. The group of the group type 1-4 is transmitted in a state of being assigned to the group map 1-4.

FIG. 20 shows an embodiment of a group structure of a segment domain of a group map 1-8. FIG. 20 shows a group map after data interleaving. The group of the group type 1-8 is transmitted in a state of being assigned to the group map 1-8.

Each of the group maps 1-0, 1-1, 1-2, 1-4 and 1-8 includes six pieces of known data inserted into the group map 0 without change, and additional known data is inserted thereinto.

Each of the group maps 1-0, 1-1, 1-2, 1-4 and 1-8 has four additional known data sequences, and a symbol output obtained from these known data sequences configures a short training sequence.

The four additional known data sequences are inserted into the group region E in which the mobile service data of the second mobile mode is transmitted. In one short training sequence, a symbol sequence recognized by the transmission system and the receiving system appears several times. In first and second short training sequences, mobile service data assigned to the group regions C and D and main service data assigned to the corresponding slots may be transmitted between the known symbol sequences. In third and fourth short training sequences, main service data assigned to the corresponding slots may be transmitted between known symbol sequences or mobile service data or main service data assigned to slots to be transmitted just after the corresponding slots may be transmitted.

The first short training sequence is located in seventh and eighth segments of the extended M/H block EB1 and an interval between the first short training sequence and a last long training sequence shared with the group map 0 is 24 segments. The second short training sequence is located in third and fourth segments of the extended M/H block EB2 and an interval between the second short training sequence and the first short training sequence is 12 segments. The third short training sequence is located in seventh and eighth segments of the extended M/H block EB3 and an interval between the third short training sequence and the second short training sequence is 20 segments. The fourth short training sequence is located in third and fourth segments of the extended M/H block EB4 and an interval between the fourth short training sequence and the third short training sequence is 12 segments.

FIG. 22 shows an embodiment of a group structure of a segment domain of a group map 2-0. FIG. 22 shows a group map after data interleaving. The group of the group type 2-0 and the group of the group type 3-0 are transmitted in a state of being assigned to the group map 2-0.

FIG. 24 shows an embodiment of a group structure of a segment domain of a group map 2-1. FIG. 24 shows a group map after data interleaving. The group of the group type 2-1 and the group of the group type 3-1 are transmitted in a state of being assigned to the group map 2-1.

FIG. 26 shows an embodiment of a group structure of a segment domain of a group map 2-2. FIG. 26 shows a group map after data interleaving. The group of the group type 2-2 and the group of the group type 3-2 are transmitted in a state of being assigned to the group map 2-2.

FIG. 28 shows an embodiment of a group structure of a segment domain of a group map 2-4. FIG. 28 shows a group map after data interleaving. The group of the group type 2-4 and the group of the group type 3-4 are transmitted in a state of being assigned to the group map 2-4.

FIG. 30 shows an embodiment of a group structure of a segment domain of a group map 2-8. FIG. 30 shows a group map after data interleaving. The group of the group type 2-8 and the group of the group type 3-8 are transmitted in a state of being assigned to the group map 2-8.

Each of the group maps 2-0, 2-1, 2-2, 2-4 and 2-8 includes six pieces of known data inserted into the group map 0 without change, and additional known data is inserted thereinto.

Each of the group maps 2-0, 2-1, 2-2, 2-4 and 2-8 has four additional known data sequences, and a symbol output obtained from these known data sequences configure two long training sequences and four short training sequences. The added long training sequences are referred to as additional long training sequences, in order to be distinguished from the long training sequences shared with the group map 0.

The six additional known data sequences are inserted into the group regions C, D and E in which the mobile service data of the second mobile mode is transmitted.

In one short training sequence, a symbol sequence recognized by the transmission system and the receiving system appears several times. In first and second short training sequences, mobile service data or main service data assigned to slots transmitted just before the corresponding slots may be transmitted between the known symbol sequences. In third and fourth short training sequences, main service data assigned to the corresponding slots may be transmitted between known symbol sequences or mobile service data or main service data assigned to slots to be transmitted just after the corresponding slots may be transmitted.

According to the group map, one or both of two additional long training sequences may become a segmented long training sequence. In the segmented additional long training sequence, an unknown data symbol is inserted into a middle portion of the additional long symbols sequences recognized by the transmission system and the receiving system. Main service data assigned to the corresponding slots is transmitted in the middle portion of the segmented additional long symbol stream.

The first short training sequence is located in eleventh and twelfth segments of the M/H block B1. The second short training sequence is located in seventh and eighth segment of the M/H block B2 and an interval between the second short training sequence and the first short training sequence is 12 segments. An interval between the second short training sequence and the first long training sequence shared with the group map 0 is 24 segments. The first additional long training sequence is located in seventh and eighth segments of the extended M/H block EB1 or the M/H block B9 and an interval between the first additional long training sequence and a last long training sequence shared with the group map 0 is 24 segments. The second additional long training sequence is located in third and fourth segments of the extended M/H block EB2 or the M/H block B10 and an interval between the second additional long training sequence and the first additional long training sequence is 12 segments. The third short training sequence is located in seventh and eighth segments of the extended M/H block EB3 and an interval between the third short training sequence and the second additional long training sequence is 20 segments. The fourth short training sequence is located in the third and fourth segments of the extended M/H block EB4 and an interval between the fourth short training sequence and the third short training sequence is 12 segments.

In the group map 2-0 of FIG. 22 and the group map 2-1 of FIG. 24, two additional long training sequences are not segmented additional long training sequences.

In the group map 2-2 of FIG. 26, the group map 2-4 of FIG. 28 and the group map 2-8 of FIG. 30, two additional long training sequences are segmented additional long training sequences.

In the short training sequences inserted into the group, it is difficult to obtain better performance compared with the long training sequences. In the preset invention, a method of obtaining the performance of a long training sequence using a combination of short training sequences is proposed.

Figure 48:
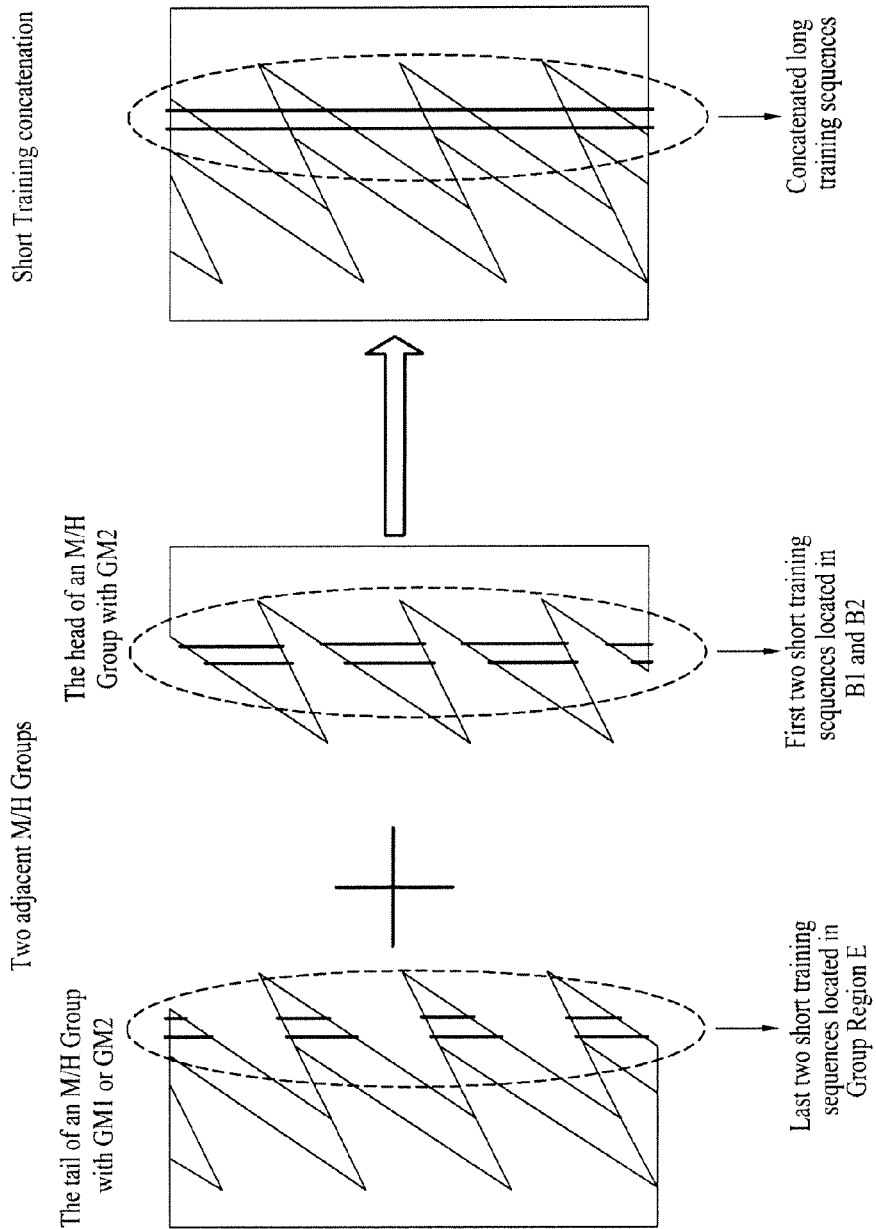
FIG. 48 shows a method of obtaining a long training sequence using short training sequences.

FIG. 48 shows a method of obtaining a long training sequence using short training sequences.

In the group map 1 (group maps 1-0, 1-1, 1-2, 1-4 and 1-8) and the group map 2 (group maps 2-0, 2-1, 2-2, 2-4 and 2-8) of FIGS. 12,14,16,18,20,22,24,26,28 and 30, the third short training sequence and the fourth short training sequence are included in the group region E. The third short training sequence is located in seventh and eighth segments of the extended M/H block EB3 and the fourth short training sequence is located in third and fourth segments of the extended M/H block EB4.

In the group map 2 of FIGS. 22 to 30, the first short training sequence and the second short training sequence are included in the regions C and D located in front of the group. The first short training sequence is located in eleventh and twelfth segments of the M/H block B1 and the second short training sequence is located in seventh and eighth segments of the M/H block B2.

When all groups are assigned to two contiguous slots and the assigned groups use the group map 1 or the group map 2, the seventh and eighth segments of the extended M/H block EB3 of the group assigned to the previous slot and the eleventh and twelfth segments of the M/H block B1 of the group assigned to the subsequent slot share the same segments. The third and fourth segments of the extended M/H block EB4 of the group assigned to the previous slot and the seventh and eighth segments of the M/H block B2 of the group assigned to the subsequent slot share the same segments.

If the group assigned to the previous slot uses the group map 1 or 2 and then the group assigned to the subsequent slot uses the group map 2, the third short training sequence of the group assigned to the previous slot is located in the same segment as the first short training sequence of the group assigned to the subsequent slot and the two short training sequences are concatenated to configure one long training sequence or one segmented long training sequence. In addition, the fourth short training sequence of the group assigned to the previous slot is located in the same segment as the second short training sequence of the group assigned to the subsequent slot, and the two short training sequences are concatenated to configure one long training sequence or one segmented long training sequence.

That is, if the group assigned to the current slot uses the group map 1 and the group assigned to the subsequent slot uses the group map 2, the third and fourth short training sequences located in the rear part of the group may be used as the long training sequence. If the group assigned to the current slot uses the group map 2 and the group assigned to the previous slot uses the group map 1 or the group map 2, the first and second short training sequences located in the front part of the group may be used as the long training sequence. In this case, if the group assigned to the subsequent slot uses the group map 2, the third and fourth short training sequences located in the rear part of the group may be used as the long training sequence.

The transmitter may signal concatenation of the training sequences through a TPC so as to enable the receiver to make use of the concatenated training sequences.

The receiver may determine whether the short training sequences located in the front part or the rear part of the group assigned to the current slot may be used as the long training sequence using signaling information, obtain channel information from the concatenated long training sequences and use the channel information in equalization.

Detailed Description of Trellis Encoder

Figure 49:
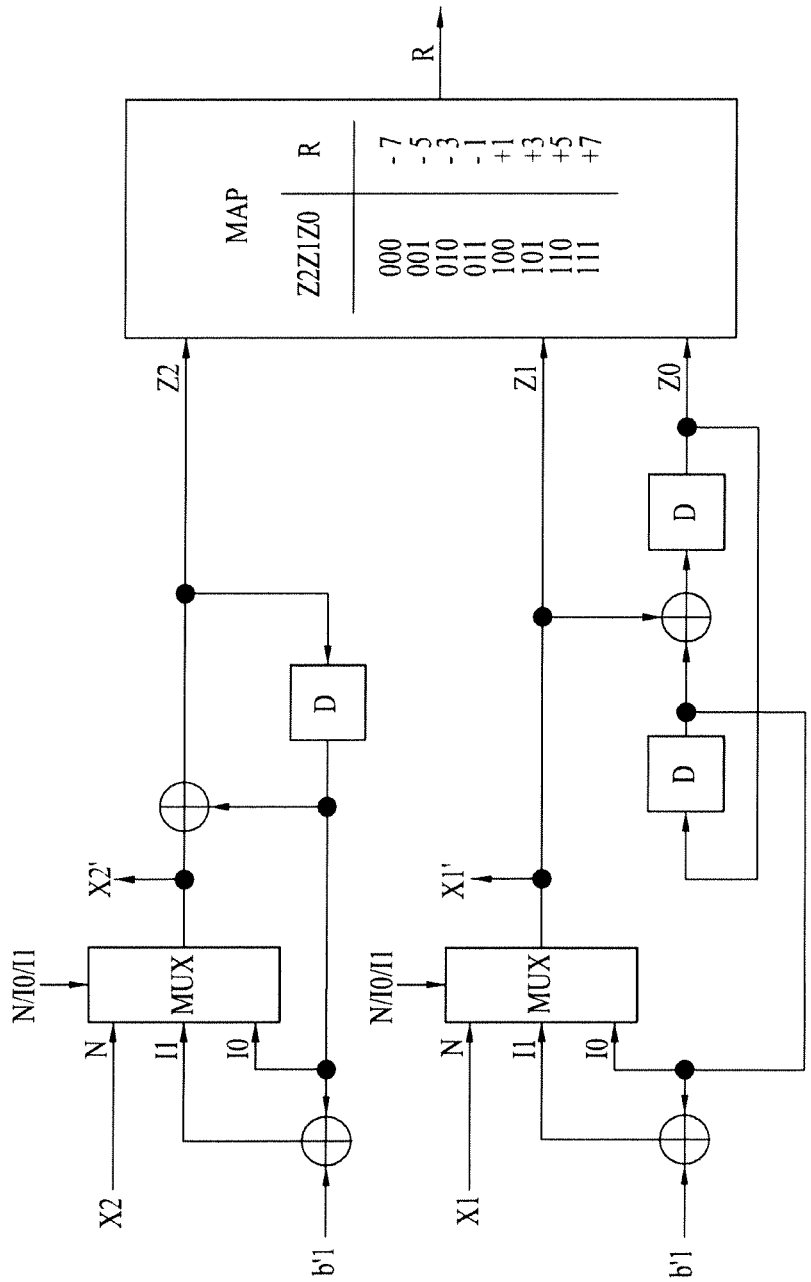
FIG. 49 shows an embodiment of a modified trellis encoder according to an embodiment of the present invention.

FIG. 49 shows an embodiment of a modified trellis encoder. The modified trellis encoder 256 includes a trellis encoder for each trellis way. That is, the modified trellis encoder 256 has 12 trellis encoders. The trellis encoder initializes the memory of the trellis encoder before inputting known data, in order to generate a training sequence recognized by the transmission system and the receiving system after trellis-encoding the known data.

The memory initialization of the trellis encoder is a process of initializing a plurality of memories included in the trellis encoder to a pre-defined value.

For initialization of the trellis encoder, an input MUX is present in an input stage of the trellis encoder. The trellis encoder receives a 2-bit input symbol and the input MUX is present for each bit. The input MUX outputs the current encoder input without change if a current encoder input is not a symbol for initialization and outputs a value obtained by referring to the memory of the current trellis encoder if the current encoder input is a symbol for initialization.

In one embodiment of the present invention, two initialization methods of the trellis encoder are used.

A 0-state initialization process sets all the memories of the trellis encoder shown in FIGS. 49 to 0.

A 1-state initialization process sets all the memories of the trellis encoder shown in FIGS. 49 to 1.

If the current encoder input is a symbol for 0-state initialization, the input MUX of the trellis encoder outputs a memory value of a current trellis encoder. In FIG. 49, if a trellis input X2 corresponding to a high-order bit of input bits is input and the input of the current trellis encoder is a bit for 0-state initialization, the input MUX discards X2 and outputs the value of the memory D2. If a trellis input X1 corresponding to a low-order bit of input bits is input and the input of the current trellis encoder is a bit for 0-state initialization, the input MUX discards X1 and outputs the value of the memory D0.

If the current encoder input is a symbol for 1-state initialization, the input MUX of the trellis encoder outputs the inverse of the value of the memory of the current trellis encoder. In FIG. 49, if a trellis input X2 corresponding to a high-order bit of input bits is input and the input of the current trellis encoder is a bit for 1-state initialization, the input MUX discards X2, performs an XOR operation of the value of the memory D2 and "1", and outputs the inverse of D2. If a trellis input X1 corresponding to a low-order bit of input bits is input and the input of the current trellis encoder is a bit for 1-state initialization, the input MUX discards X1, performs an XOR operation of the value of the memory D0 and "1", and outputs the inverse of D0.

The modified trellis encoder shown in FIG. 49 may initialize the memory value if the two consecutive symbols are symbols for initialization of the trellis encoder.

If the two consecutive symbols are symbols for 0-state initialization, all D0, D1 and D2 are "0" and, if the two consecutive symbols are symbols for 1-state initialization, D0, D1 and D2 are "1".

The 0-state initialization and the 1-state initialization may be determined according to the group type, the training sequence type and the training sequence location.

The short training sequence has more initialization symbols compared with the other types of training sequences. If the same type of initialization is performed with respect to many initialization symbols, the DC value of the symbol is biased to a specific sign. For example, if 0-state initialization is performed with respect to all initialization symbols of the short training sequence, all memories have a value of 0 after initialization of two symbols. At this time, since the trellis encoder always outputs a negative value, that is, since Z2 of FIG. 58 is always 0, there is a high probability that the DC value of the training sequence will have a negative value. In contrast, if 1-state initialization is performed with respect to all initial symbols, there is a high probability that the DC value of the training sequence will have a positive value.

In order to solve such a problem, in one embodiment of the present invention, 0-state initialization and 1-state initialization are used with respect to an initialization symbol for a short training sequence and 0-state initialization is used with respect to a long training sequence and an additional long training sequence or a segmented additional long training sequence. The trellis encoder corresponding to even-numbered trellis ways 0, 2, 4, 6, 8 and 10 performs 1-state initialization, and the trellis encoder corresponding to odd-numbered trellis ways 1, 3, 5, 7, 9 and 11 performs 0-state initialization, with respect to a short training sequence. If 0-state initialization and 1-state initialization are used with respect to the short training sequence for each trellis way, it is possible to prevent the DC value of the symbol from being biased to a specific sign.

Meanwhile, the group map 3 shown in FIG. 32 has eight long training sequences and six short training sequences.

In the group map 3, the first long training sequence is located in the last two segments of the M/H block B3. The second long training sequence is located in the second and third segments of the M/H block B4. The third to eighth long training sequences are located in the last two segments of the M/H block B4 to B9, respectively.

Among the long training sequences, the first long training sequence and the third to eighth long training sequences have an interval of 16 segments between adjacent training sequences. In addition, the first long training sequence and the third to eighth long training sequences share the same value. In the second long training sequence, the values of the first half and the second half of the training sequence are identical.

The first short training sequence is located in the third to fourth segments of the M/H block B1 and the second short training sequence is located in the third to fourth segments of the M/H block B2. The third short training sequence is located in the last two segments of the M/H block B2. The fourth short training sequence and the fifth short training sequence are located in the last two segments of the M/H block B10 and the extended M/H block EB3, respectively. The sixth short training sequence is located in the fifteenth to sixteenth segments of the extended M/H EB4.

In ICM, since the group map 3 is used in all slots, the same group map 3 is present in adjacent slots.

In this case, the first short training sequence of a current group is concatenated with the fourth short training sequence of a previous group. The second short training sequence is concatenated with the fifth short training sequence of the previous group, and the third short training sequence is concatenated with the sixth short training sequence of the previous group. The fourth short training sequence of the current group is concatenated with the first short training sequence of a next group. The fifth short training sequence is concatenated with the second short training sequence of the next group and the third short training sequence is concatenated with the third short training sequence of the next group.

All the concatenated training sequences are long training sequences, and the long training sequences have the same value as the first or the third to eighth long training sequences.

In ICM, since the short training sequence is always a part of the long training sequence, trellis initialization is not frequently performed unlike the group map 1 or 2. Accordingly, in one embodiment, the trellis encoder of the ICM uses only 0-state initialization.

Receiving System

Figure 50:
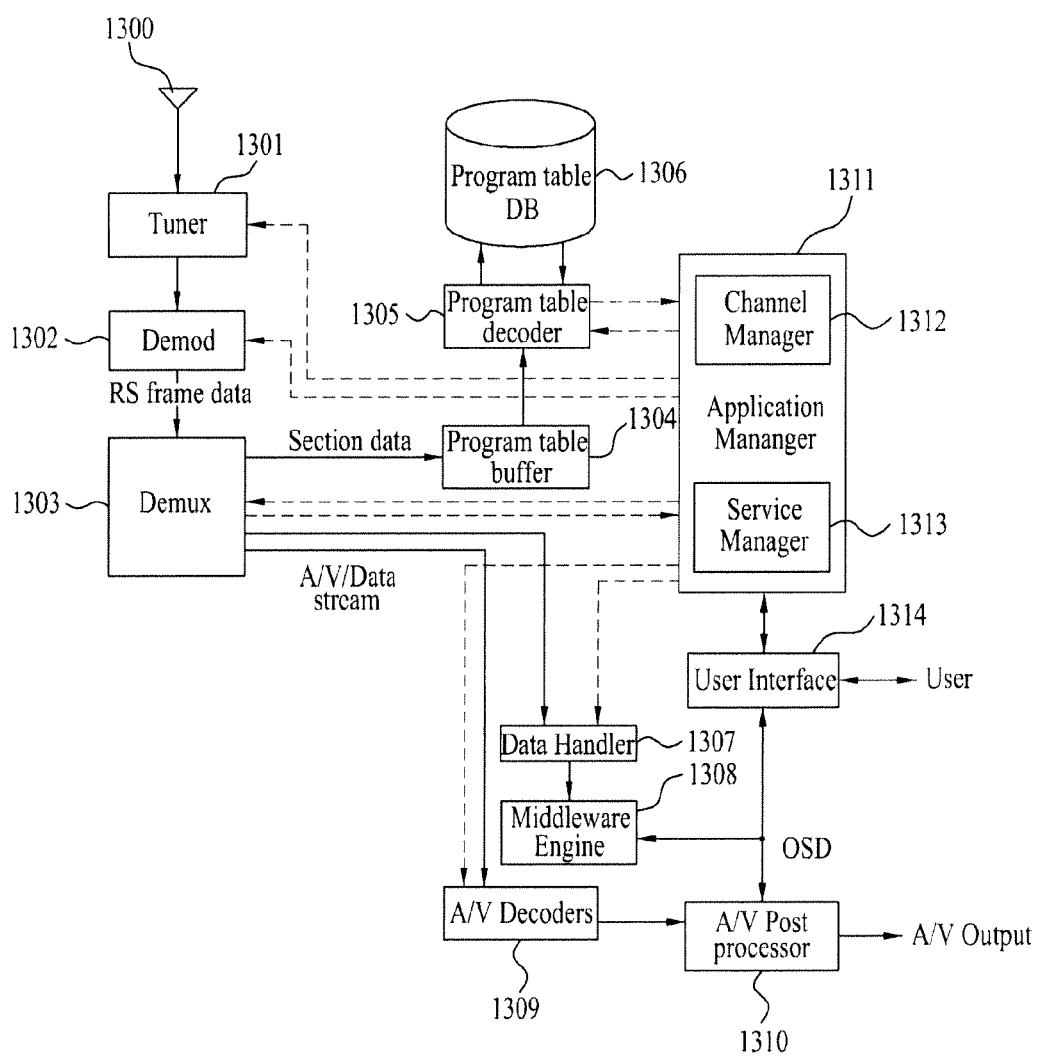
FIG. 50 is a block diagram illustrating a receiving system according to an embodiment of the present invention.

FIG. 50 is a block diagram illustrating a receiving system according to an embodiment of the present invention.

The receiving system of FIG. 50 includes an antenna 1300, a tuner 1301, a demodulating unit 1302, a demultiplexer 1303, a program table buffer 1304, a program table decoder 1305, a program table storage unit 1306, a data handler 1307, a middleware engine 1308, an A/V decoder 1309, an A/V post-processor 1310, an application manager 1311, and a user interface 1314. The application manager 1311 may include a channel manager 1312 and a service manager 1313.

In FIG. 50, solid lines indicate data flows and dotted lines indicate control flows.

The tuner 1301 tunes to a frequency of a specific channel through any of an antenna, a cable, or a satellite and down-converts the frequency to an Intermediate Frequency (IF) signal and outputs the IF signal to the demodulating unit 1302.

Herein, the tuner 1301 is controlled by the channel manager 1312 in the application manager 1313 and reports the result and strength of a broadcast signal of the tuned channel to the channel manager 1312. Data received through the frequency of the specific channel includes main service data, mobile service data, a transmission parameter, and program table information for decoding the main service data and the mobile service data.

The demodulating unit 1302 performs VSB demodulation, channel equalization, etc., on the signal output from the tuner 1301 and identifies and separately outputs main service data and mobile service data. The demodulating unit 1302 will be described in detail in a later.

On the other hand, the transmitter can transmit signaling information (or TPC information) including transmission parameters by inserting the signaling information into at least one of a field synchronization region, a known data region, and a mobile service data region.

In one embodiment of the present invention, FIC and TPC data is transmitted in a state of being included in a signaling information region.

Accordingly, the demodulating unit 1302 can extract the transmission parameters from the field synchronization region, the known data region, and the mobile service data region.

The TPC data may include M/H frame information, sub-frame information, slot information, parade-related information (for example, a parade_id, a parade repeat period, etc.), information of data groups in a sub-frame, RS frame mode information, RS code mode information, SCCC block mode information, SCCC outer code mode information, FIC version information, etc.

The TPC may include information about the concatenation of the training sequences (that is, known data sequences).

The demodulating unit 1302 performs block decoding, RS frame decoding, etc., using the extracted TPC data or FIC data.

For example, the demodulating unit 1302 performs block decoding of each region in a data group with reference to SCCC-related information (for example, SCCC block mode information or an SCCC outer code mode) included in the transmission parameters and performs RS frame decoding of each region included in the data group with reference to RS-related information (for example, an RS code mode).

In the embodiment of the present invention, an RS frame including mobile service data demodulated by the demodulating unit 1302 is input to the demultiplexer 1303.

That is, data inputted to the demultiplexer 1303 has an RS frame payload format. More specifically, the RS frame decoder of the demodulating unit 1302 performs the reverse of the encoding process performed at the RS frame encoder of the transmission system to correct errors in the RS frame and then outputs the error-corrected RS frame payload to a data derandomizer. The data derandomizer then performs derandomizing on the error-corrected RS frame payload through the reverse of the randomizing process performed at the transmission system to obtain an RS frame payload.

The demultiplexer 1303 may receive RS frame payloads of all parades and may also receive only an RS frame payload of a parade including a mobile service that the user desires to receive through power supply control. For example, when RS frame payloads of all parades are received, the demultiplexer 1303 can demultiplex a parade including a mobile service that the user desires to receive using a parade_id.

The demultiplexer 1303 refers to the header of the mobile service data packet within the RS frame payload belonging to the ensemble including the mobile service data that are to be decoded, thereby identifying when the corresponding mobile service data packet is the signaling table information or the IP datagram of the mobile service data. Alternatively, when the signaling table information and the mobile service data are both configured in the form of IP datagrams, the demultiplexer 1303 may use the IP address in order to identify the IP datagram of the program table information and the mobile service data.

Herein, the identified signaling table information is outputted to the program table buffer 1304. And, audio/video/data streams are separated from the IP datagram of mobile service data that are to be selected among the IP datagrams of the identified mobile service data, thereby being respectively outputted to the A/V decoder 1309 and/or the data handler 1307.

According to an embodiment of the present invention, when the stuff_indicator field within the header of the mobile service data packet indicates that stuffing bytes are inserted in the payload of the corresponding mobile service data packet, the demultiplexer 1303 removes the stuffing bytes from the payload of the corresponding mobile service data packet. Then, the demultiplexer 1303 identifies the program table information and the mobile service data. Thereafter, the demultiplexer 1303 identifies A/V/D streams from the identified mobile service data.

The program table buffer 1304 temporarily stores the section-type program table information and then outputs the section-type program table information to the program table decoder 1305.

The program table decoder 1305 identifies tables using a table_id and a section_length in the program table information and parses sections of the identified tables and produces and stores a database of the parsed results in the program table storage unit 1306. For example, the program table decoder 1305 collects sections having the same table identifier (table_id) to construct a table. The program table decoder 1305 then parses the table and produces and stores a database of the parsed results in the program table storage unit 1306.

The A/V decoder 1309 decodes the audio and video streams outputted from the demultiplexer 1303 using audio and video decoding algorithms, respectively. The decoded audio and video data is outputted to the A/V post-processor 1310.

Here, at least one of an AC-3 decoding algorithm, an MPEG 2 audio decoding algorithm, an MPEG 4 audio decoding algorithm, an AAC decoding algorithm, an AAC+ decoding algorithm, an HE AAC decoding algorithm, an AAC SBR decoding algorithm, an MPEG surround decoding algorithm, and a BSAC decoding algorithm can be used as the audio decoding algorithm and at least one of an MPEG 2 video decoding algorithm, an MPEG 4 video decoding algorithm, an H.264 decoding algorithm, an SVC decoding algorithm, and a VC-1 decoding algorithm can be used as the audio decoding algorithm.

The data handler 1307 processes data stream packets required for data broadcasting among data stream packets separated (or identified) by the demultiplexer 1303 and provides the processed data stream packets to the middleware engine 1310 to allow the middleware engine 1310 to be multiplexed them with A/V data. In an embodiment, the middleware engine 1310 is a Java middleware engine.

The application manager 1311 receives a key input from the TV viewer and displays a Graphical User Interface (GUI) on the TV screen in response to a viewer request through a User Interface (UI). The application manager 1311 also writes and reads information regarding overall GUI control of the TV, user requests, and TV system states to and from a memory (for example, NVRAM or flash memory). In addition, the application manager 1311 can receive parade-related information (for example, a parade_id) from the demodulating unit 1302 to control the demultiplexer 1303 to select an RS frame of a parade including a required mobile service. The application manager 1311 can also receive an ensemble_id to control the demultiplexer 1303 to select an RS frame of an ensemble including mobile service data to be decoded from the parade. The application manager 1311 also controls the channel manager 1312 to perform channel-related operations (for example, channel map management and program table decoder operations).

The channel manager 1312 manages physical and logical channel maps and controls the tuner 1301 and the program table decoder 1305 to respond to a channel-related request of the viewer. The channel manager also requests that the program table decoder 1305 parse a channel-related table of a channel to be tuned and receives the parsing results from the program table decoder 1305.

Demodulating Unit in a Receiving System

Figure 51:
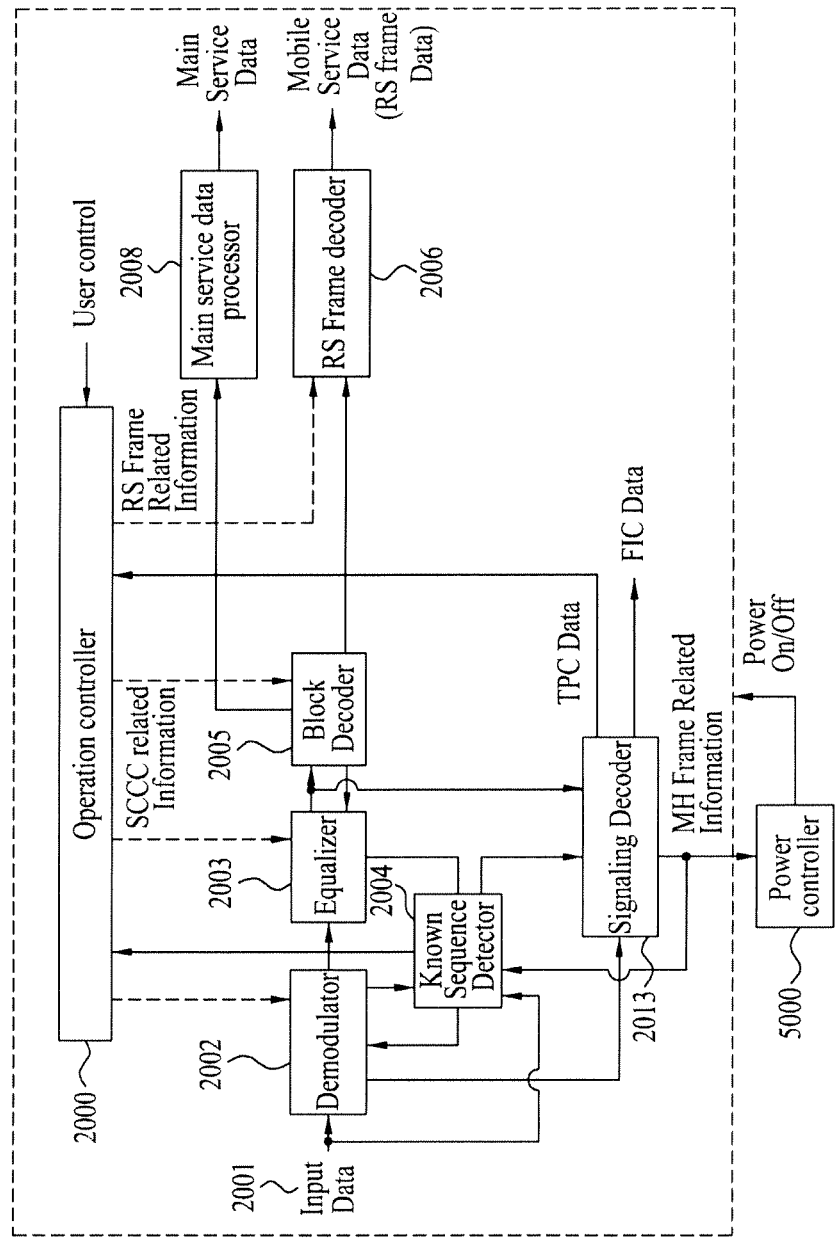
FIG. 51 illustrates an example of a demodulating unit in a digital broadcast receiving system according to the present invention.

FIG. 51 illustrates an example of a demodulating unit in a digital broadcast receiving system according to the present invention.

The demodulating unit of FIG. 51 uses known data information, which is inserted in the mobile service data section and, then, transmitted by the transmitting system, so as to perform carrier synchronization recovery, frame synchronization recovery, and channel equalization, thereby enhancing the receiving performance. Also the demodulating unit may turn the power on only during a slot to which the data group of the designated (or desired) parade is assigned, thereby reducing power consumption of the receiving system.

That is, the demodulating unit may improve equalization performance using the channel information obtained using the long training sequences and may use the long training sequences upon demodulation such as timing restoration or carrier restoration. In addition, the demodulating unit may determine whether the short training sequences located in the front part or the rear part of the group assigned to the current slot may be used as the long training sequence using signaling information, obtain channel information from the concatenated long training sequences, and use the channel information in equalization.

The demodulating unit is powered on only in the slots to which the group of the parade including a mobile service which is desired to be received is assigned, thereby reducing power consumption of the receiving system.

Referring to FIG. 51, the demodulating unit includes an operation controller 2000, a demodulator 2002, an equalizer 2003, a known sequence detector 2004, a block decoder 2005, and a RS frame decoder 2006. The demodulating unit may further include a main service data processor 2008. The main service data processor 2008 may include a data deinterleaver, a RS decoder, and a data derandomizer The demodulating unit may further include a signaling decoder 2013. The receiving system also may further include a power controller 5000 for controlling power supply of the demodulating unit.

More specifically, a frequency of a particular channel tuned by a tuner down converts to an intermediate frequency (IF) signal. Then, the down-converted data 2001 outputs the down-converted IF signal to the demodulator 2002 and the known sequence detector 2004. At this point, the down-converted data 2001 is inputted to the demodulator 2002 and the known sequence detector 2004 via analog/digital converter ADC (not shown). The ADC converts pass-band analog IF signal into pass-band digital IF signal.

The demodulator 2002 performs self gain control, carrier recovery, and timing recovery processes on the inputted passband digital IF signal, thereby modifying the IF signal to a base-band signal. Then, the demodulator 2002 outputs the newly created base-band signal to the equalizer 2003 and the known sequence detector 2004.

The equalizer 2003 compensates the distortion of the channel included in the demodulated signal and then outputs the error-compensated signal to the block decoder 2005.

At this point, the known sequence detector 2004 detects the known sequence position information inserted by the transmitting end from the input/output data of the demodulator 2002 (i.e., the data prior to the demodulation process or the data after the demodulation process). Thereafter, the position information along with the symbol sequence of the known data, which are generated from the detected position, is outputted to the operation controller 2000, the demodulator 2002, the equalizer 2003, and the signaling decoder 2013. Also, the known sequence detector 2004 outputs a set of information to the block decoder 2005. This set of information is used to allow the block decoder 2005 of the receiving system to identify the mobile service data that are processed with additional encoding from the transmitting system and the main service data that are not processed with additional encoding.

In addition, although the connection status is not shown in FIG. 51, the information detected from the known sequence detector 2004 may be used throughout the entire receiving system and may also be used in the RS frame decoder 2006.

The data demodulated in the demodulator 2002 or the data equalized in the channel equalizer 2003 is inputted to the signaling decoder 2013. The known data position information detected in the known sequence detector 2004 is inputted to the signaling decoder 2013.

The signaling decoder 2013 extracts and decodes signaling information (e.g., TPC information, and FIC information), which inserted and transmitted by the transmitting end, from the inputted data, the decoded signaling information provides to blocks requiring the signaling information.

More specifically, the signaling decoder 2013 extracts and decodes TPC data and FIC data, which inserted and transmitted by the transmitting end, from the equalized data, and then the decoded TPC data and FIC data outputs to the operation controller 2000, the known sequence detector 2004, and the power controller 5000. For example, the TPC data and FIC data is inserted in a signaling information region of each data group, and then is transmitted to a receiving system.

The signaling decoder 2013 performs signaling decoding as an inverse process of the signaling encoder, so as to extract TPC data and FIC data. For example, the signaling decoder 2013 decodes the inputted data using the PCCC method and derandomizes the decoded data, thereby dividing the derandomized data into TPC data and FIC data. At this point, the signaling decoder 2013 performs RS-decoding on the divided TPC data, so as to correct the errors occurring in the TPC data. The error-corrected TPC data are then outputted to the operation controller 2000, the known sequence detector 2004, and the power controller 5000.

The TPC data may also include a transmission parameter which is inserted into the payload region of an packet by the service multiplexer 100, and then is transmitted to transmitter 200.

The TPC data includes M/H frame information, sub frame information, slot information, information about a primary parade and a secondary parade (e.g., a parade ID, a parade repetition period, etc.), group information in a sub frame, RS frame mode information, RS code mode information, SCCC block information, SCCC outer code mode information of regions A to E within a group, FIC version information, extended group type information or version information.

At this time, if known data information output from the known data detector 2004 is used, a signaling information region within a group is identified. That is, a first known data sequence (or a training sequence) is inserted to the last two segments of the M/H block B3 within the group, and a second known data sequence is inserted between second and third segments of the M/H block B4. At this time, since the second known data sequence is received in a state of being inserted next to the signaling information region, the signaling decoder 2103 may extract and decode the signaling information of the signaling information region from the data output from the demodulator 2202 or the channel equalizer 2003.

The power controller 5000 receives the information about the M/H frame from the signaling decoder 2013 and controls the power of the tuner and the demodulating unit. Alternatively, the power controller 5000 may receive the power control information from the operation controller 200 and control the power of the tuner and the demodulating unit.

In one embodiment, the power controller 5000 is powered on in slots, to which the group of the parade including a mobile service desired by the user is assigned, so as to receive data and is powered off in the other slots.

The demodulator 2002 may improve demodulation performance using the known data symbol sequence upon timing restoration or carrier restoration and improve equalization performance using the known data similar to the equalizer 2003. In addition, the decoded result of the block decoder 2005 may be fed back to the equalizer 2003, thereby improving equalization performance.

If data which is channel-equalized by the equalizer 2003 and then is input to the block decoder 2005 is subjected to block encoding and trellis encoding in the transmission system (e.g., data within an RS frame), trellis decoding and block decoding are performed in the inverse manner of the transmission system, and if the data is subjected to trellis encoding (e.g., main service data), only trellis decoding is performed.

The data subjected to trellis decoding and block decoding by the block decoder 2005 is output to the RS frame decoder 2006. That is, the block decoder 2005 removes known data, data used in trellis initialization, signaling information data, an MPEG header and RS parity data added by the RS encoder/non-systematic RS encoder or the non-systematic RS encoder of the transmission system from data of the group and outputs the data to the RS frame decoder 2006. That is, only the data of the RS frame assigned to the group is output to the RS frame decoder 2006. For example, the data of the primary RS frame assigned to the primary group division of the group and the data of the overlay RS frame assigned to the secondary group division are output to the RS frame decoder 2006.

The data trellis-decoded by the block encoder 2005 is output to the data interleaver of the main service data processor 2008. At this time, the data trellis-decoded by the block decoder 2005 and output to the data deinterleaver may include not only main service data but also data and signaling information within the RS frame. The RS parity data added after the pre-processor 230 of the transmitter may be included in the data output to the data deinterleaver.

If the input data is not subjected to block encoding but is subjected to trellis encoding in the transmitter, the block decoder 2005 may perform Viterbi (or trellis) decoding with respect to the input data, output a hard determination value or performs hard determination with respect to a soft determination value, and output the result.

If the input data is subjected to both block encoding and trellis encoding in the transmitter, the block decoder 2005 outputs a soft determination value with respect to the input data.

That is, if the input data is block-encoded by the block processor 302 of the transmitter and is trellis-encoded by the trellis encoder 256, the block decoder 2005 performs trellis decoding and block decoding in the inverse manner of the transmitter. At this time, the block processor of the transmitter may be an external encoder and the trellis encoder may be an internal encoder.

In order to maximize decoding performance of external coding upon decoding of concatenated codes, the decoder of internal coding preferably outputs a soft determination value.

The main service data processor 2008 is a block necessary for receiving main service data and may not be required in a receiving system structure for receiving only mobile service data.

The data deinterleaver of the main service data processor 2008 deinterleaves the data output from the block decoder 2005 as the inverse process of the data interleaver of the transmitter and outputs the deinterleaved data to the RS decoder. The data input to the data deinterleaver includes not only main service data but also mobile service data, known data, RS parity, and an MPEG header. The RS decoder performs systematic RS decoding with respect to the deinterleaved data and outputs the decoded data to the derandomizer The derandomizer receives the output of the RS decoder, generates the same pseudo random bytes as the randomizer of the transmitter, performs a bitwise XOR operation with respect to the pseudo random bytes, inserts MPEG synchronization bytes into the very beginning of every packet, and outputs data in units of 188-byte packets.

The RS frame decoder 2006 receives the data of the RS frame assigned to each group, configures the RS frame, and performs CRC-RS decoding in units of RS frames. For example, in the present invention, a CMM primary RS frame, a CMM secondary RS frame, an EMM primary RS frame, an EMM secondary RS frame and a super RS frame may be configured by referring to the TPC data decoded by the signaling decoder 2013. At this time, the primary RS frame is configured by aggregating data assigned to a primary group division within the group, and a secondary RS frame and an overlay RS frame are configured by aggregating data assigned to a secondary group division within the group.

The RS frame decoder 2006 adds a 1-byte MPEG sync data removed in an RS frame encoding process to the mobile service data packets within the error-corrected RS frame and performs derandomizing.

The present invention is more efficient in a portable and mobile receiver requiring robustness with respect to severe channel variation and noise.

In particular, in the present invention, mobile service data may be transmitted using a part or the whole of channel capacity used for transmitting main service data. The receiving system may receive and process that data.

Figure 52:
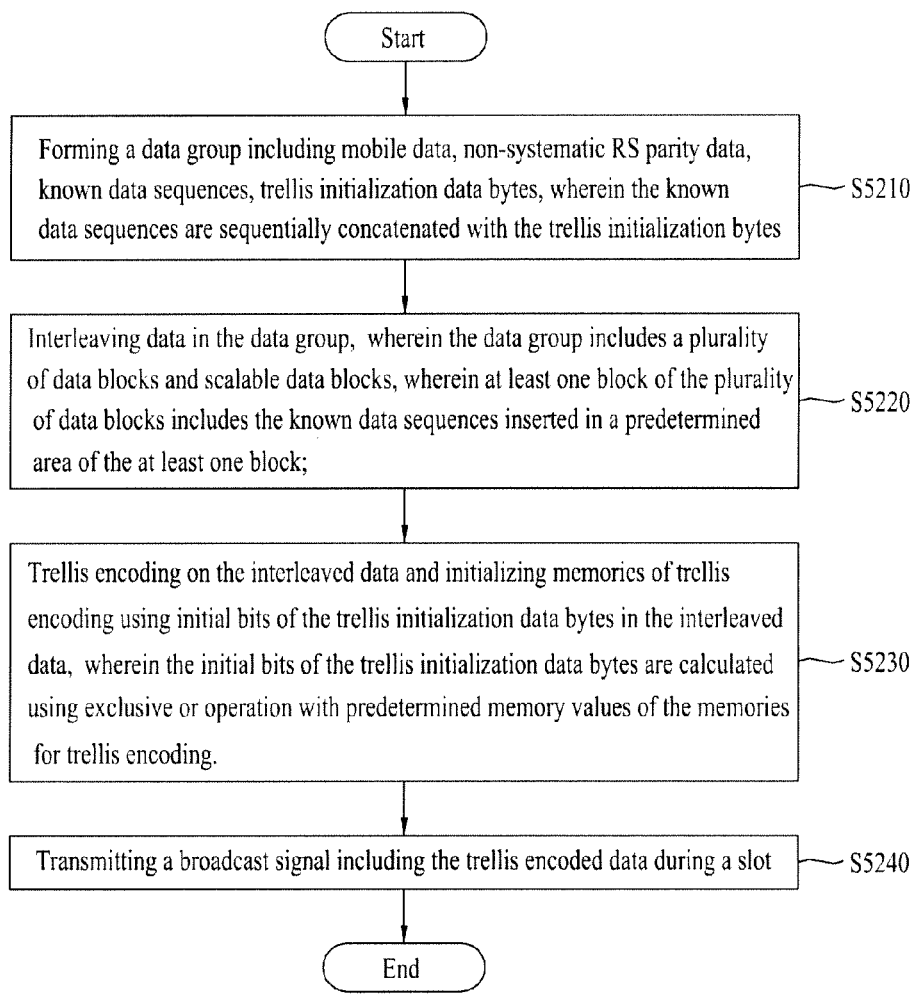
FIG. 52 is a flowchart of a process of a transmission system according to the present invention.

FIG. 52 is a flowchart of a process of a transmission system according to the present invention.

The group formatter 303 forms a data group including mobile data, known data sequence (S5200).

The packet formatter 305 packet-formats mobile data packets including data in the data group, wherein the mobile data packets include a specific number of mobile data packets and a scalable number of mobile data packets, wherein the scalable number is scalable up to 38, wherein the data group includes a plurality of regions, the plurality of regions including data blocks, wherein a first and second regions include a primary ensemble of the mobile data, the known data sequences, a third, fourth and fifth regions include a secondary ensemble of the mobile data, and the fifth region includes the scalable number of mobile data packets (S5210).

The modified data randomizer 251 and an RS encoder 252 by-pass data randomizing and RS encoding on data in the mobile data packets when the scalable number is 38 (S5220).

The interleaver 253 interleaves data in the mobile data packets (S5230).

The transmission unit 273 transmits the interleaved data in a transmission frame during a slot (S5240).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a broadcast signal, the method comprising:
   block processing mobile data using a specific code rate of 1/2, 1/3 or 1/4;
   forming data groups including the block processed mobile data and known data sequences;
   packet formatting mobile data packets including data in the data groups,
   wherein the mobile data packets include a specific number of mobile data packets and a scalable number of mobile data packets,
   wherein the scalable number is scalable up to 38,
   wherein each of the data groups includes a plurality of regions, the plurality of regions including data blocks, each of the data blocks including a plurality of data segments,
   wherein a first region and a second region of the plurality of regions include a primary ensemble of the mobile data and the known data sequences,
   wherein a third region, a fourth region and a fifth region of the plurality of regions include a secondary ensemble of the mobile data, and
   wherein the fifth region further includes the scalable number of mobile data packets;
   by-passing data randomizing and Reed-Solomon (RS) encoding on data in the mobile data packets when the scalable number is 38;
   interleaving data in the mobile data packets; and
   transmitting the interleaved data in a transmission frame during a slot, wherein the mobile data in the first region and the second region are block processed with a specific code rate of 1/2 or 1/4, and wherein the mobile data in the third region, the fourth region and the fifth region are block processed with a specific code rate of 1/2, 1/3 or 1/4.

2. The method of claim 1, wherein when the scalable number is 38, each of the data groups has a data area for RS parities and MPEG headers, and the data area is allocated to mobile data.

3. The method of claim 1, wherein the primary ensemble and the secondary ensembles are collections of the mobile data encoded by using different Forward Error Correction (FEC) code rates.

4. The method of claim 1, wherein the scalable number is a number which is 11, 20, 29 or 38.

5. An apparatus for transmitting a broadcast signal, the apparatus comprising:

a block processor configured to block process mobile data with a specific code rate of 1/2, 1/3 or 1/4;

a data formatter configured to form data groups including mobile data and known data sequences;

a packet formatter configured to format mobile data packets including data in the data groups, wherein the mobile data packets include a specific number of mobile data packets and a scalable number of mobile data packets, wherein the scalable number is scalable up to 38, wherein each of the data groups includes a plurality of regions, the plurality of regions including data blocks, each of the data blocks including a plurality of data segments, wherein a first region and a second region of the plurality of regions include a primary ensemble of the mobile data and the known data sequences, wherein a third region, a fourth region and a fifth region of the plurality of regions include a secondary ensemble of the mobile data, and wherein the fifth region further includes the scalable number of mobile data packets;

a data randomizer and a Reed-Solomon (RS) encoder configured to by-pass data randomizing and RS encoding on data in the mobile data packets when the scalable number is 38;

an interleaver configured to interleave data in the mobile data packets; and a transmission unit configured to transmit the interleaved data in a transmission frame during a slot, wherein the mobile data in the first region and the second region are block processed with a specific code rate of 1/2 or 1/4, and wherein the mobile data in the third region, the fourth region and the fifth region are block processed with a specific code rate of 1/2, 1/3 or 1/4.

6. The apparatus of claim 5, wherein when the scalable number is 38, each of the data groups has a data area for RS parities and MPEG headers, and the data area is allocated to mobile data.

7. The apparatus of claim 5, wherein the primary ensemble and the secondary ensembles are collections of the mobile data encoded by using different Forward Error Correction (FEC) code rates.

8. The apparatus of claim 5, wherein the scalable number is a number which is 11, 20, 29 or 38.

* * * * *